United States Patent [19]

Riganati et al.

[11] 4,151,512

[45] Apr. 24, 1979

[54] AUTOMATIC PATTERN PROCESSING SYSTEM

[75] Inventors: John P. Riganati, Yorba Linda; Visvaldis A. Vitols, Orange, both of Calif.

[73] Assignee: Rockwell International Corporation, El Segundo, Calif.

[21] Appl. No.: 722,244

[22] Filed: Sep. 10, 1976

[51] Int. Cl.² .................................................. G06K 9/00
[52] U.S. Cl. ............................................. 340/146.3 E
[58] Field of Search ............ 340/146.3 AE, 146.3 E, 340/146.3 AC, 146.3 Q; 283/7

[56] References Cited

U.S. PATENT DOCUMENTS

| | | | |
|---|---|---|---|
| 3,582,889 | 6/1971 | Bodez | 340/146.3 E |
| 3,611,290 | 10/1971 | Luisi et al. | 340/146.3 E |
| 3,636,513 | 1/1972 | Tisdale | 340/146.3 AC |
| 3,699,519 | 10/1972 | Campbell | 340/146.3 E |
| 3,968,475 | 7/1976 | McMahon | 340/146.3 E |
| 4,015,240 | 3/1977 | Swonger et al. | 340/146.3 E |

FOREIGN PATENT DOCUMENTS 1186169  4/1970  United Kingdom .............. 340/146.3 E

OTHER PUBLICATIONS

Moayer, "Syntactic Approach to Fingerprint Recognition," Proceedings of 1st Int. Joint Conf. on Pattern Rec., Oct.-Nov., 1973, pp. 423-432.

Eleccion, "Automatic Fingerprint Identification," IEEE Spectrum, Sep. 1973, pp. 36-45.

*Primary Examiner*—Leo H. Boudreau
*Attorney, Agent, or Firm*—L. Lee Humphries; H. Fredrick Hamann; Rolf M. Pitts

[57] ABSTRACT

An automatic system is described wherein pattern representations of epidermal ridges, such as fingerprints, are uniquely described by the extraction of specific information. Specific information such as ridge contour data, describing the ridge flow in the fingerprint pattern and minutiae data, principally describing ridge endings and bifurcations, are identified and extracted from the fingerprint pattern. Topological data, identifying singularity points such as tri-radii and cores, as well as ridge flow line tracings related to those points are extracted from the ridge contour data. The extracted information is then utilized by the system to automatically perform classification of the fingerprint pattern and/or matching of the fingerprint pattern with patterns stored in a mass file. Identification is automatically achieved by comparing the extracted information with the information stored in the mass file corresponding to previously identified fingerprint patterns. In a simplified version of the automatic system, verification of claimed identity may be achieved by matching the fingerprint pattern with a particular pattern stored in a mass file according to the claimed identity.

24 Claims, 47 Drawing Figures

NO. OF PEAK ARRAY (32 x 32) AFTER MASKING

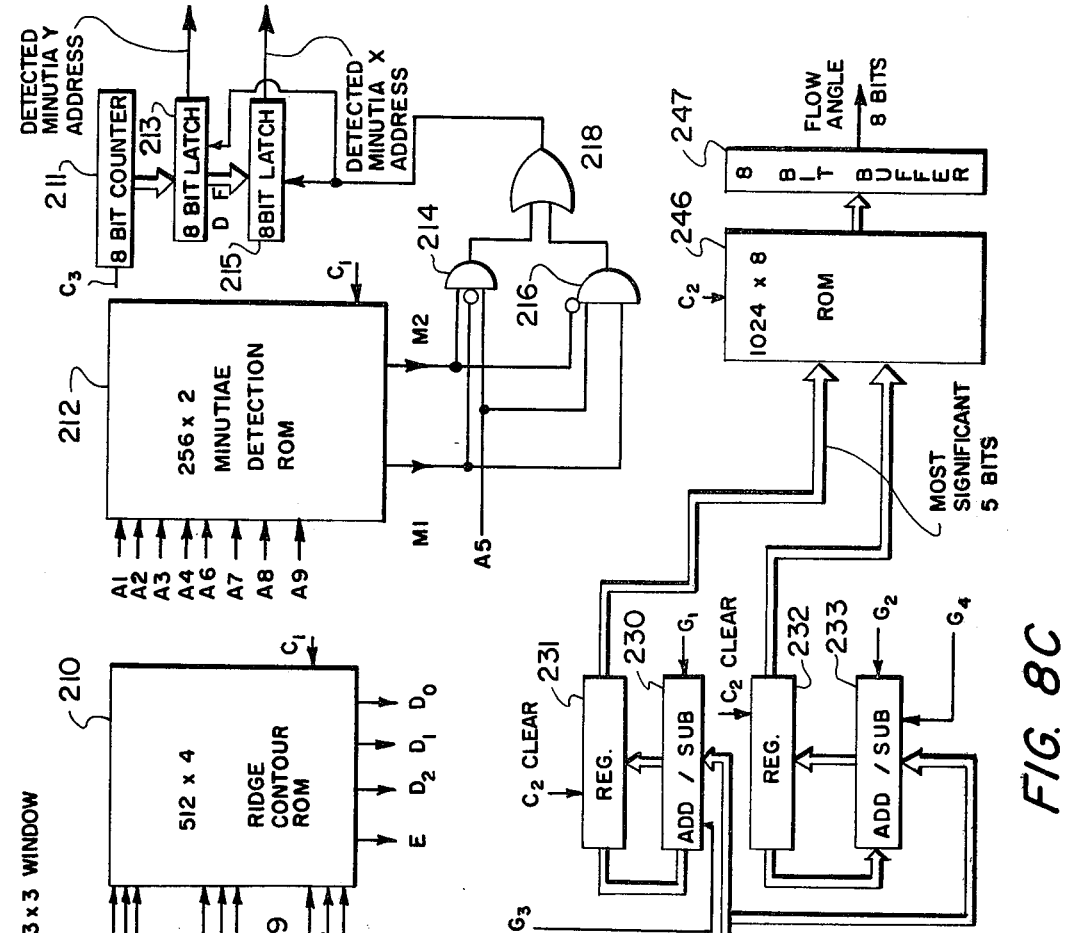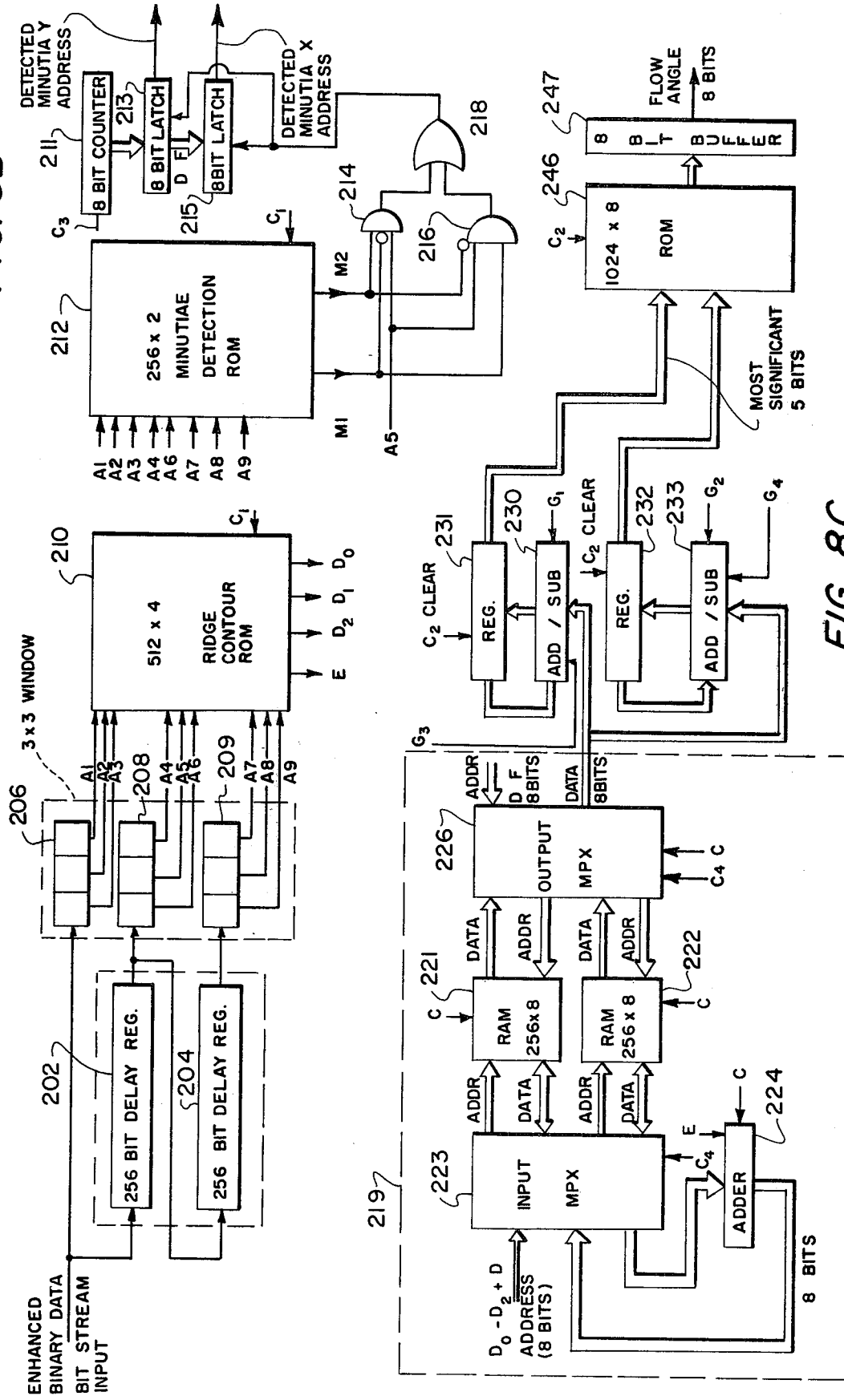

BIFURCATIONS
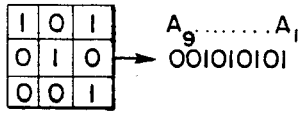 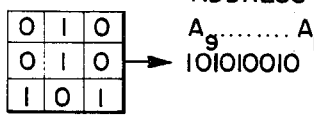 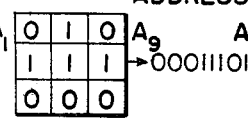
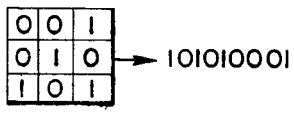 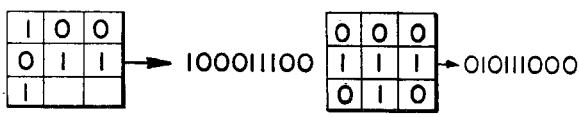
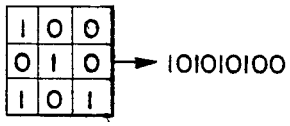 
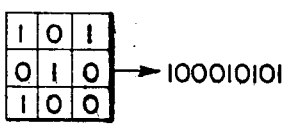 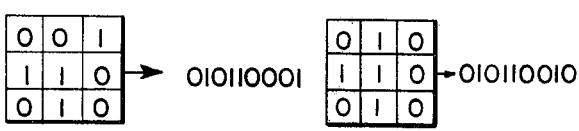
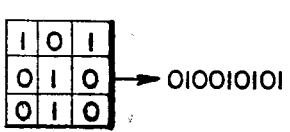 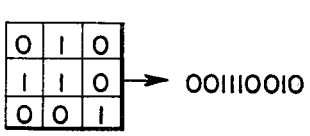
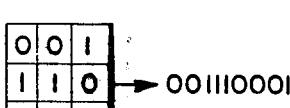 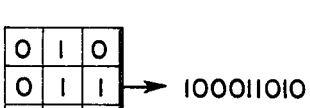
RIDGE ENDINGS
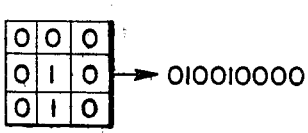 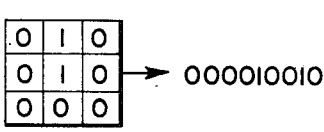
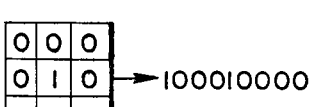 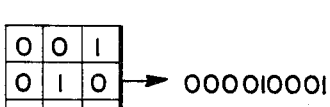
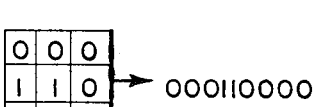 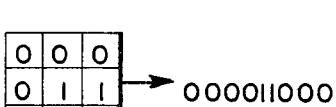
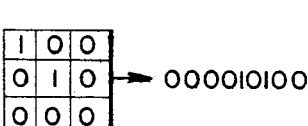 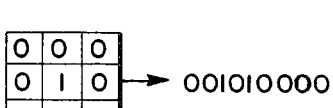
FIG. 9

| 3x3 WINDOW CONTENTS | | ADDRESS | YIELDS | ROM CONTENTS E D₂ D₁ D₀ |
|---|---|---|---|---|
| | 0 1 0 / 0 1 0 / 0 1 0 | 010010010 | → | 1 0 0 0 |
| 0 1 0 / 0 1 0 / 1 0 0 | 0 0 1 / 0 1 0 / 0 1 0 | 010010001 / 100010010 | → → | 1 0 0 1 / 1 0 0 1 |
| | 0 0 1 / 0 1 0 / 1 0 0 | 100010001 | → | 1 0 1 0 |
| 0 0 1 / 1 1 0 / 0 0 0 | 0 0 0 / 0 1 1 / 1 0 0 | 100011000 / 000110001 | → → | 1 0 1 1 / 1 0 1 1 |
| | 0 0 0 / 1 1 1 / 0 0 0 | 000111000 | → | 1 1 0 0 |
| 1 0 0 / 0 1 1 / 0 0 0 | 0 0 0 / 1 1 0 / 0 0 1 | 001110000 / 000011100 | → → | 1 1 0 1 / 1 1 0 1 |
| | 1 0 0 / 0 1 0 / 0 0 1 | 001010100 | → | 1 1 1 0 |
| 0 1 0 / 0 1 0 / 0 0 1 | 1 0 0 / 0 1 0 / 0 1 0 | 010010100 / 001010010 | → → | 1 1 1 1 / 1 1 1 1 |
| | | ALL OTHERS | → | 0 0 0 0 |

*FIG. 10*

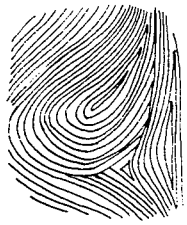
RIGHT LOOP
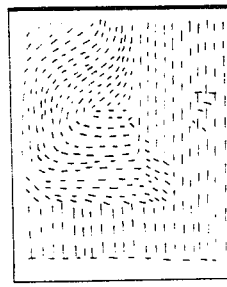
DERIVED RIDGE CONTOUR DATA
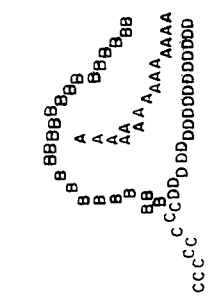
TRACING FOR CLASSIFICATION
FIG.12A
WHORL
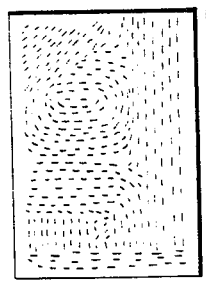
DERIVED RIDGE CONTOUR DATA
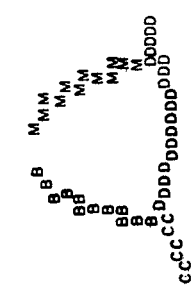
TRACING FOR CLASSIFICATION
FIG.12B
LEFT LOOP
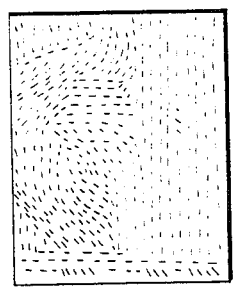
DERIVED RIDGE CONTOUR DATA
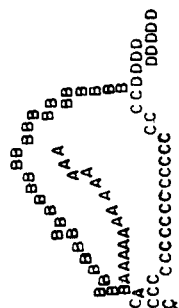
TRACING FOR CLASSIFICATION
FIG.12C

SIMPLIFIED EXAMPLES OF PATTERN
CLASSIFICATION TYPES

COUNT NO. OF PEAKS CIRCUIT 400

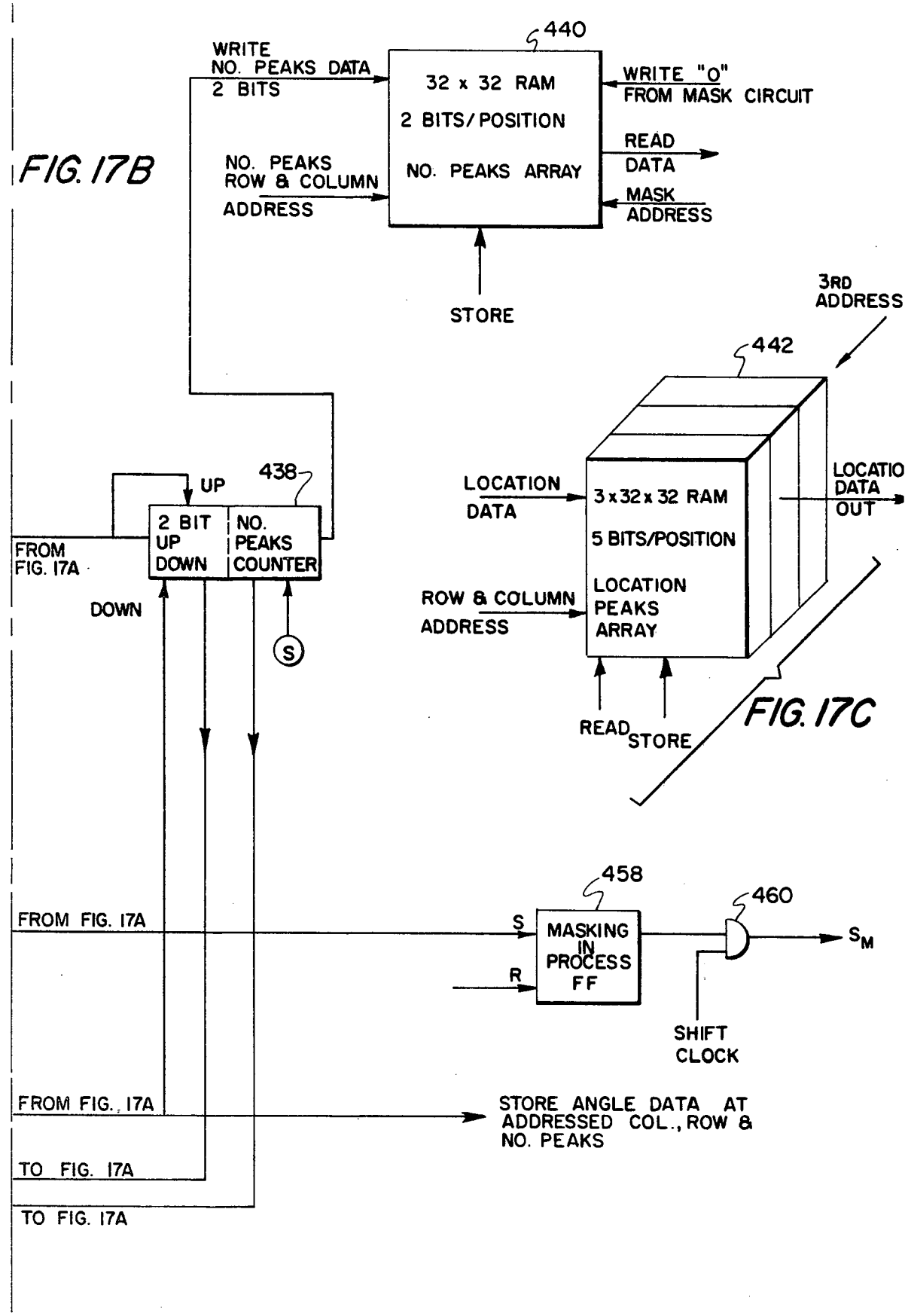

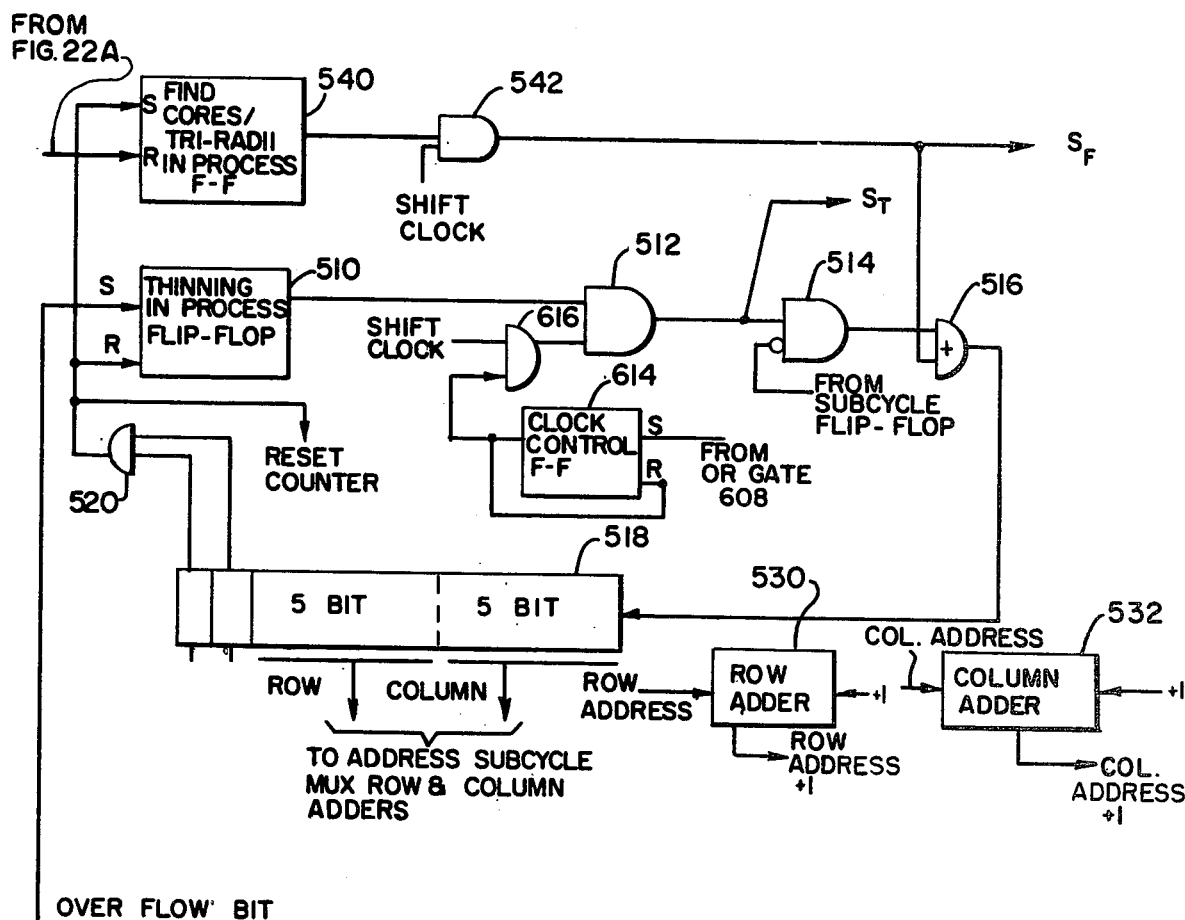
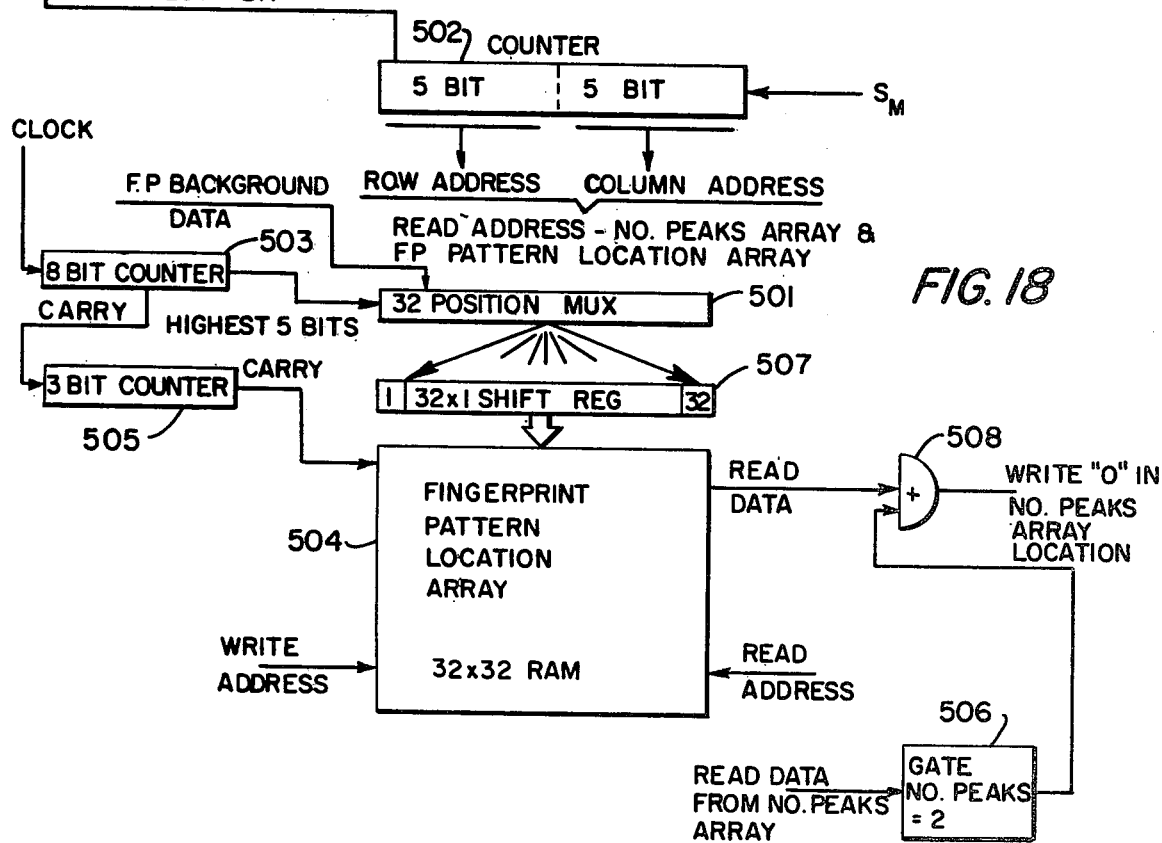
FIG. 18

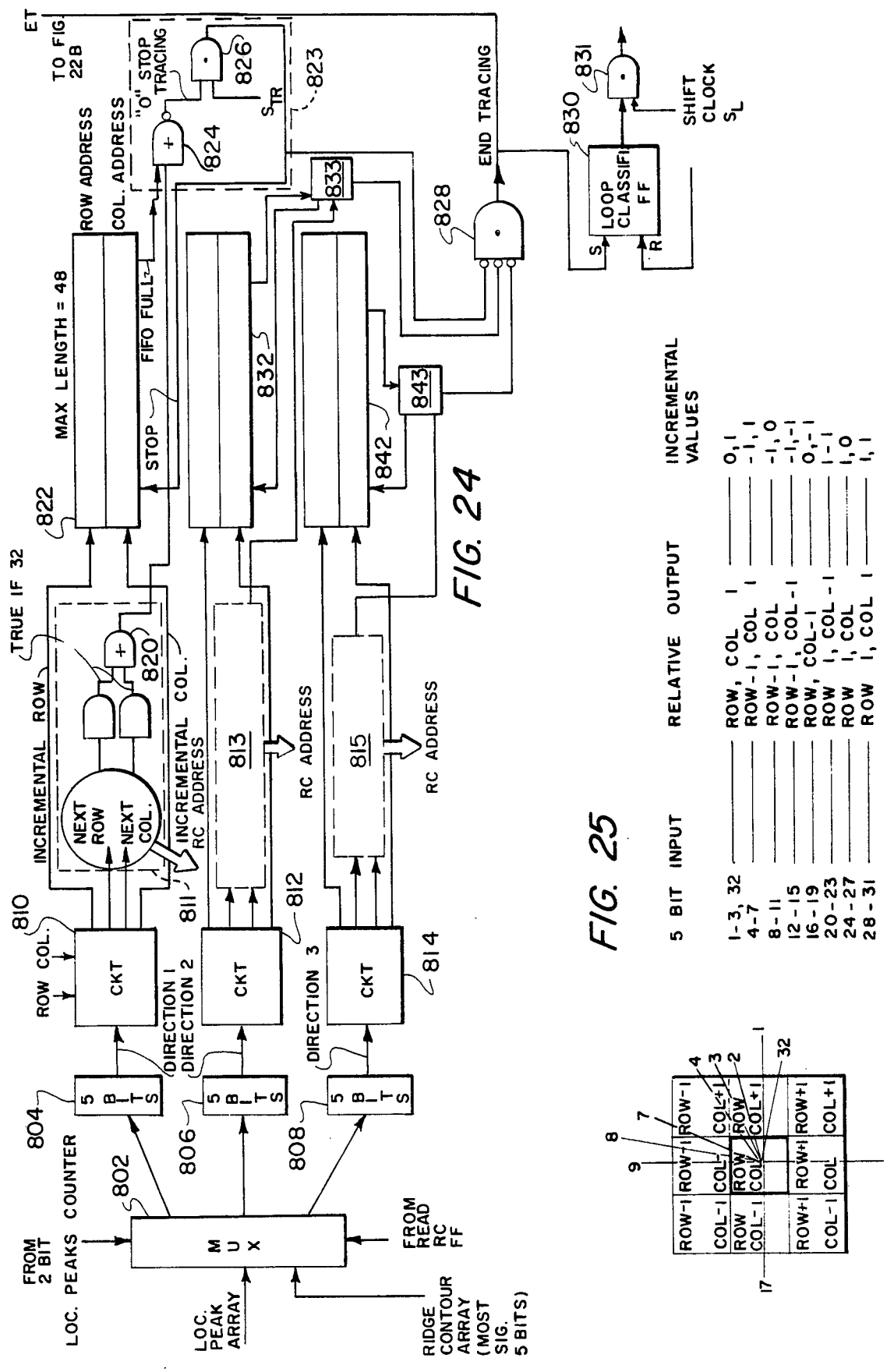

AUTOMATIC PATTERN PROCESSING SYSTEM

BACKGROUND OF THE INVENTION

1. Field of the Invention

The present invention relates to an automatic system for processing dermatoglyphic information to perform identification and/or verification of the claimed identity of the individual from whom the information is received. In a broader scope, the present invention relates to pattern comparison and identification techniques.

2. Description of the Prior Art

There has been a long felt need by law enforcement agencies, industrial security departments and commercial business establishments, among others, for a reliable and efficient system that automatically identifies and/or vertifies the identity of individuals according to dermatoglyphic information. While many attempts have been made in the prior art to devise such a system, most systems have had to rely upon manual operations for detecting and describing minutiae, orienting the pattern with respect to a reference, counting ridges and determining the classification of the pattern. Because of the length of time and high costs incurred by having an operator perform the manual identification functions, the prior art techniques have been impractical where requirements such as high speed identification and low cost per individual identified are desired.

SUMMARY OF THE INVENTION

The present invention overcomes the problems of the prior art by providing an automatic system wherein pattern representations of epidermal ridges, such as fingerprints, are uniquely described by the automatic extraction of specific information. The specific information, such as ridge contour data, describing the ridge flow in the fingerprint pattern, and minutia data, principally describing ridge endings and bifurcations, are automatically identified and extracted from the fingerprint pattern. Topological data identifying singularity points, such as tri-radii and cores as well as ridge flow line tracings related to those identified singularity points, are automatically extracted from the ridge contour data. The extracted information is then utilized by the sytem to automatically perform classification of the fingerprint pattern and/or matching of the fingerprint pattern with patterns stored in a mass file. Identification is then automatically achieved by comparing the extracted information with the information stored in the mass file, corresponding to previously identified fingerprint patterns. In a verification system, the claimed identity of an individual may be verified by matching the fingerprint of that individual with a particular pattern which is stored in the mass file according to the claimed identity.

The general system of the present invention for achieving automatic dermatoglyphic processing is pictorially represented in FIG. 1. The block 10 entitled "Primary Representation" encompasses the epidermal ridge patterns, such as those found on the fingers, palms, toes, and soles of humans, which are provided to the system for processing. The primary representation may be one which is achieved directly by impressing the epidermal ridges of a "live" finger on a transducer, or may be achieved indirectly by the transfer of a recorded image of an epidermal ridge pattern as in conventional fingerprint image "lifting" and transfer techniques. The representation may be of either a single region such as the ball of one finger, or it may be of multiple regions such as the balls of a plurality of fingers.

The primary representation is converted into a secondary representation by a transducer 20. In the case of a direct primary representation, the finger may be placed directly on a transducer, for example, on a prism. In that instance, light is internally reflected from the surface of the prism to light sensing elements presented in an array to receive the primary representation image and produce corresponding electrical signals. An indirect primary representation may be converted to an electrical form by either a flying spot scanner or a vidicon (TV type) camera. The output of the transducer will typically be in the form of an electrical signal, which is then automatically processed to extract essential identifying information from the represented epidermal ridge pattern.

The output of the transducer is generally converted to a digital signal and processed by an information extractor 30 to extract a trichotomy of information. The epidermal patterns are uniquely described by the trichotomy of information characterized by the two-dimensional syntax (i.e., the relative location of each information bit). The trichotomy of information includes ridge contour data, minutiae data and topological data. Ridge contour data is extracted, describing the relative ridge flow direction over the entire pattern. Minutiae data is extracted principally describing the location of bifurcations and ridge endings. The minutiae data also includes the relative flow direction at each bifurcation and ridge ending location. Other fine details, such as pores, islands, or dots may also be located and described in the minutiae data. Further data is also extracted, which is generally of a topological nature and is referred to herein as topological data. The topological data identifies singularity points generally termed "tri-radii" and "cores" and their associated ridge contours. Other topological data which may be utilized includes ridge counts between the singular points or between minutiae. The topological data is especially useful in classifying the form of the pattern, while the minutiae data establishes a unique and detailed description of each individual pattern. The ridge contour data is used in deriving both the singular points and associated ridge contours of the topological data. The ridge contour data is also used to obtain the ridge flow direction associated with each minutia.

Of course it is recognized by the applicants that other methods of extracting the trichotomy of information can be employed. For instance, where an unknown pattern is only marginally readable, the information may be manually extracted and entered into the automatic system by appropriate entry hardware.

On the basis of the extracted information, a number of functions can be performed, depending on the needs of the user.

One function comprises verification of an individual's claimed identity; this can be achieved by comparing the extracted information from the individual's fingerprint (or other epiidermal ridge pattern) with corresponding fingerprint information previously stored, and retrievable from storage in accordance with auxiliary information, such as an identification number assigned to that individual. The individual claims a particular identity by entering an identification number (auxiliary information) either manually, by a keyboard, or as coded on a card and suitably read into the system. The auxiliary information is used to address the memory of the system in order to retrieve the stored information. The individual also places an appropriate finger on a reader (scanner) window and enables the system to extract the necessary information from the scanned fingerprint pattern. The extracted information is then compared with the stored information and a yes/no decision is given to verify the claimed identity of the individual.

Automatic identification is another function which can be achieved by utilizing the extracted information. In this case, the topological data which characterizes the classification of the epidermal pattern, is used to select a corresponding classification bin established in a main memory file. In processing a given print for ultimate matching against the main file, classification is one technique by which one of many bins of the main file is selected to reduce the amount of stored data which must be searched and compared and to correspondingly reduce the amount of time required to produce a match. In the present invention it is recognized that classification, is a technique which minimizes search-time requirements. However, classification can be bypassed entirely if desired or substituted by another technique for reducing the number of patterns which must be compared against the pattern presented for identification. Techniques which group stored patterns by, for example, crime type or geographic location may be employed.

In the present invention, classification can be positively determined with a high degree of certainty or alternatively, a priority listing of probable classification types can be determined when the classification is made with a low degree of certainty. Where a priority listing is produced, successive bins of the main file are searched in succession according to the priority listing of the probable classification types. In the described embodiments, a classification scheme is demonstrated wherein only those patterns which are classified with a high degree of certainty, are compared with the patterns stored in the main file.

When a particular classification type is selected, the extracted minutiae data is then compared with the minutiae data of each of the stored prints within the corresponding particular classification bin of the main file. When a match is achieved, the system displays the identity of the person whose print corresponds to the matched print within the classification bin of the main file and/or reproduces the matched fingerprint itself from the information stored in the classification bin.

In many cases, multiple matches are achieved, due to predetermined tolerance limits and error rates. Therefore, the system produces a list of names or identification numbers identifying people, according to priority, whose stored fingerprint information matches the fingerprint presented for identification.

As well as being suitable for use by law enforcement agencies, industrial security departments and banks, the aforesaid system of the present invention may be used to great advantage in those places where identification cards are issued, such as drivers license, credit card, welfare or social security offices. In each of these offices a check of the fingerprints of the individual seeking to obtain an identification card could be checked against the file to determine if that individual previously had been issued an identification card under the same or other identities. Therefore, the aforesaid system, if widely used, would prevent the obtaining of false identification cards through valid issuing offices.

Although the embodiments of the present invention are directed to dermatoglyphic pattern matching and identification, it is recognized that the techniques employed herein may also be used to identify speech or other sound patterns, as well as many types of contour patterns including those developed in conjunction with geographical mapping, structure analysis and wave study. In fact, any pattern which may be represented by data corresponding to the aforementioned ridge contour data and/or minutiae data may be identified by implementing the concepts of the present invention.

It is a first object of the invention to provide an automatic system for reading, extracting characteristic information and identifying patterns with respect to reference patterns.

An object of the present invention is to provide an automatic system for processing dermatoglyphic information to perform identification of the individual from whom the information is received.

It is another object of the present invention to provide an automatic system for processing dermatoglyphic information to perform verification of the claimed identity of an individual from whom the information is received.

It is a further object of the present invention to provide an automatic fingerpeint system which analyzes the ridge contour pattern and automatically classifies the fingerprint pattern according to a predetermined set of rules.

It is still a further object of the present invention to provide an automatic system which detects singularity points such as core points and tri-radii points from the automatically detected rige contour data.

It is still a further object of the present invention to provide an automatic system which has decision capabilities to determine whether or not the dermatoglyphic pattern is classifiable under the predetermined classification types provided therein.

It is still a further object of the present invention to provide an automatic system which identifies and extracts minutiae in terms of relative X, Y location and $\theta$ orientation.

it is still a further object of the present invention to provide an automatic system which compares the extracted minutiae with minutiae belonging to fingerprints stored in a main file to determine a degree of match irrespective of the orientation of the fingerprint pattern with respect to the system.

It is still a further object of the present invention to provide an automatic system which classifies a fingerprint pattern irrespective of the orientation of the fingerprint pattern with respect to the system.

BRIEF DESCRIPTION OF THE DRAWINGS

The above and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIGS. 8A, 8B, 8C, 8D, 8E and 8F, hereinafter referred to as FIG. 8, present a detailed block diagram of the binary image minutiae and ridge contour detector shown in FIG. 4.

FIG. 9 illustrates examples of addresses corresponding to the detection of minutiae in a 3×3 window, as shown in FIG. 8.

FIG. 10 illustrates various addresses corresponding to ridge flow directions detected in a 3×3 window, as is shown in FIG. 8.

FIG. 12A illustrates a fingerprint pattern of a right loop classification, a resultant storage of ridge contour data derived from the fingerprint pattern and the contour tracing produced from the ridge contour data.

FIG. 12B illustrates a fingerprint pattern, resultant ridge contour and contour tracing for a left loop classification.

FIG. 12C illustrates a fingerprint pattern, resultant ridge contour and contour tracing for a whorl classification.

FIGS. 17A, 17B and 17C, hereinafter referred to as FIG. 17, presents a detailed block diagram of the peak counting circuit of the classifier.

FIG. 18 is a detailed block diagram of a masking circuit operating on the information produced by the circuit shown in FIG. 17.

FIG. 24 is a detailed block diagram of a tracing circuit performing the tracing as illustrated in FIG. 23.

FIG. 25 illustrates the incremental values used in the circuit shown in FIG. 24 for producing the tracings of the flow lines as illustrated in FIG. 23.

DETAILED DESCRIPTION OF THE PREFERRED EMBODIMENT

Figure 2A:
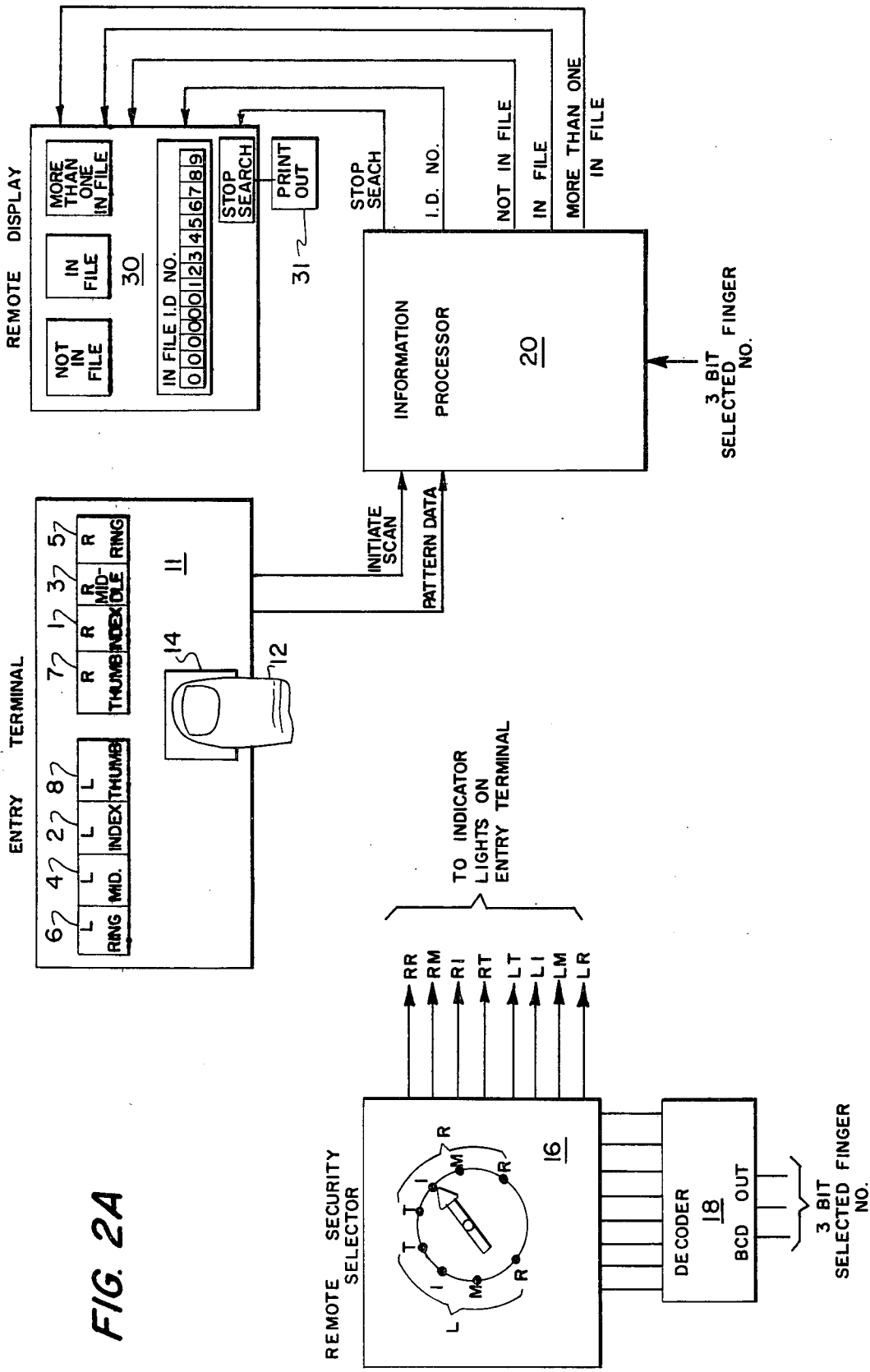
FIG. 2A illustrates a first embodiment of the present invention used for identifying an individual according to one of his selected fingerprints.

The system shown in FIG. 2A is intended to be used where it is desired to know if an individual seeking entry to an area has had his fingerprints previously recorded under his own identity or alias identities. Such a system could be used at customs points where each person passing a customs point would submit to a fingerprint check. In this case, the fingerprints and identification numbers (such as social security numbers) of known fugitives, parolees and others who are not allowed to leave the country would be stored in the system. If the individual's fingerprint pattern is identified as being in the file under one or more identities, that individual will not be allowed to pass through the customs point and may be detained for further action.

FIG. 2A illustrates a first embodiment of the present invention comprising an entry terminal 11, a display panel 30, and an information processor 20. The entry terminal 11 has a plurality of indicator lights 1–8 which indicate the particular finger which has been selected for comparison. An operator may select a specific single finger, to be automatically compared by the system, by the remote security selector 16.

The individual places his finger, which corresponds to the energized indicator light, on the scan window 14. In this example, the scan window 14 includes an initiate scan switch 107 (FIG. 3) activated by the finger 12 pressing down on the window 14. Of course other switching arrangements may be utilized, which may be, for example, manually, optically or electrically activated.

The information processor 20 receives the pattern data scanned by the entry terminal 11 and, according to the selected finger number, compares the scanned data with the stored file of fingerprints corresponding to the selected finger number. If a match is determined between the scanned fingerprint pattern and a stored fingerprint pattern, a corresponding identification number will appear on the remote display 30 (an optional print out device 31 may also be employed), and the "in file" light will be activated. If multiple matches are determined by the information processor 20, the corresponding identification numbers of each successively identified pattern will appear on the remote display 30 and the "more than one in file" light will be activated. If, however, no match is determined by the information processor 20, the "not in file" light will be activated. At that point, the search is ended for that fingerprint pattern.

Figure 2B:
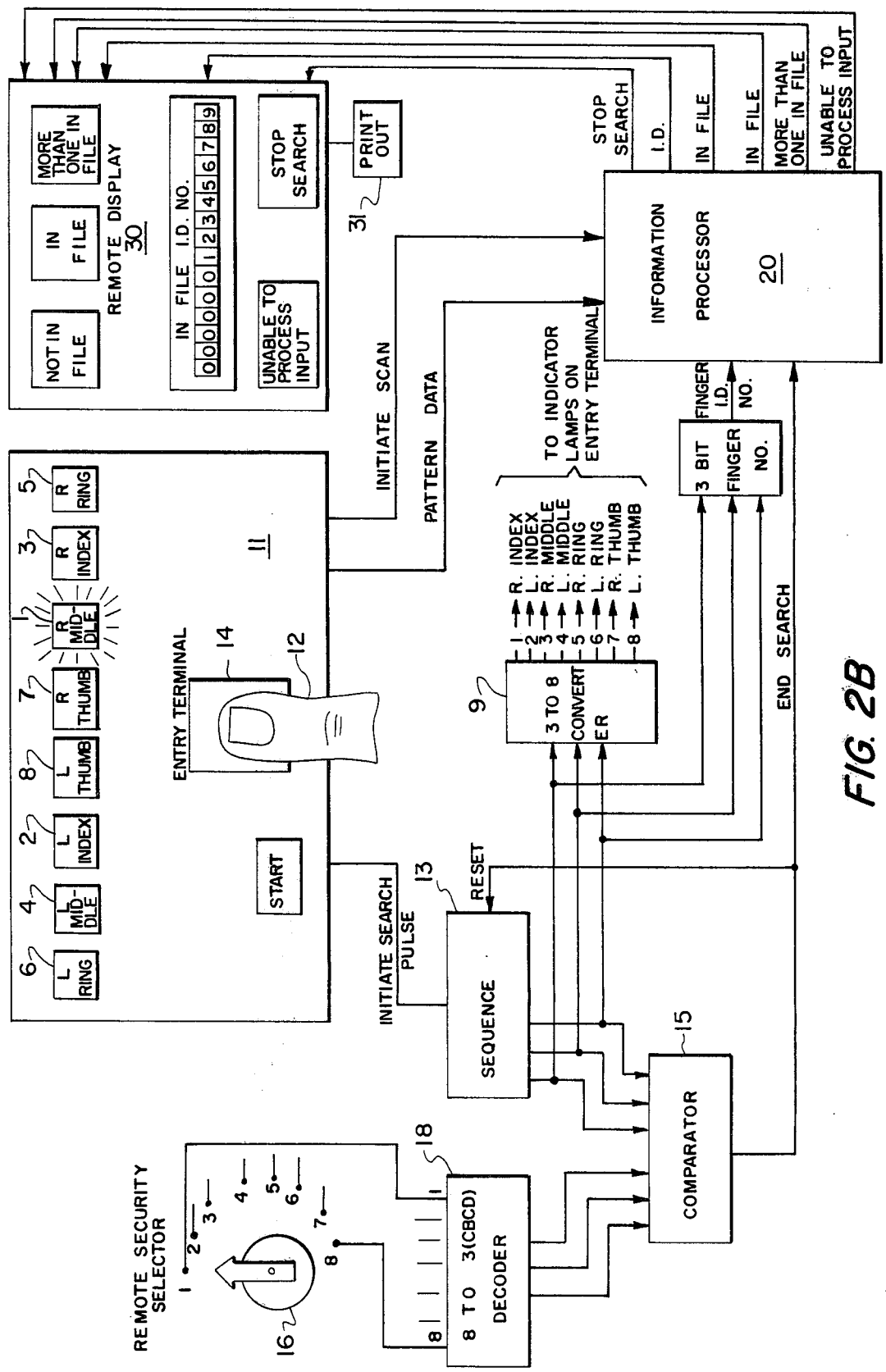
FIG. 2B illustrates a second embodiment of the present invention wherein an individual is identified according to one or more fingerprint patterns.

In the alternative to the system shown in FIG. 2A, a system as shown in FIG. 2B may be used wherein sequentially selected fingers are scanned and matched against the file. In this case, the individual seeking entry is instructed by the sequentially activated indicator lights 1–8 to successively place each of up to eight fingers on the scan window.

The number of fingerprints which are sequentially scanned and matched by the system, is controlled by the remote security selector 16'. An operator may select, for example, to have the right and left index fingers scanned and compared by the system. In that case, the operator will place the remote security selector 16' in the position "2" thereby causing an 8 to 3 decoder 18 to produce a corresponding binary code output. On an entry terminal 11, the indicator light 1, labeled "R. index", is activated by the output of a 3 to 8 converter 9 since, in this example, the right index finger is always scanned first. An initiate start pulse is generated in the entry terminal 11 upon the actuation of a "start" pushbutton or an initiate scan switch 107 (FIG. 3), discussed with respect to FIG. 2A. The sequence counter 13 counts up by one bit for each initiate search pulse and generates a BCD output to a 3 to 8 converter 9 which controls the activation of the corresponding indicator lights on the entry terminal 11. The output from the sequence counter 13 is compared with the output of the 8 to 3 decoder 18 in a comparator 15. Whenever the difference between the values from the counter 13 and decoder 18 is zero, an output signal from the comparator 15 is fed back to the sequence counter 13 to reset it to zero. The output signal from the comparator 15 is also used as a "end search" signal which is fed to the information processor 20. The output of the sequence counter 13 is also supplied to the information processor 20 to identify the finger number address in the main file.

It is apparent from the two embodiments shown in FIGS. 2A and 2B, that an entry terminal based upon the aforesaid discussions could be constructed so as to simultaneously receive a plurality of fingerprints to be scanned and processed by the system. The system could be modified to scan the plurality of fingerprints in parallel or in serial and to feed that information to the information processor 20. Furthermore, in each of the two embodiments shown in FIGS. 2A and 2B, it is apparent that several entry and display terminals may be simultaneously employed in a time-shared arrangement with a single information processor to achieve the most efficient use thereof.

The embodiments shown in FIGS. 2A and 2B could be easily modified to accomodate all of ten fingers rather than be limited to eight. However, it has been found that the "little" finger on each hand, although containing a fingerprint pattern, does not significantly increase the accuracy of identification to warrant processing. In addition, the number "8" can be processed efficiently in BCD hardware requiring only 3 bits for finger identification contrasted to a 10 print system.

Figure 1:
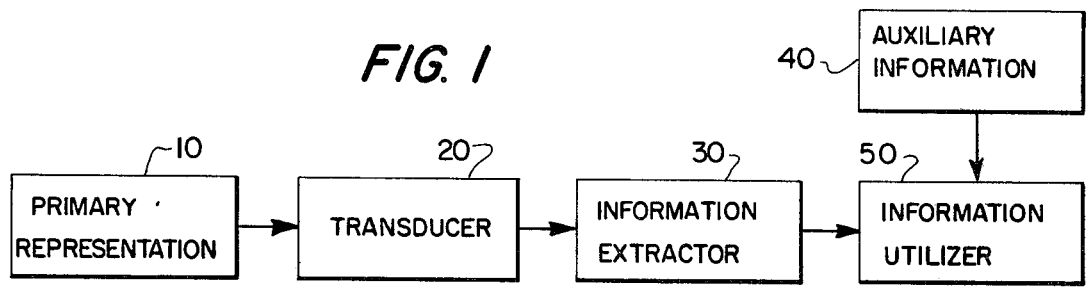
FIG. 1 is a block diagram showing the general concept of the present invention.
Figure 3:
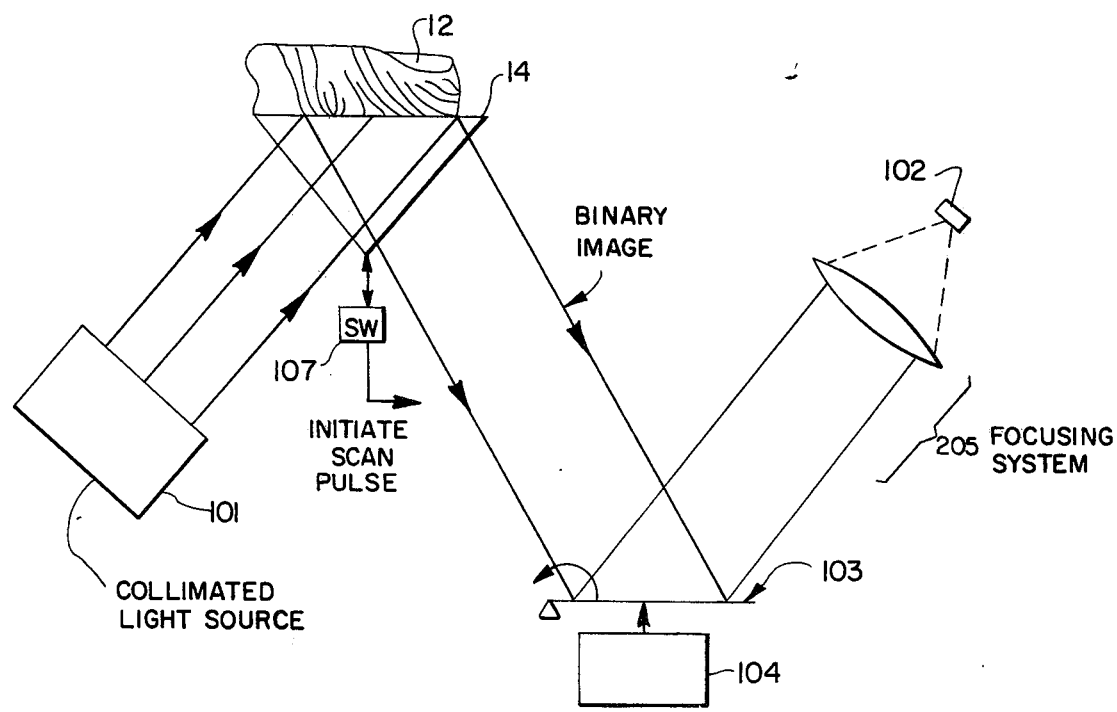
FIG. 3 illustrates an example of a scanner mechanism used in the subject invention.

FIG. 3 illustrates an example of a scanner mechanism used in the subject invention. Scanner 100 is shown as a prism element having a scan window 14 for receiving a finger 12 thereon. Collimated light is supplied by a light source 101 and is directed into the prism so as to be reflected from the internal surface of window 14. A binary image results from the frustrated internal reflection at the window 14 due to the ridge and valley pattern of the fingerprint present on the window 14. In those areas where the epidermal ridges of the fingerprint pattern contact the surface of the window 14, the collimated light is caused to scatter. In the areas of the window 14 where the epidermal valleys of the fingerprint pattern are present, no contact is made with the window 14 and the collimated light is internally reflected towards a pivoting mirror 103. A focusing system 205 receives the resulting binary image reflected from the mirror 103 and focuses the binary image at its focal plane. A linear 256×1 photo diode array 102 is fixedly positioned at the focal plane of the focusing system 205. The mirror 103 is pivoted by a cam driver 104 to scan the binary image laterally across the focal plane and thus along the elements of the linear photo diode array 102. Therefore, the fingerprint pattern on the window 14, is line scanned.

In the embodiment of the scanner 100, shown in FIG. 3, when a finger 12 is depressed against the window 14, a switch 107 is actuated to pass an initiate scan pulse which causes a 1 MHz clock 104 (shown in FIG. 4) to begin producing clocking signals.

Figure 4A:
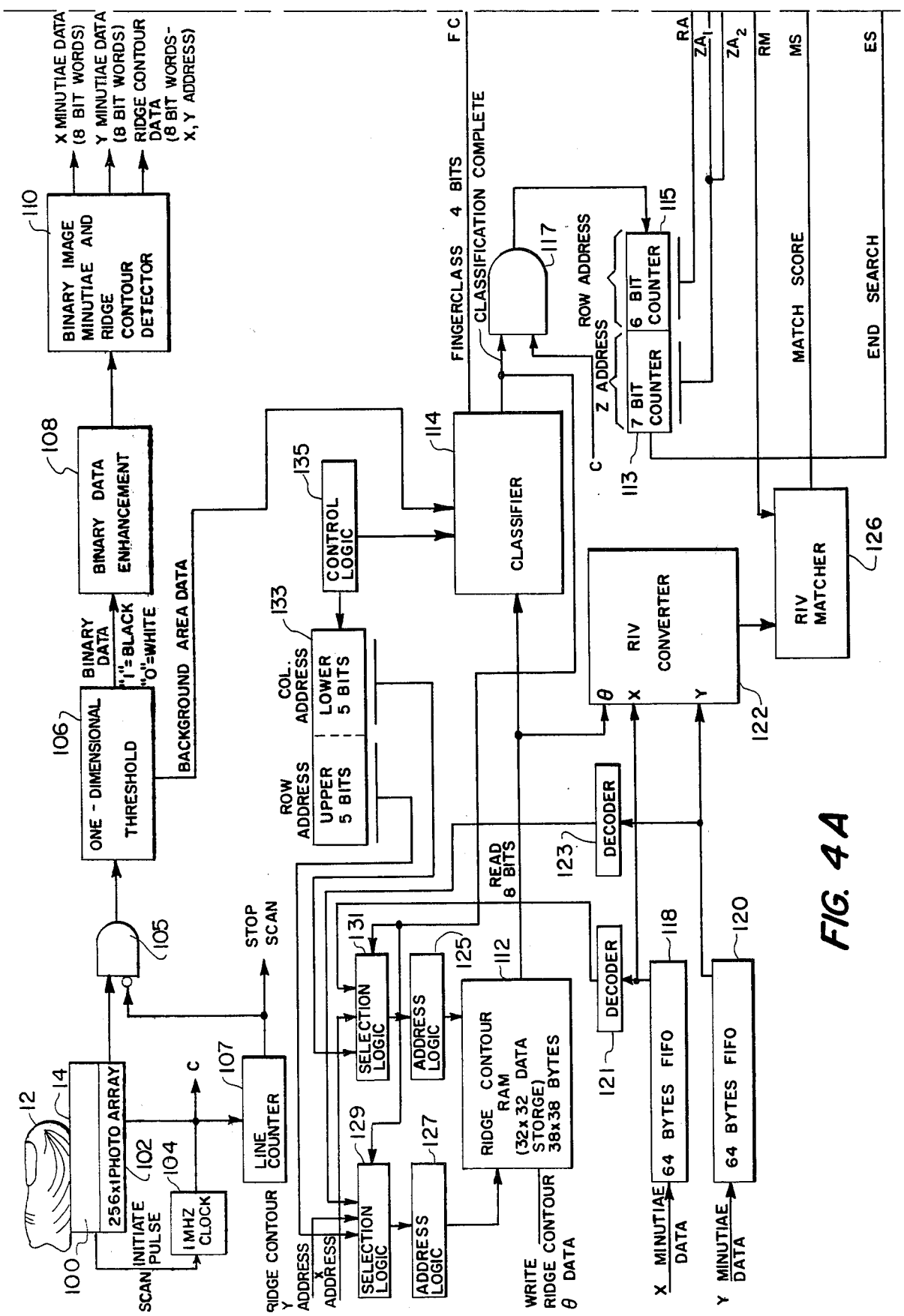
FIGS. 4A and 4B, hereinafter referred to as FIG. 4, present an overall block diagram of the information processor of the present invention.
Figure 4C:
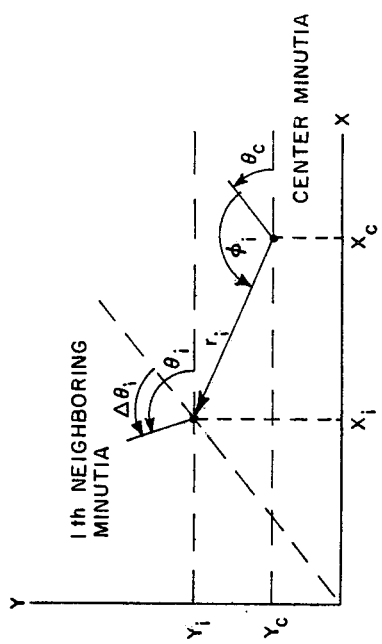
FIG. 4C is a diagram illustrating various parameters of the relative information vector as derived by the circuitry shown in FIG. 4.
Figure 4B:
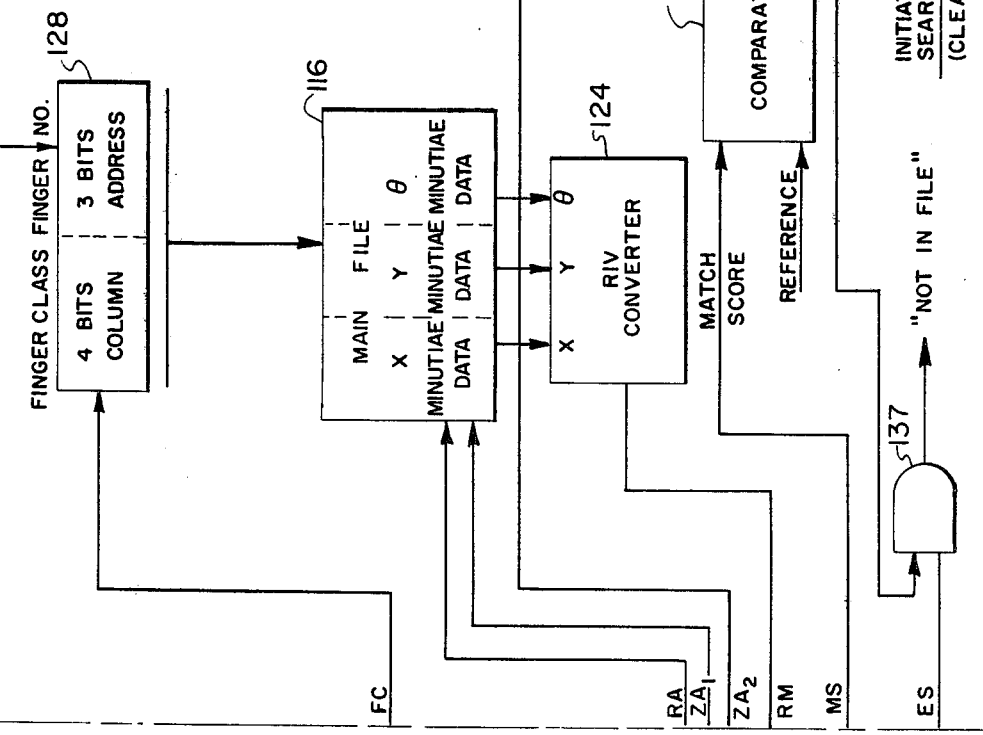

Now referring to FIG. 4, the initiate scan pulse from the switch 107 may also be used to start a cam mechanism (not shown) for driving the mirror 103.

The linear 256×1 photo diode array 102 is preferably driven by the 1 MHz clock 104 so that a line scan, much like a TV raster scan, is performed on the data sampled by the photo diode array 102. The photo diode array 102, in this embodiment, is repeatedly scanned for 256 successive lines and each scanned line contains 256 data sampling points.

Simultaneously, the output from the clock 104 is input to the line counter 107. The line counter 107 counts 256 clock pulses per line and 256 lines (i.e., 65,536 clock pulses). The line counter 107 produces a stop scan signal when the 256 lines are completely scanned. Line counter 107 is explained below in further detail with respect to FIG. 5.

The 256 data sampling points per line from the photo diode array 102 are actually analog data and may vary from a pure black signal equaling a "1" to a pure white signal equaling a "0". (However, a pure white signal equaling a "0" usually only occurs in the bright background areas surrounding the fingerprint pattern area.) Each of the analog data points are fed to a one dimensional threshold circuit 106 which quantizes each of the sampled points to either a "1" or a "0" binary value and also identifies the background area in those areas where the finger is not depressed against the surface of the window 14.

The binary data bit stream output from the one dimensional threshold circuit 106, is then input to a binary data enhancement circuit 108, wherein the binary data is enhanced by removing therefrom information corresponding to undesirable variations in the pattern without changing the unique characteristics of the pattern being processed. The binary data enhancement circuit 108 thins the ridges of the pattern so that their widths occupy no more than one bit. The binary data enhancement circuit 108 also acts to fill pores which appear in the ridge pattern and which may cause discontinuities. An implementation of the binary data enhancement circuit 108 is found in our commonly assigned U.S. Pat. application Ser. No. 621,724, filed Oct. 14, 1975, now U.S. Pat. No. 4,003,024, entitled "Two-Dimensional Binary Data Enhancement System", and is incorporated herein by reference.

The enhanced bit stream from the binary data enhancement circuit 108 is input to the binary image minutiae and ridge contour detector 110, wherein the relative X, Y location of the minutiae (ridge endings and bifurcations) are detected and the ridge contour data is determined.

Referring again to the binary image minutiae and ridge contour detector 110, the ridge contour data is output as 1024 words each 8 bits in length to a 32×32 byte RAM 112. Each of the 1024 words representing the ridge contour data fed into the RAM 112 provides average ridge contour angle information for an 8×8 window area defined by 8 points per line for 8 scanned lines of the original photo diode array 102. Each of the 1024 storage locations of the RAM 112, addressed through the selection and address logic circuits 131/125 and 129/127, stores one of the corresponding 8 bit words of average ridge contour angle information. Since $2^8$ yields 256, 256 distinct angles are detectable by the detector 110 and therefore the system provides a resolution of approximately 1.4° as to the ridge contour angle information.

The minutiae such as ridge endings and bifurcations may number upwards of 100 in any particular fingerprint pattern. However, it has been determined empirically, that the number of a valid minutiae per print averages around 50. Therefore, it is quite acceptable to identify and extract data for up to 64 minutiae and still achieve a high degree of accuracy in the match. In addition, 64 is a convenient figure to use in digital systems. Obviously, however, the size of the system could be modified by those skilled in this art, to detect a larger number of minutiae than 64.

Each of the up to 64 bytes of X data corresponding to the detected minutiae comprise 8 bits. Similarly, each of the up to 64 bytes of Y data corresponding to the same detected minutiae comprise 8 bits. The X and Y data sets describing the relative location of each detected minutiae are input to respective minutiae data location storage registers 118 and 120. The minutiae data location storage registers 118 and 120 are FIFO types which each store 64 bytes of information and supply their outputs to an RIV converter 122.

The $\theta$ orientation for each detected minutiae corresponds to the average ridge contour angle data output from the binary image minutiae and ridge contour detector 110 at that corresponding X-Y location. Then, as the 8 bit words in each data set are output from the registers 118 and 120, to the RIV converter 122, they are also output to decoders 121 and 123 respectively. Selection logic circuits 131 and 129 gate through the decoded X and Y minutiae data information to address logic circuitry 125 and 127, respectively. The ridge contour RAM 112, containing the ridge contour $\theta$ data at the 32×32 data locations, is addressed to read out the $\theta$ data according to the addressed position. The $\theta$ data read out from the ridge contour RAM 112 is then fed to the RIV converter 122.

The basic approach to comparing and matching patterns by the present embodiment takes into account that, even though two fingerprints of the same finger may not match perfectly (due to stretching, or other distortions), the minutiae patterns of these two fingerprints will match sufficiently close that they can be considered to match each other. For this reason, there is a general overall match of two fingerprints for which it can be said that the fingerprints match. As a result, the following section of the invention is implemented to automatically determining how each and every little region of one fingerprint matches with each and every little region of the other fingerprint and then put all these interim results together in a different space (something like the time domain versus frequency domain) to obtain the global picture. By this implementation, an RIV pattern matching subsystem automatically determines whether or not the two fingerprints being compared are sufficiently similar to constitute a match.

Each little region of a fingerprint pattern is called a "relative information vector" or RIV. An RIV is generated for each minutiae of the fingerprint pattern and is essentially a detailed description of the immediate neighborhood of that minutiae. The minutia for which an RIV is generated is called the "reference" or "center" minutia for that RIV. More specifically, an RIV describes the relative position (r, $\phi$) and direction ($\Delta\theta$) for each one of a number of minutiae in a predetermined neighborhood with respect to the center minutia of that RIV. The three parameters r, $\phi$ and $\Delta\theta$ of this relative position may be defined as follows:

$r_i$ = the distance between the center minutia and the ith neighboring minutia of that RIV, $= |(Xc-Xi)^2+(Yc-Yi)^2|^{\frac{1}{2}}$;

$\phi_i$ = the angle between the tail of the center minutia and the location of the ith neighboring minutia of that RIV, $= \tan^{-1}|Yc-Yi/Xc-Xi|-\theta_c$;

$\Delta\theta_i$ = the difference between the angle of the tail of the center minutia ($\theta_c$) and the angle of the tail of the ith neighboring minutia ($\theta_i$), $= |\theta_c-\theta_i|$. Pursuant to the above definitions, the RIV parameters $r_i$, $\phi_i$ and $\Delta\theta_i$ of the ith neighboring minutia are illustrated in FIG. 4C for a center minutia with coordinates ($x_c$, $y_c$, $\theta_c$).

The RIV converter 122 in combination with the RIV converter 124 and RIV matcher 126 comprise the RIV subsystem which is responsive to minutiae for selectively generating a plurality of neighborhood comparison signals indicative of the closeness of match and coordinate displacements between minutiae neighborhoods of the compared patterns. The RIV subsystem is also responsive to the neighborhood comparison signals for developing output signals indicative of the relative closeness of match and relative coordinate displacement of the compared patterns. The RIV converters 122 and 124 are responsive to minutiae of the two patterns for selectively developing a detailed neighborhood description of nearby surrounding minutiae for each of the minutiae of the respective patterns. The RIV matcher 126 is selectively responsive to the detailed neighborhood descriptions of the two patterns from the RIV converters 122 and 124 for developing a plurality of neighborhood comparison signals indicative of the closeness of match and coordinate displacement between each minutiae neighborhood of the first pattern with respect to each minutiae neighborhood of the second pattern.

The output from the RIV converter 122 is input to the RIV matcher 126 wherein each RIV is compared with each RIV from the RIV converter 124, which encodes the minutiae data of an addressed fingerrprint pattern stored in a main file 116.

It should be understood that although the RIV converters 122 and 124 are individually shown in this embodiment, they may be embodied as a single converter which operates in time-shared fashion to develop the detailed neighborhood description for both the pattern to be identified and a selected identified pattern from the main file.

Basically, the RIV converters 122 and 124 operate identically. They each sequentiallly transform input minutiae data in X, Y, $\theta$ format from the pattern to be identified A (FP-A) and an identified pattern B (FP-B) into the relative information vector (RIV) format. The RIV matcher 126 compares each RIV of the unidentified pattern A with each RIV of the identified pattern B and generates a match score for each RIV pair comparison to indicate the closeness of match of that RIV pair. The score is processed to analyze the set of RIV match scores from a global (overall) viewpoint and a final score is developed which quantitatively indicates the degree of similarity between the two fingerprints being compared. The RIV pattern matching subsystem of the present invention is the subject of our copending U.S. Patent application Ser. No. 721,308, filed concurrently herewith, entitled "Minutiae Pattern Matcher" and is incorporated herein by reference.

Prior to the minutiae pattern matching performed by the RIV subsystem, a classifier 114 functions to classify the scanned fingerprint pattern into one of a selected number of classification pattern types by analyzing the ridge contour pattern information stored in the RAM 112. The classifier 114 of this embodiment is capable of classifying a fingerprint into one of 12 classification types. The classification types in this instance are broken down into 5 sizes of left loops, 5 sizes of right loops, 1 whorl and 1 arch. The classifier 114, through control logic 135 and row and column address register 133, addresses the ridge contour RAM 112 to sequentially read out therefrom each of the 1024 ridge contour data words stored therein. The classifier 114 then analyzes the ridge contour data to identify singularity points, such as cores and tri-radii points which may be present, and processes the ridge contour data associated with the identified singularity points to determine a classification of the fingerprint pattern. The classifier 114 outputs an address of the classification type and produces a "classification complete" signal output which initiates a sequential search of the main file 116 according to the addressed classification bin. The classification type output from the classifier 114 is a four bit "finger class" signal identifying which of the 12 classification types the scanned fingerprint pattern has been determined to be. A buffer 128 stores the four bit output from the classifier 114 along with a three bit address indicating the selected finger number, as indicated in FIGS. 2A and 2B, and addresses the main file 116.

Figure 5:
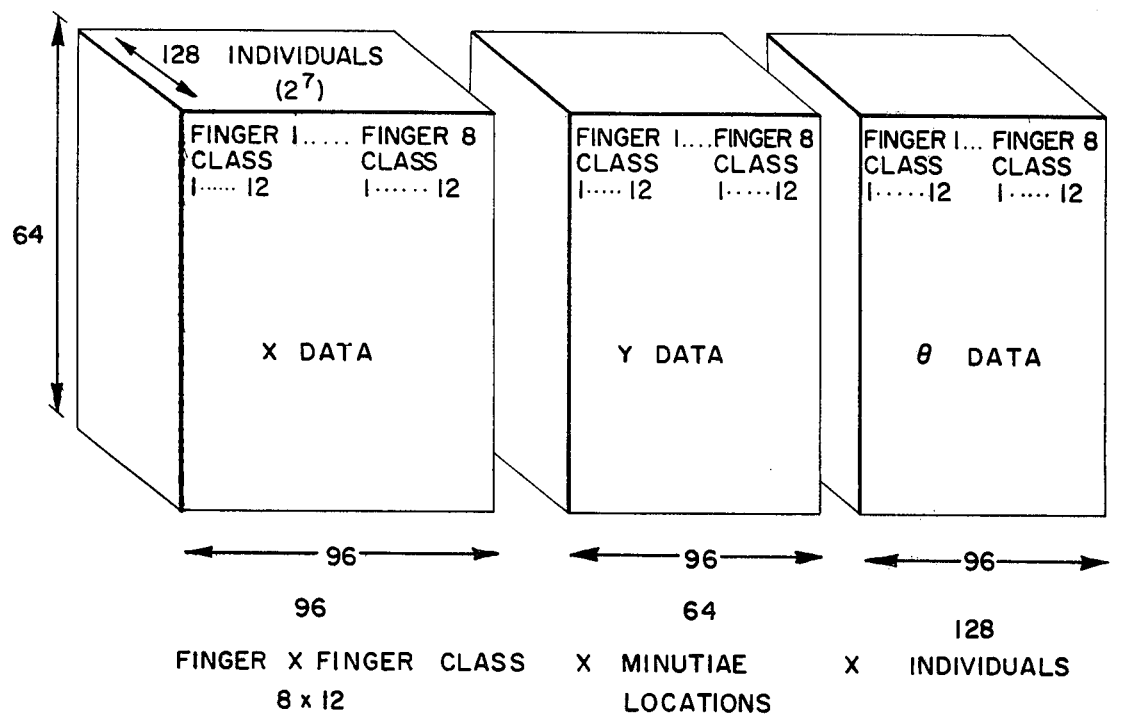
FIG. 5 is a conceptualized illustration of the main file of the information processor shown in FIG. 4.

FIG. 5 shows a conceptual view of the main file 116. From FIG. 5, it is possible to see that for each of the X, Y and $\theta$ data, 12 classifications are provided for each of the eight fingers yielding 8 times 12 bytes (96 bytes for the width of each of the X data, the Y data and the $\theta$ files). The minutiae data stored in the main file is predetermined to be a maximum of 64 (conceptualized in a vertical dimension).

Also in the conceptualized view of the main file 116, as shown in FIG. 5, a Z dimension of 128 individuals is provided. Therefore, in this embodiment of the present invention, the particular finger number corresponding to the finger being scanned, along with the determined classification type, from the address for the main file 116 and are addressed from the buffer 128. Sequentially, the stored patterns corresponding to the addressed finger number and class type of 128 individuals are read out from the main file 116 as they are addressed from the 7 bit counter 113. Although the main file 116, having a capacity of 128 individuals, is employed in this embodiment, it is understood that a main file may be as large as is economically feasible.

Simultaneously with addressing the main file 116, the 7 bit counter 113 supplies Z addresses in sequence to a 7 bit register 134 which is connected to an identification number ROM 136, which in this case, has a $128 \times 9$ storage capacity. The 128 dimension conforms to the 128 individuals whose fingerprints are stored in the main file 116, and the 9 dimension conforms, in this case, to a social security number identification for each individual. The function of the identification ROM 136 is to provide an identification number for display whenever a match is achieved.

At this point it should further be recognized that, although the above discussion is directed to extracting data from the fingerprint pattern for comparison with information stored in the main file 116, this system may use conventional switching techniques to store the X, Y and $\theta$ data into the main file according to an address determined by the finger number, classification type and the individual's identity, during a "write" mode.

The X, Y and $\theta$ minutiae data read out from the main file 116 is input to the RIV converter 124 which is identical to the RIV converter 122. The output of the RIV converter 124 is fed to the RIV matcher 126. In the RIV matcher 126, each relative information vector from the RIV converter 124. A 7 bit match score is produced by the RIV matcher in accordance with each of the 128 sequenced fingerprint patterns stored in the main file 116.

The 7 bit match score output from the RIV matcher 126 is fed to a comparator 130 which compares the 7 bit match score with a predetermined reference value. Whenever the 7 bit match score exceeds the reference value, a "match" is determined between the scanned fingerprint pattern and the addressed pattern. The match signal is output from the comparator 130 and is input to a match flip flop 132. The match flip flop 132 is set, and its latched output activates the "in file" indicator light by setting the in file flip flop 141.

Simultaneously, the value present in the 7 bit register 134 is latched and addresses the identification number ROM 136, and the ROM 136 is strobed to read out the addressed identification number.

Therefore, when it is determined that one of the 128 fingerprint patterns in the main file 116 corresponds by finger number, classification, and matching minutiae, the identification ROM 136 is correspondingly addressed to read out the corresponding identification number of the individual possessing the matching fingerprint in the main file 116. The identification number may be in the form of a nine digit social security number or, with additional hardware, may produce the name of the person having the matched fingerprint.

The identification number information output from the identification ROM 136 is then fed to a display panel, as shown in FIGS. 2A or 2B, which displays the nine digits output therefrom. In the alternative, or additionally, the identification number information may be output to a printer or other apparatus for permanent recordation thereof (indicated in FIGS. 2A and 2B).

In the event that more than one match is obtained during the sequential search of the main file 116, the match flip-flop 132 will again be set and correspondingly cause the identification ROM 136 to be addressed.

The corresponding identification number will be output and displayed and/or recorded. Simultaneously, an AND gate 138 will set a flip-flop 139 to activate a "more than one in file" indicator on the display panel.

If, at the end of the search of the main file, no match has been determined, the "not in file" indicator light is activated through AND gate 137 by the end search signal from the overflow of the 7 bit counter 113.

Figure 6:
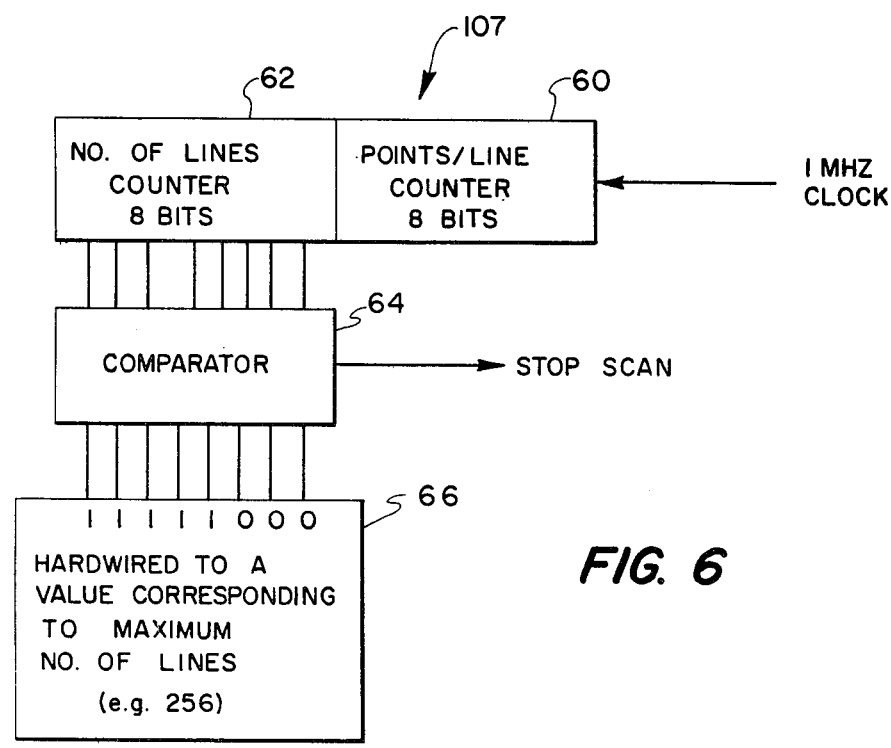
FIG. 6 is a detailed block diagram of the line counter shown in FIG. 4.

Referring to FIG. 6, the line counter circuit 107 is detailed. A points/line counter 60 having an eight bit capacity receives the individual clock pulses from the 1 MHz clock generator 104. For each 256 bits counted by the points/line counter 60, the number of lines counter 62 counts up by one bit. A reference value of 256 is hardwired into the system as indicated at block 66. A comparator 64 compares the value of the output from the number of lines counter 62 with the hardwired value of 256. When the value of the number of lines counter 62 reaches 256, a stop scan signal is generated by the comparator 64 for inhibiting the scan function.

Figure 7:
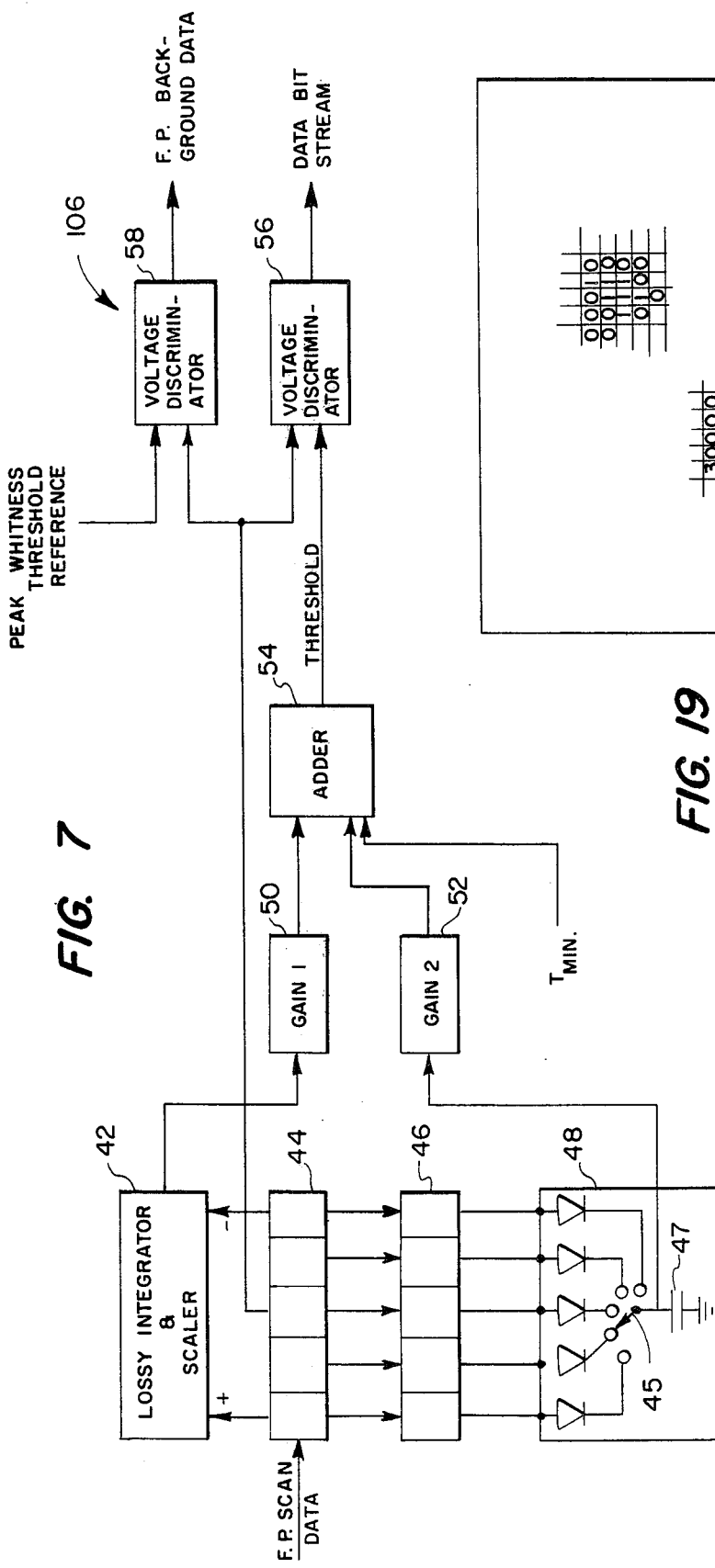
FIG. 7 is a detailed block diagram of the one-dimensional threshold circuit shown in FIG. 4.

Referring to FIG. 7, the 1-dimensional threshold circuit 106 is shown in detail. As mentioned previously, the input to the circuit is an analog signal corresponding to 256 data points per line sequentially output from the photo array. The analog signals are discrete in the sense they are generated by corresponding ones of the 256 diodes in the photo array 102. The analog signals are processed through a five stage analog buffer 44, such as a CCD. As is well known, a CCD has the ability of transferring sampled analog values along the successive stages thereof.

The first and last sample values present in the five stage analog buffer 44, are supplied to a lossy integrator and scaler 42 which produces a five point average output signal to a first gain control 50 at a first input to an adder circuit 54.

The values present in each of the five stages of the five stage analog buffer 44 are output to corresponding stages of buffers 46. The output of each corresponding stage of buffer 46 is connected to an associated diode in a "peak black" selection circuit 48.

A scanning switch in the selection circuit 48 scans each of the associated diodes and causes the capacitor 47 to charge to a value corresponding to one of the five outputs. The value of the charge on the capacitor 47 is coupled to the second gain control 52 at the second input of the adder circuit 54.

The third input to the adder circuit 54 is shown as $T_{min}$. $T_{min}$ is a preselected minimum threshold value which is used as a reference for the adder circuit 54. The adder circuit 54 supplies a threshold value to the voltage discriminator 56. The threshold value output from the adder 54 is variable for each sampling point and is determined by the $T_{min}$ and the two inputs from the gain controls 50 and 52.

The voltage discriminator 56 receives the third sample value from the five stage analog buffer 44 and supplies a binary output by referencing that sampled analog signal to the variable threshold input signal.

A voltage discriminator 58 is also shown in the 1-dimensional threshold circuit 106 for distinguishing the background area from the fingerprint pattern area. A "peak whiteness" threshold reference voltage is supplied to one input of the voltage discriminator 58 and is compared with the third sample value from the five stage analog buffer 44 and supplies a binary "1" where the whiteness of the sampled value is greater than the peak whiteness threshold reference, and a binary "0" where the whiteness of the sampled value is less.

The enhanced binary bit stream from the binary data enhancement circuit 108 is a thinned version of the data derived by scanning the finger. The resulting bit stream is enhanced to a degree wherein any 3×3 bit window will contain no more than a single line corresponding to a ridge of the fingerprint pattern.

Figure 8D:
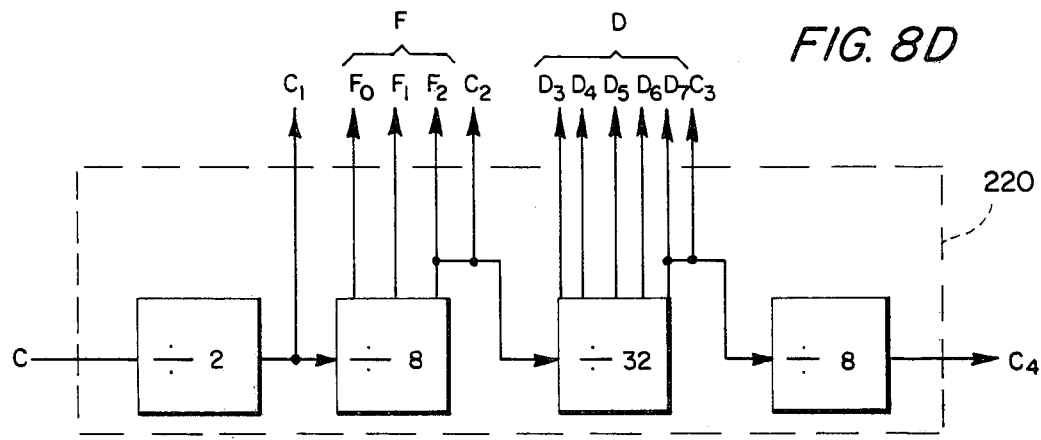
Figure 8E:
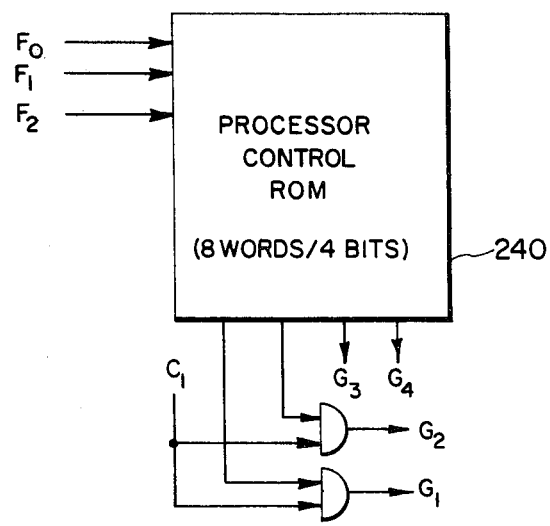
Figure 8F:
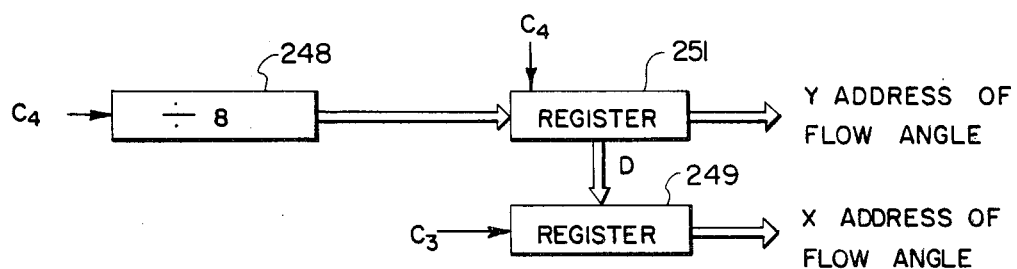

The detailed block diagram of the binary image minutiae and ridge contour detector 110 is shown in FIG. 8. An implementation of the binary image minutiae and ridge contour detector 110 is found in our commonly assigned U.S. Patent application Ser. No. 722,307, filed concurrently, entitled "Binary Image Minutiae Detector" and incorporated herein by reference.

The binary image from the binary data enhancer 108 is serial input to a 256 bit serial-in/serial-out delay register 202 and to a 3-bit serial-in/parallel-out register 206. The output of the 256 bit delay register 202 is fed to a second 256 bit delay register 204 and to a 3-bit serial-in/parallel-out register 208. The output from the second 256 bit delay register 204 is fed directly to a 3-bit serial-in/parallel-out register 209. The three 3-bit registers 206, 208 and 209 from a 3×3 bit scanning window which scans nine bit sampled areas of the enhanced image one bit at a time. The 3×3 window therefore contains bit stream information corresponding to a nine bit sample of three adjacent bits per line on three adjacent lines. Timed with the clock pulses, the 3×3 window scans along the fingerprint pattern one bit by one bit to the end of the line, shifts to the next line and scans along that line.

The nine parallel output signals from the 3×3 window are fed to a 256×2 minutiae detection ROM 212 for the detection of minutia. The minutiae detection ROM 212 is programmed so that if a minutia is present and centered in the 3×3 window, the signals A1–A9 correspond to a minutia address. Each possible address corresponding to a detected minutia in any position, is stored in the 256×2 ROM 212.

FIG. 9 shows twenty-four addresses which are effective to read out, from twenty-four corresponding locations in the ROM 212, a 2 bit value indicating that a bifurcation or ridge ending is detected. $M_1$ and $M_2$ indicate the 2 bit output from the ROM 212. When a bifurcation is detected $M_1=1$ and $M_2=0$. When a ridge ending is detected, $M_1=0$ and $M_2=1$.

In order to reduce the size of the ROM 212 to a 256 bit dimension with 512 address possibilities, ($2^9$), the center bit (A 5) from the 3×3 window is routed to a logic circuit external to the ROM 212, leaving eight address inputs to the ROM 212.

Since the proper location of a bifurcation in a 3×3 window, presents a binary "1" signal at the center bit location (A5) of serial-parallel register 208, the A5 signal from the center location of the register 208 is directly input to an AND gate 216. The combined signal A5 and the M1 ("1") and M2 ("0") signals from the ROM 212, are input to the AND gate 216 to produce an output which is gated through OR gate 218 to provide a minutia detection signal.

When the 3×3 window is centered on a ridge ending, a correct address will appear at the input to the ROM 212 and a binary "1" signal will be read out of the ROM 212 at M2 and a "0" signal will be read out at M1. When a ridge ending is correctly centered in the 3×3 window the A5 signal is a "1" and is directly input to an AND gate 214. The M1 and M2 outputs of the ROM 212 and the A5 signal at the input to the AND gate 214, produce a signal which is gated through the OR gate 218 to produce a minutia detection signal. Therefore, although the A1-A4, A6-A9 address may address a location of the ROM 212 which has a 2 bit value stored therein to indicate a minutiae detection the A5 signal must be a proper binary value to gate the ROM 212 output through the gates 214, 216 and 218 as a minutia detection signal. The minutia detection signal latches two 8-bit latches 213 and 215, which then hold respective X and Y addresses for the detected minutia. The derivation of the Y address corresponds to the number of $C_3$ clock signals from a divider circuit 220, counted by a counter 211. The X address corresponds to the combination of D and F signals from divider circuit 220 and latched by the minutiae detection signal from the OR gate 218.

Now referring to the ridge flow detection section of FIG. 8, a 512×4 ROM 210 is shown which receives the address output from the 3×3 window formed by the serial-in/parallel-out 3-bit registers 206, 208 and 209. The ROM 210 is preprogrammed to read out a specific local angle in accordance with 12 different addresses.

The twelve different addresses symbolizing the various ridge flows through the 3×3 window are shown in FIG. 10. As seen in FIG. 10, twelve different patterns of a single line extending through the 3×3 window result in 12 different addresses. However, since some of the patterns are identical in deriving an angle value indication, the local angle values read out from the ROM 210 total 8 different angle indications. Any other patterns which exist in the 3×3 window are ignored for purposes of identifying ridge flow information and accordingly, zeros are read out from those unprogrammed address locations of the ROM 210. The twelve selected angle values corresponding to twelve addresses to the ROM 210 (subject to ±180° as to four thereof) result in eight coded local angle values ($D_0$-$D_2$). An output E from the ROM 210 provides an enabling signal whenever one of the eight programmed local angle locations in the ROM 212 is addressed. The enable signal E essentially identifies that an angle for which the ROM 210 is programmed has been produced by a particular address input for the values A1-A9 of a given 3×3 window.

Referring again to FIG. 8, dividing circuit 220 supplies various clocking signals as a result of dividing the main clock signals C from the main clock 104 shown in FIG. 2.

The three bit output $D_0$-$D_2$ from the ROM 210 and the $D_3$-$D_7$ clocking pulses, supply an eight bit address through an adder 224 to an input multiplexer 223. Whenever a local angle is output from the ROM 210, the enable bit E is applied to the adder 224 and the corresponding eight bit address present therein is applied to the input multiplexer 223 which alternately applies said eight bit address to either a 256 byte×8 bit RAM 221 or a 256 byte×8 bit RAM 222. The output multiplexer 226 operates in alternate time frames with the input multiplexer 223 such that the data is read into RAM 221 from the multiplexer 223 while data is read out of RAM 222 by the multiplexer 226 for processing. Likewise, data is read into RAM 222 while data stored in RAM 221 is read out and processed. This multiplexing technique is used since the processing rate far exceeds the rate at which data storage occurs in the RAMS 221 and 222 and hence, adequate time is available for the alternating function provided by the multiplexers 223 and 226.

Each of the RAMS 221 and 222, when fully loaded with data from the input multiplexer 223, ultimately stores a count value of the number of occurrences of each of the local angles defined by the output of the ridge ROM 210 for an 8×8 bit window. In this case, the 8×8 bit windows are fixed windows occupying predetermined 8 bit×8 bit portions of the total scan array. This is in contrast to the 3×3 window discussed above, which scans over the entire image one bit by one bit. Therefore, the ultimate objective is to read the local angle information derived by the 3×3 bit window scan and process it to produce a single angular representation which is an average of the ridge lines present in the 8×8 bit window. The accumulation of the number of occurrences of each of the eight possible local angles within the 8×8 bit window provides a basis for achieving a weighted average of those local angles in deriving the contour angle for that particular 8×8 bit window. Whereas each 3×3 bit window represents the local angle of a single scanned ridge line, the 8×8 bit window represents a ridge contour angle value comprising the average of a number of ridge lines which may be present in that larger portion of the scan array.

The D output values ($D_3$-$D_7$) from the divider circuit 220, define each of the 32 (8×8 bit) window locations across a given line scan (256 bits) of the image. The D values, along with the $D_0$-$D_2$ signals defining the local angle, are supplied through the input multiplexer 223 as described above.

Each RAM 221 and 222 stores 256 bytes (8 bit/byte) over eight scanned lines. Therefore, the contents of each RAM represents 32 (8×8 bit) windows. Consequently, each 8×8 bit window is represented by 8 words 8 bits in length, wherein each of the 8 words represents one of eight possible local angles. The D and F signals form an address which accesses each group of eight angles for each of the 32 windows in sequence. For each 8×8 bit window, the corresponding eight angles are accessed by incrementing through the F signals and accumulating the results in register 231 and 232. When the eight angles for each 8×8 bit window are accumulated, the $C_2$ signal processes the results through ROM 246 and the eight bit buffer 247 and resets registers 231 and 232 to be ready for the next 8×8 bit window.

The function of registers 231 and 232 along with their respective adders/subtractors 230 and 233 is to get an approximate average of the sine and cosine projection of the average vector direction. The averaging operation is under control of the processor control ROM 240. The particular addresses from the clocking signal $F_0$, $F_1$ and $F_2$ and corresponding readouts from the ROM 240 are shown below.

TABLE I

| PROCESSOR CONTROL ROM | | | | | | |
|---|---|---|---|---|---|---|
| ADDRESS | | | OUTPUTS | | | |
| $F_2$ | $F_1$ | $F_0$ | $G_1$ | $G_2$ | $G_3$ | $G_4$ |
| 0 | 0 | 0 | 0 | 1 | 0 | 1 |
| 0 | 0 | 1 | 1 | 1 | 1 | 1 |
| 0 | 1 | 0 | 1 | 0 | 1 | 0 |
| 0 | 1 | 1 | 1 | 1 | 1 | 0 |
| 1 | 0 | 0 | 0 | 1 | 0 | 0 |
| 1 | 0 | 1 | 1 | 1 | 0 | 0 |
| 1 | 1 | 0 | 1 | 0 | 0 | 0 |
| 1 | 1 | 1 | 1 | 1 | 0 | 1 |

The output bits $G_3$ and $G_4$ control the adder/subtractor circuits 230 and 233 respectively. If $G_3$ is "1", the adder 230 adds; if G₃ is "0", the adder 230 subtracts. Similarly, G₄ controls the adder/subtractor circuit 233. The other outputs G₁ and G₂ are AND'ed with a clock pulse C₁ and form strobe signals to the adder/subtractors circuits 230 and 233. These strobe signals cause the adder/subtractor circuits to add or subtract in accordance with the control signals discussed above. Therefore, when strobe pulses are not supplied, the output from the multiplexer 226 is ignored by the corresponding adder/subtractor circuit. The five most significant bits of each register 231 and 233 are combined into a ten bit address that is applied to a ROM 246. The function of the ROM 246 is to perform an approximate table look-up arctangent calculation. The contents of a particular location in the ROM 246 comprise the angle associated with the address defined by the sine and cosine projections as output from registers 231 and 232.

The output of the ROM 246 is strobed into the 8 bit buffer register 247 for holding and transmittal to the ridge contour RAM 112 (FIG. 4). The X address is derived upon the occurrence of the clock pulse C₃ entering the data into holding register 249, and similarly, the Y address of the ridge flow data is entered into holding register 257 from the vertical window address counter 248.

As shown in FIG. 4, the ridge contour data including the flow angle and the X-Y address of each flow angle is output to a ridge contour RAM 112. The ridge contour data comprises an 8 bit X address, an 8 bit Y address, and an 8 bit angle value. The ridge contour RAM 112 has dimensions of 38×38 bytes wherein a 3 byte border is provided for a 32×32 byte storage array. The 3 byte border is preprogrammed to a preselected value so as to always represent the absence of data storage in that border. Therefore, the ridge contour data is addressed to the 32×32 byte matrix within the surrounding 3 byte border. The purpose of the border will be shown in the following discussion with reference to the classifier 114.

The classifier 114 is shown in FIG. 4, and serves to define the general classification type for which the scanned fingerprint pattern may be classified. Due to the large number of fingerprints stored in the main file, it is necessary to classify each of the fingerprint patterns in accordance with established rules well known to those skilled in this art. In this embodiment, a classification system has been devised wherein the fingerprint pattern is classified as an ARCH, WHORL or LOOP. Since it is statistically known, that approximately ⅔ of the fingerprint patterns are classified as loop types, in this embodiment the loop is broken down into left and right types of five different size configurations.

FIGS. 12A, 12B and 12C show the fingerprint pattern as it is presented to the scanner, the ridge flow pattern as it is stored in the ridge contour RAM 112, and contour tracings as produced in the classifier for right loop, left loop and whorl classifications, respectively. FIGS. 12A, 12B and 12C are intended to illustrate and summarize the steps that are performed by the system as a preliminary to classifying the fingerprint.

Figure 13:
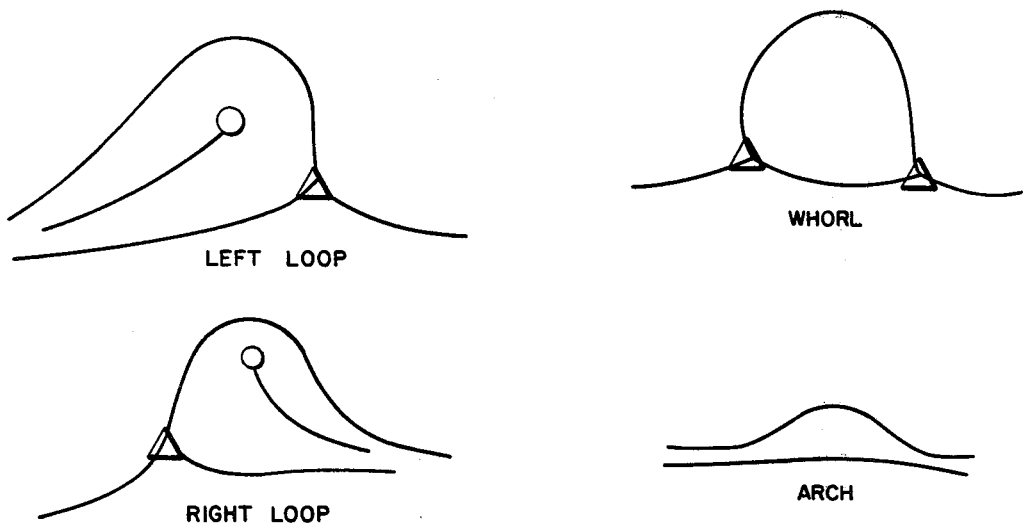
FIG. 13 illustrates simplified examples of pattern classification types.

In FIG. 13, simplified examples of pattern classification types are shown wherein the left loop and right loop are distinguished according to their flow with respect to a single tri-radii point (marked with a delta) and a core point (marked with a circle). The whorl is also shown which is identified by the existence of two tri-radii points. An arch is shown which is defined as a pattern having no tri-radii points therein.

Figure 14:
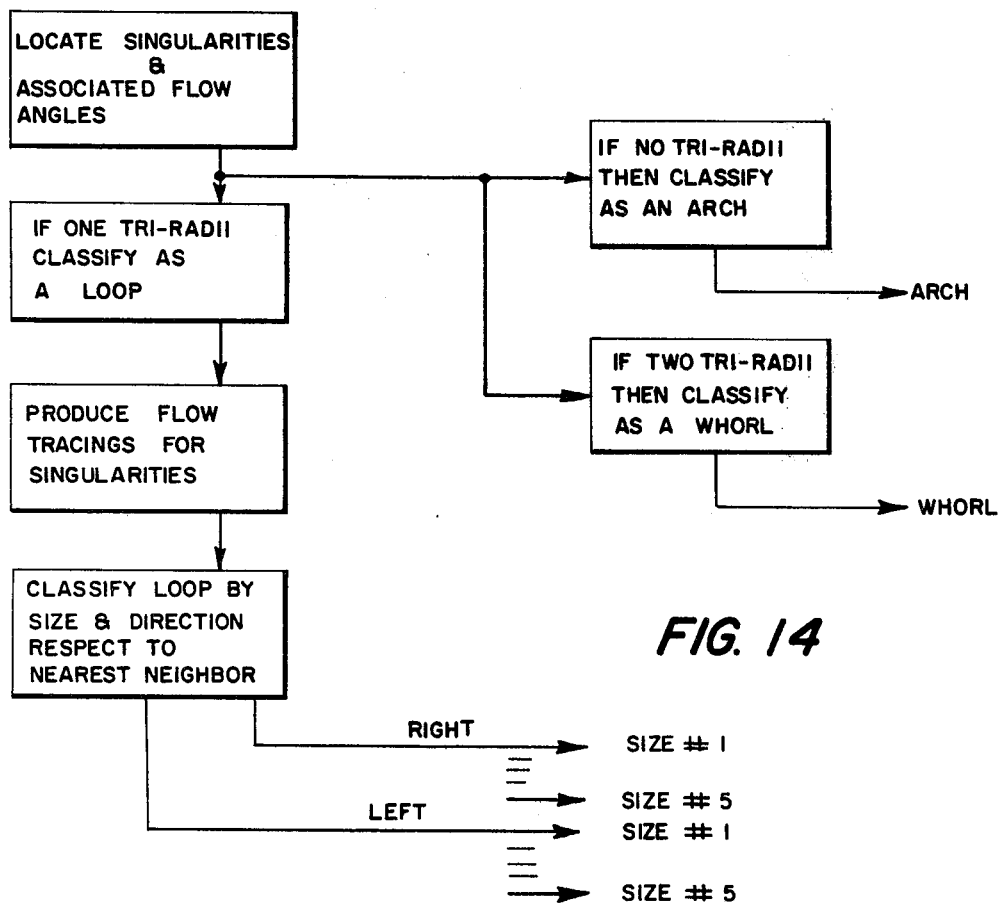
FIG. 14 is a simplified block diagram of the classifier shown in FIG. 4.

FIG. 14 shows a functional flow diagram of the classifier 114. The first function of the classifier is to locate singularities such as cores and tri-radii points and identify the associated flow angles at those points. Correspondingly, a core point will have one associated flow angle, and a tri-radii point will have three associated flow angles. Based upon the number of singularities located, an initial classification can be made wherein an arch type is identified if no tri-radii are located, a whorl may be identified if two tri-radii are located and a general loop type may be identified if one tri-radii is located. However, if the pattern is classified as a loop type, further processing is necessary in order to achieve a further definition of the classification of the loop. In this classification process for the loop, flow tracings are produced along the associated flow angles of each of the located singularities according to the extracted ridge contour data discussed above. The loop type pattern is classified according to direction and size of the flow tracings by comparing them with a set of pre-stored references. The classification information is then output in a four bit word to the main file 116 as shown in FIG. 4.

Figure 11A:
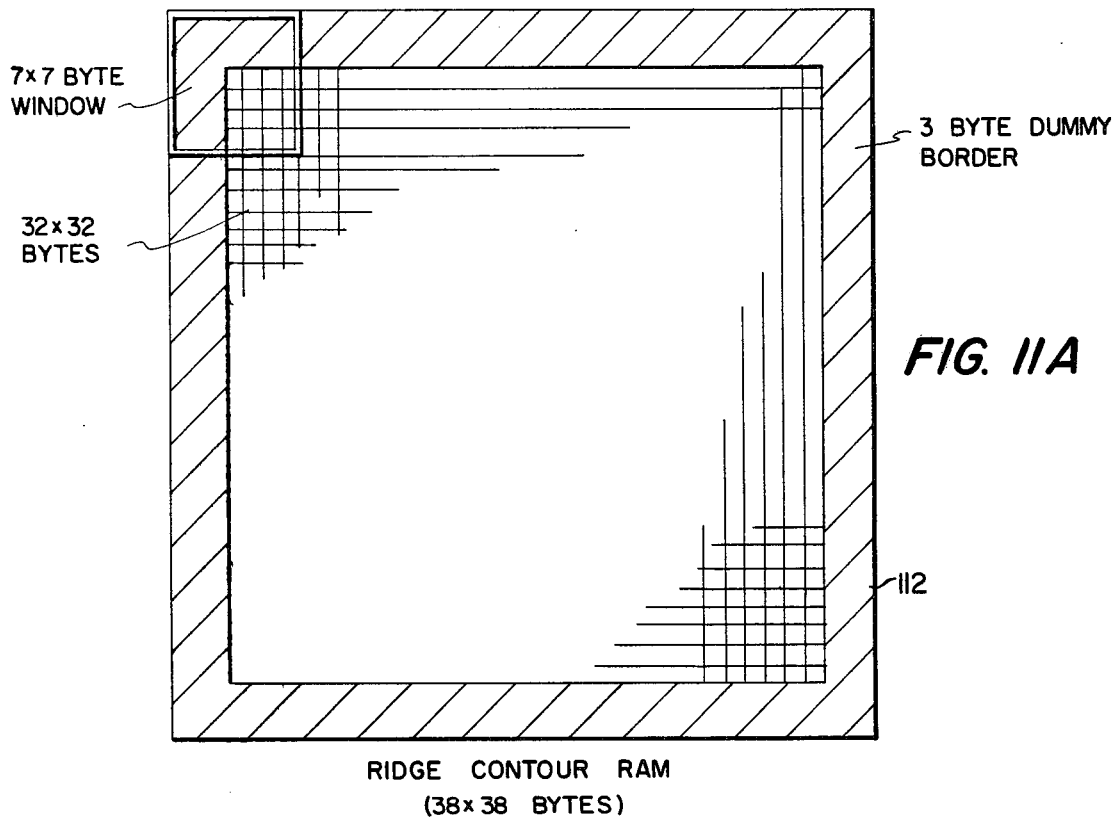
FIG. 11A illustrates a 38×38 byte ridge contour RAM with 32×32 bytes of storage area and a 7×7 byte window.
Figure 11B:
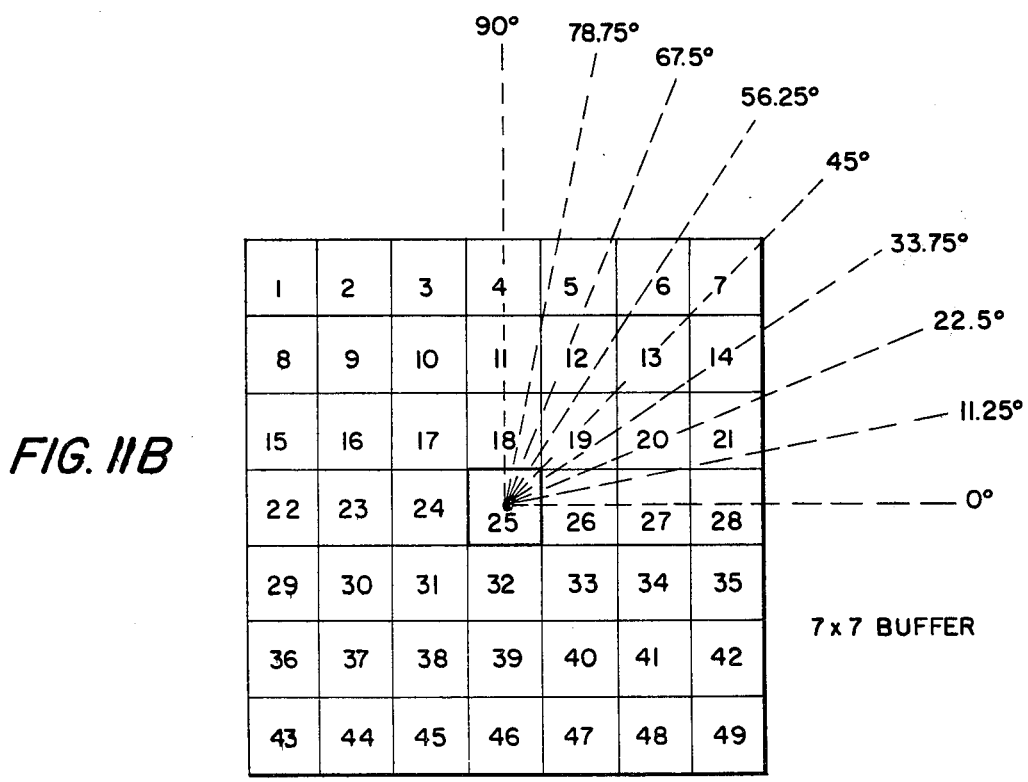
FIG. 11B illustrates a 7×7 buffer used to determine the correlation of reference angles.

In order to locate singularities such as cores and tri-radii points, the ridge contour RAM 112, shown in FIG. 11A, is scanned by a 7×7 byte window to determine the correlation of the average ridge flow in the vicinity of the rigde contour element in the ridge contour RAM 112 centered in the 7×7 byte window with respect to each of 32 reference angles encompassed by the 7×7 byte window (see FIG. 11B). The correlation is measured by computing the cosine of the angular difference between the current reference angle and the average contour angle in the reference direction.

$$C = \sum_{i=1}^{n} \frac{|\cos(\theta_R - \theta_i)|}{n} \quad (1)$$

In equation 1, $\theta_R$ represents the reference direction in which the correlation is being measured; $\theta_i$ corresponds to the contours used for averaging in the $\theta_R$ direction, n is an integer which in the present embodiment is equal to 3, since there are 3 bytes between the center and the edge of the 7×7 byte window. A correlation histogram is computed for each of the 1024 elements stored in the ridge contour RAM corresponding to each occupying the center element position of the 7×7 byte scanning window.

Figures 15A, 15B:
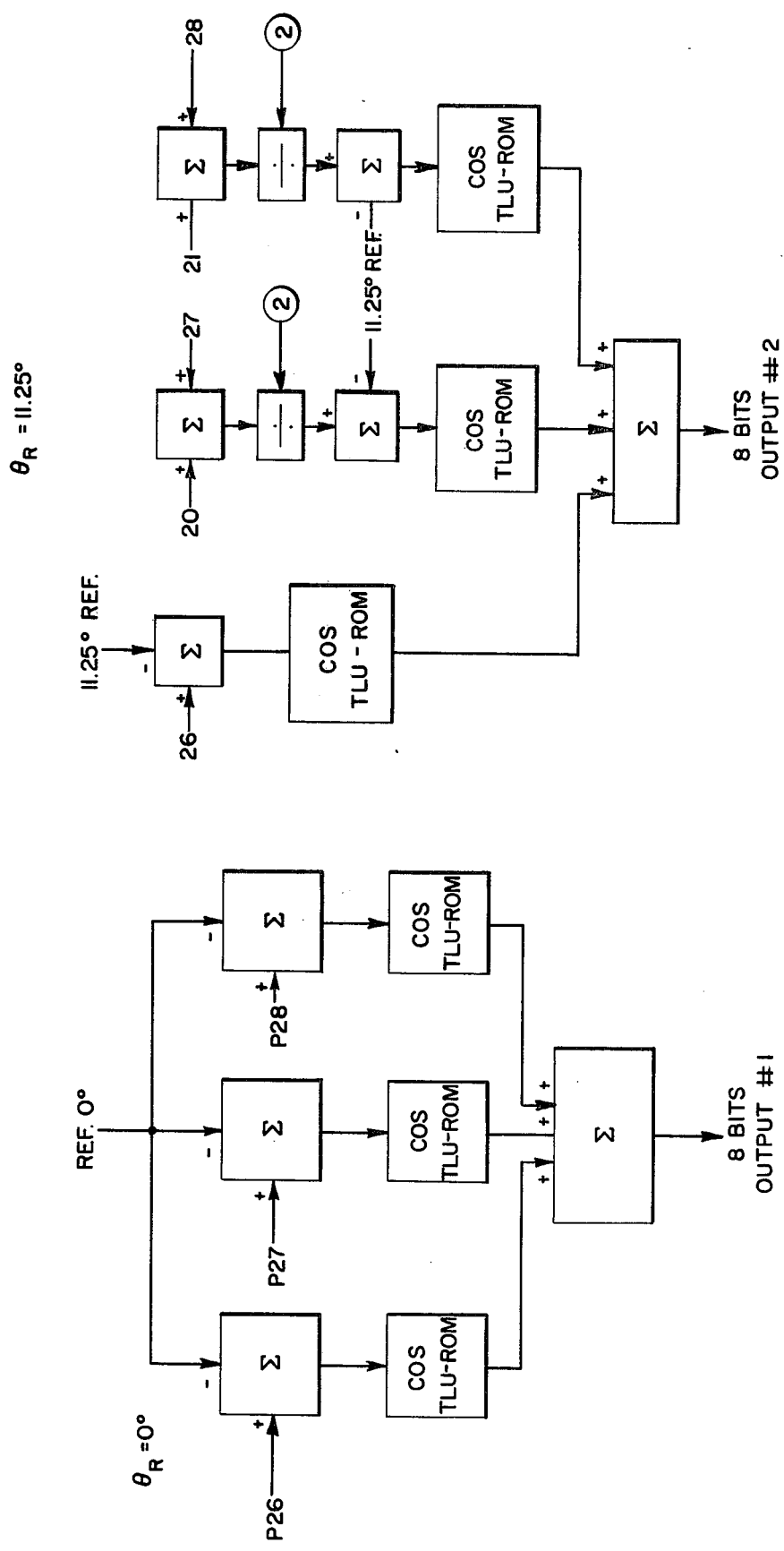
FIGS. 15A, 15B, 15C, 15D and 15E, hereinafter referred to as FIG. 15, presents a detailed block diagram of circuitry used to derive the correlation of the reference angle from the 7×7 buffer shown in FIG. 11B.
Figures 15C, 15D, 15E:
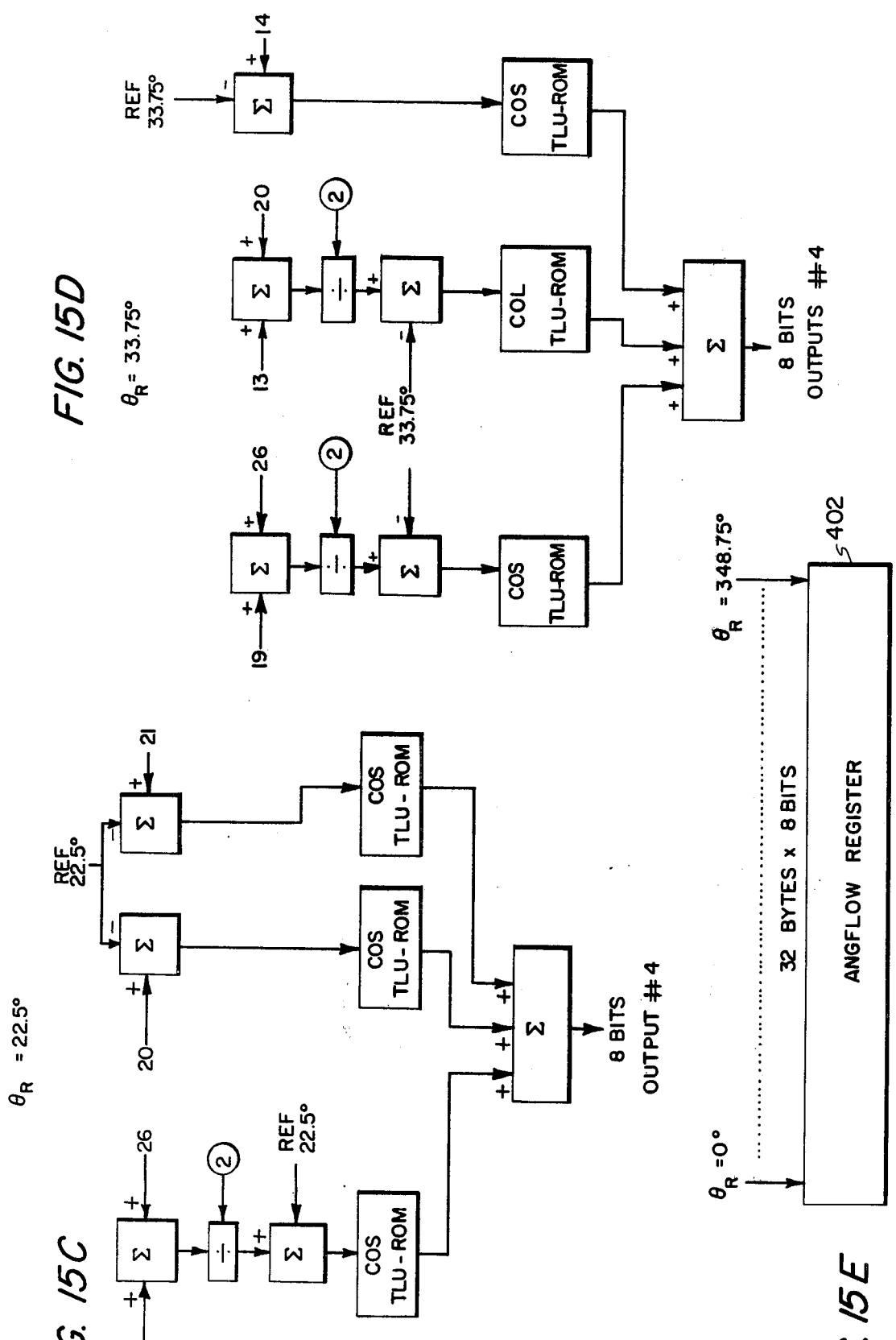

In FIG. 15, four of the 32 angle processing circuits are shown which function to calculate the cosine of the angular difference between the current reference angle and the average contour angle in the reference direction. In the case of $\theta_R = 0°$, each of the values stored in cells 26, 27 and 28 of the 7×7 buffer (FIG. 11B) is subtracted from the reference value for 0°. A cosine "table-lock-up" ROM is utilized to produce a cosine value depending upon the subtracted value. The cosine values for the angular differences are then summed to produce an 8 bit output which is the correlation for $\theta_R = 0°$. Accordingly, circuitry is shown for $\theta_R = 11.25°$, 22.5° and 33.75°. In each of the four circuits, calculations are made to determine 8 bit correlation values for each of the $\theta_R$'s. Since the present system analyzes 32 values of $\theta_R$, it is apparent that the four calculation circuits illustrated in FIG. 15 may be reproduced eight times to yield a total of 32 circuits providing the respective 32 outputs. Accordingly, table II is illustrated below, setting forth the approximate coefficient values used in the corresponding summation legs of each circuit. The indicators in the approximate coefficients columns of Table II, correspond to the cell designations in the 7×7 buffer shown in FIG. 11B.

TABLE II

| $\theta_R$ | APPROXIMATE COEFFICIENTS | | | $\theta_R$ | APPROXIMATE COEFFICIENTS | | |
|---|---|---|---|---|---|---|---|
| 0° | 26 | 27 | 28 | 180° | 24 | 23 | 2 |
| 11.25° | 26 | $\frac{20+27}{2}$ | $\frac{21+28}{2}$ | 191.25° | 24 | $\frac{23+30}{2}$ | $\frac{22+29}{2}$ |
| 22.5° | $\frac{19+26}{2}$ | 20 | 21 | 202.5° | $\frac{24+31}{2}$ | 30 | 29 |
| 33.75° | $\frac{19+26}{2}$ | $\frac{13+20}{2}$ | 14 | 213.75° | $\frac{24+31}{2}$ | $\frac{30+37}{2}$ | 36 |
| 45° | 19 | 13 | 7 | 225° | 31 | 37 | 43 |
| 56.25° | $\frac{18+19}{2}$ | $\frac{12+13}{2}$ | 6 | 236.5° | $\frac{32+31}{2}$ | $\frac{38+37}{2}$ | 44 |
| 67.5° | $\frac{18+19}{2}$ | 12 | 5 | 247.5° | $\frac{32+31}{2}$ | 38 | 45 |
| 78.75° | 18 | $\frac{11+12}{2}$ | $\frac{4+5}{2}$ | 258.75° | 32 | $\frac{39+38}{2}$ | $\frac{46+45}{2}$ |
| 90° | 18 | 11 | 4 | 270° | 32 | 39 | 46 |
| 101.25° | 18 | $\frac{11+10}{2}$ | $\frac{3+4}{2}$ | 281.25° | 32 | $\frac{39+40}{2}$ | $\frac{46+47}{2}$ |
| 112.5° | $\frac{18+17}{2}$ | 10 | 3 | 292.5° | $\frac{32+33}{2}$ | 40 | 47 |
| 123.75° | $\frac{18+17}{2}$ | $\frac{10+9}{2}$ | 2 | 303.75° | $\frac{32+33}{2}$ | $\frac{40+41}{2}$ | 48 |
| 135° | 17 | 9 | 1 | 315° | 33 | 41 | 49 |
| 146.25° | $\frac{17+24}{2}$ | $\frac{9+16}{2}$ | 8 | 326.25° | $\frac{33+26}{2}$ | $\frac{41+34}{2}$ | 42 |
| 157.5° | $\frac{17+24}{2}$ | 16 | 15 | 337.5 | $\frac{33+26}{2}$ | 34 | 35 |
| 168.75° | 24 | $\frac{16+23}{2}$ | $\frac{15+22}{2}$ | 348.75° | 26 | $\frac{34+27}{2}$ | $\frac{35+28}{2}$ |

Employing the 32 circuits as exemplified in FIG. 15, and employing the cell values as indicated in Table II, the correlation calculation is automatically derived according to equation 1. Accordingly, a 32 byte correlation histogram, coresponding to the 32 angles of reference, is produced for each center element of the 7×7 window. Outputs #1, 2, 3, 4 . . . 32 are output from the circuits exemplified in FIG. 15, in parallel to the ANGFLOW register 402, shown in FIGS. 15 and 17.

Figure 16B:
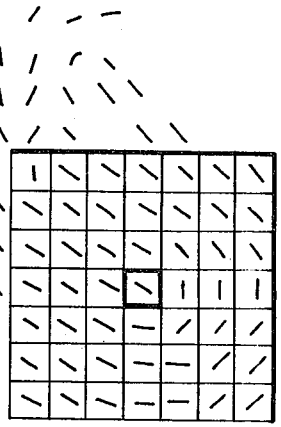
FIGS. 16A, 16B and 16C, hereinafter referred to as FIG. 16, indicate examples of the ridge flow data in a 7×7 window for a non-singularity point, a tri-radii point, and a core point along with the correlation determination as a result of the calculation performed by the circuitry shown in FIG. 15.
Figure 16C:
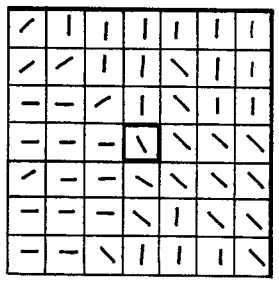
Figure 16A:
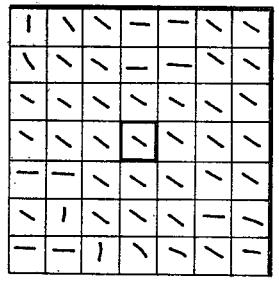

FIG. 16 shows representations of the 7×7 byte window at non-singularity, tri-radii and core points of the ridge contour data. FIG. 16 also indicates the correlation histogram showing two peaks in the correlation values at particular reference angles, which would be present in the ANGFLOW register 402, for a detected non-singularity; three peaks for a detected tri-radii point; and one peak for a detected core point. The 7×7 byte window is scanned one byte by one byte over the 32×32 matrix of the ridge contour data. At each center position of the 7×7 byte window, a histogram of the correlation is derived, as described above, according to the 32 radial lines corresponding to the 32 values of $\frac{1}{4}R$. Therefore, up to 1024 complete sets (histograms) of correlation data is generated by the scan of the 7×7 window over the 32×32 ridge contour array.

Figure 17A:
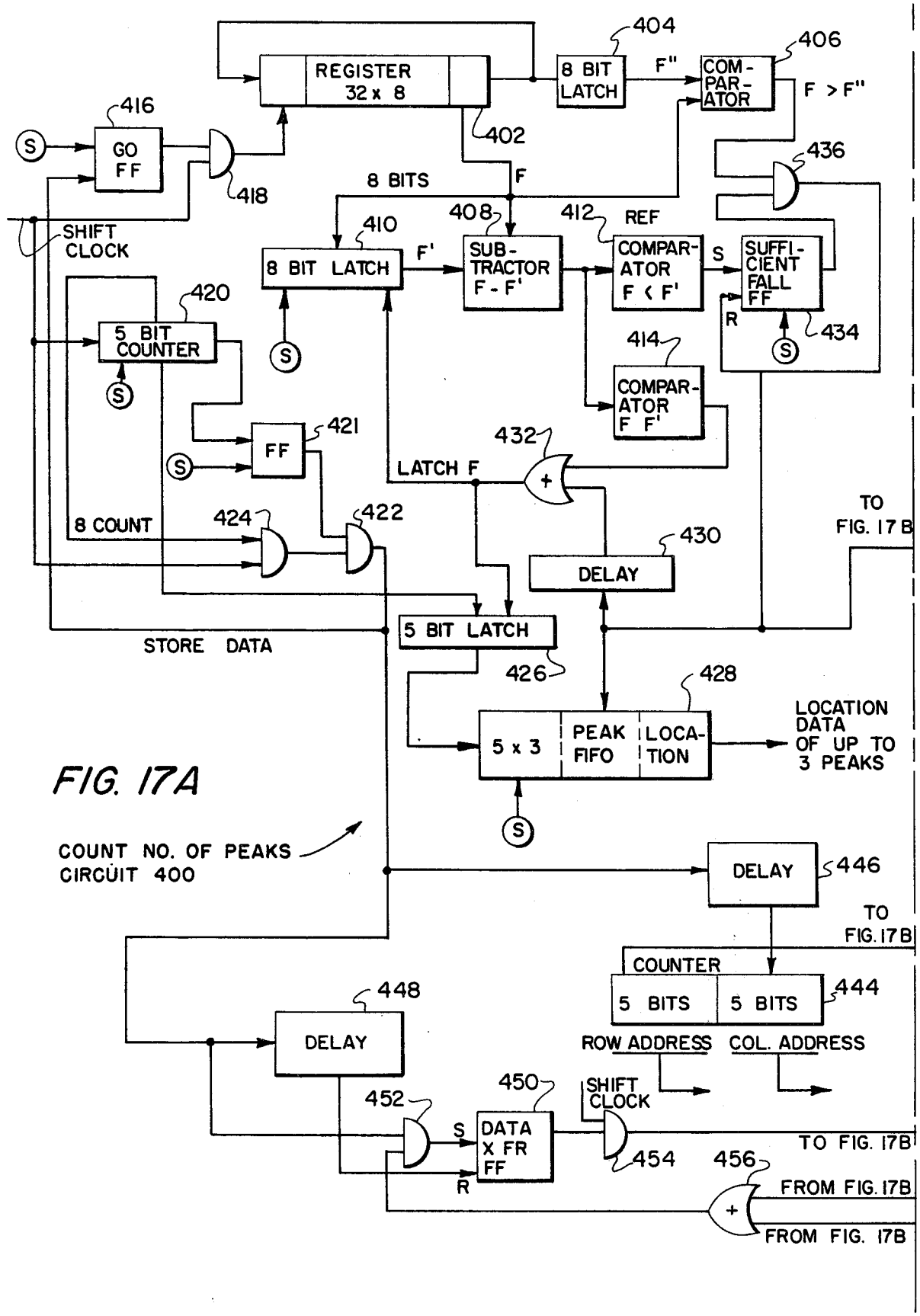

A Count No. of Peaks Circuit 400 is shown in FIG. 17. In this circuit, the number of peaks in each set correlation data resulting from the previous scan of the 7×7 byte window is determined for each of the 32×32 (1024) positions. The corresponding number of peaks is then stored in a number of peaks array RAM 440 having a 32×32 dimension with 2 bits/position. Angle values corresponding to the peaks detected at each location are stored in a location of peaks array RAM 442 having a dimension of 3×32×32 bytes with 5 bits per byte.

The count No. of peaks circuit 400 requires the recognition of the occurrence of a peak. The occurrence of a peak is determined by comparison of successive ones of the 32 values stored in the ANGFLOW register 402.

In order to determine the occurrence of a peak, the count No. of peaks circuit 400 stores the highest ordered value and then examines the decreasing values of successive measurements until such time as the values begin increasing. At that point, the circuit determines if the prior highest ordered value was a peak and if so, it is suitably stored with a corresponding identification of its location. The criterion for determining the peak requires that the fall-off value from the peak value exceed some predetermined threshold and that the values again start to increase subsequent to the fall-off.

The 32 stage ANGFLOW shift register 402 has a recirculation loop to permit shifting 40 times, thereby to achieve a wrap-around analysis of the data, sufficient to fully analyze the increasing or decreasing trends of the 32 values.

An initializing pulse S initiates a GO flip-flop 416 and enables AND gate 418 to gate through 40 shift clock pulses to the shift register 402. The F output is a current value 8 bits in length which is fed to an 8 bit latch 410 and a subtractor 408. The 8 bit latch is either at an initialized value or a prior value which has been latched. The value stored in the 8 bit latch 410 is designated as F' and is subtracted from the current value F in the subtractor 408. A comparator 414 produces a signal whenever the current value F is greater than the value F' stored in the 9 bit latch 410. The output of the comparator 414 is fed through an OR gate 432 and functions as a latching signal to command the 8 bit latch 410 to store the current value F whenever it is greater than the prior value F' stored in the latch 410. This provides a trackup function wherein the highest value of F is stored and compared with the next value in sequence. It should also be pointed out at this point that the F values are 8 bits in length and therefore range in amplitude from 0 to 255 units.

A comparator 412 for determining if F is less than F' has a reference threshold value of 64 (REF) which represents ¼ of the maximum amplitude range. Therefore, if the difference between the current value F and the value F' is greater than 64, the comparator 412 generates an output to a sufficient-fall flip-flop 434 to indicate that F' stored in latch 410 is a "peak" value.

An 8 bit latch 404 stores each current value as it is presented at the output stage of the shift register 402. The value output from the 8 bit latch 404 is designated as F" in correspondence to the value immediately preceding the current value F. A comparator 406 compares the current value F and the immediately preceding value F" and produces an output whenever F is greater than F". The output from the comparator 406 is fed to one input of AND gate 436 and the output from the sufficient-fall flip-flop 434 is fed to a second input of the AND gate 436. When the current value F is greater than the immediately preceding value F", it indicates that the sequential values are starting to increase. If the sufficient-fall flip-flop 434 has produced an output, indicating that a peak has been passed, the output of the comparator 406 will indicate that the values which were descending subsequent to the detection of the peak, have reached their lowest point and are now starting to increase again. The combination of the output of the comparator 406 and the output of the sufficient-fall flip-flop 434 produce an output from the AND gate 436 which causes the sufficient-fall flip-flop to be reset and latches the FIFO 428 to store the reference angle location of the peak having a value F'.

The location of the value of F' is stored in the 5 bit latch 426. As each shift clock is received by the shift register 402, a 5 bit counter 420 counts the shift clock pulses. The output of the 5 bit counter 420 is fed to the 5 bit latch 426. When the latch signal produced by the OR gate 432 is fed to the 8 bit latch 410 to latch in the F' value, that latch signal is also fed to the 5 bit latch 426. Therefore, the location of each F' value stored in the 8 bit latch 410 is stored in the 5 bit latch 426. The FIFO 428 has a capacity of storing three peak locations 5 bits in length (designating locations of 0 to 31).

The output from the AND gate 436 is also fed through a 1 bit delay circuit 430 and the OR gate 432 to latch the new F value into the 8 bit latch 410 to become the new F' value. That function erases the previous F' value which was determined to be a peak and substitutes a new value to which subsequent F values will be compared to determine any subsequent peak.

In order to perform an adequate identification of peaks, it is necessary to wrap-around process the information in the shift register 402. Therefore, the output from the shift register 402 is fed back to the input and the first 8 values are again processed, following the 32nd value. In all, 40 values are processed to determine the number of peaks in the register 402 and their corresponding locations. In order to achieve the wrap-around function, the flip-flop 421 receives an output from the 5 bit counter 420, which is set when the 5 bit counter 420 counts through 31 and thus enters the second cycle of counting. The flip-flop 421 supplies an output to an AND gate 422 and receives a second signal from AND gate 424 which is enabled by the 8 count ($2^3$) output of the five bit counter 420. Therefore, when a count of 8 clock pulses is obtained, the AND gate 422 is enabled by the flip-flop 421 sending a "Store Data" signal which resets the GO flip-flop 416. This, of course, terminates the continued recirculation of the shift register 402 and concludes the wrap-around processing of the 32 values in the shift register 402 to determine the number of peaks and their reference angle locations.

A 2 bit up-down counter 438 receives the output from the AND gate 436 whenever a peak is detected, counts up by one bit for each detected peak and freezes at a maximum of 3. The output from the counter 438 supplies the number of peaks data to a 32×32 RAM 440, which is called the "No. of Peaks Array". Each storage position of the No. of Peaks Array 440 can store 2 bits to binarily store a value of 0–3.

A 3×32×32 RAM 442 labeled a "Location Peaks Array" is capable of storing 5 bits/position and stores in the corresponding position the 5 bit reference angle location identification of the from 1 to 3 peaks stored in the No. of Peaks Array 440. The Store Data signal from the AND gate 422 which is used to reset the GO flip-flop 416, also serves to command storage in the RAMs 440 and 442. The counter 444 serves to monitor the successive 32×32 positions of the 7×7 byte scanning window to thereby identify each position of that window and supply the corresponding row and column addresses to the RAMs 440 and 442. The output from the two-bit up-down counter 438 is output to an OR gate 456 which provides a "true" signal when the number of peaks is more than 0. The output from the OR gate 456 enables the AND gate 452 to set the data transfer flip-flop 450 when the Store Data signal from the AND gate 422 is produced. When the data transfer flip-flop 450 is set, an AND gate 454 is enabled thereby and gates through shift clock pulses for storing the angle data at the address for the given column and row of the 7×7 byte window position, in accordance with whatever number of peaks have been detected. That information as currently stored in peak location FIFO 428, in each of its three sections, is written into the appropriate position of the location peaks array 442.

A delay time thereafter, i.e., after the Store Data signal, a shift clock resets the data transfer flip-flop 450 and also increments the 10 bit address counter 444 to correspond to the next position of the 7×7 byte window for determining the number of peaks at that next position. In sequence, each of the 32×32 positions of the 7×7 byte window are processed to determine the number of peaks present at each location and the reference angle location of each of the peaks with respect to the 7×7 byte window.

The overflow bit from the counter 444 is fed to and sets a masking-in process flip-flop 458. The set flip-flop 458 enables AND gate 460 and gates through shift clock pulses designated $S_M$ (masking shift pulses). The masking circuit is shown in detail in FIG. 18.

The masking circuit shown in FIG. 18, performs both a background editing function, by inserting a "0" in each position of the No. of peaks array that has been determined as the "background" of the fingerprint pattern and output from the 1-dimensional local thresholding circuit shown in FIG. 7, and a non-singularity point removal function.

The fingerprint background data from the voltage discriminator 58 in FIG. 7, is input to a 32 position multiplexer 501 as shown in FIG. 18. An 8 bit counter 503 outputs its five most significant bits as an address to the 32 position multiplexer 501. Therefore, each position of the 32 position multiplexer corresponds to 8 bits of the 256 bits in a single line scan of the fingerprint pattern. Therefore, if a "1" is output from voltage discriminator 58, which corresponds to a single bit of background data, the multiplexer 501 will correspondingly set a "1" in one of 32 positions in a 32×1 shift register 507. For each 8 bits of scan on the fingerprint pattern, the 32 position multiplexer 501 correspondingly shifts the fingerprint background data into different stages of the shift register 507. When the 8 bit counter 503 produces a carry, a 3 bit counter 505 counts up by 1 bit. When the 8 bit counter 503 produces 8 carry signals, the 3 bit counter 505 produces a single carry signal. The carry output signal from the 3 bit counter 505 corresponds to 8 scanned rows of the fingerprint pattern. The carry output signal from counter 505 then causes storage of the values from the shift register 507, which is a parallel-in, parallel-out register. The aforesaid combination of multiplexer 501, shift register 507, 8 bit counter 503 and 3 bit counter 505 effectively reduce a 256×256 scan into a 32×32 array of information. In the present case, when 8 rows of the fingerprint pattern have been scanned, each of the 32 positions in the shift register 507 then correspond to 32 (8×8) windows. If a "1" appears in any 8×8 bit window, that corresponding bit location in the 32×32 RAM 504 is occupied by "1".

At the end of each eight rows of scan, the 3 bit counter 505 through its carry output signal causes parallel storage of the "1"'s or "0"'s from the 32 position shift register 507 to be read into the corresponding one of the 32 rows of the 32×32 fingerprint pattern location array (RAM) 504.

Since "1"'s are stored in those positions of the fingerprint pattern location array 504 where the fingerprint pattern is not located (background area) and "0"'s are located in those positions where the fingerprint pattern is located, simultaneous addressing of the No. of peaks array 440, shown in FIG. 17, and the fingerprint pattern location array 504, is effective to eliminate any erroneous data which may be stored in the No. of peaks array 440 outside the fingerprint pattern area. This procedures serves to enhance the information stored in the No. of peaks array 440 by masking out peaks which may have been erroneously identified in the background area surrounding the fingerprint pattern.

The circuit performing the above procedure shown in FIG. 18 is also effective to mask out from the fingerprint pattern, all locations which indicate "2" peaks (non-singularities). This function leaves only clusters of peak values in the No. of peaks array which number "1" or "3" peaks within the detected fingerprint area, indicating corresponding detection of cores and tri-radii points.

Referring to FIG. 18, the fingerprint pattern location array 504 (a 32×32 RAM) and the No. of peaks array 440 are simultaneously addressed by the 10 bit address counter 502. The data read from the No. of peaks array 440 is analyzed by gate circuit 506 and if a number "2" is detected, an OR gate 508 gates through a "0" back to the No. of peaks array position determined by the address from the 10 bit counter 502. This eliminates all non-singularity detections which are stored in the No. of peaks array 440.

The fingerprint pattern location array 504 has "1"'s stored therein where the bright background surrounding the fingerprint pattern is located and "0"'s where the fingerprint pattern is located. The "1"'s read out from the fingerprint pattern location array 504 from their corresponding addressed positions, also cause a "0" to be gated through the OR gate 508 to be read into the No. of peaks array 440 at the corresponding address location. Typically, in a 32×32 array wherein a core and tri-radii are detected, the resulting contents of the No. of peaks array 440 will appear as clusters, as are shown in FIG. 19.

Figure 19:
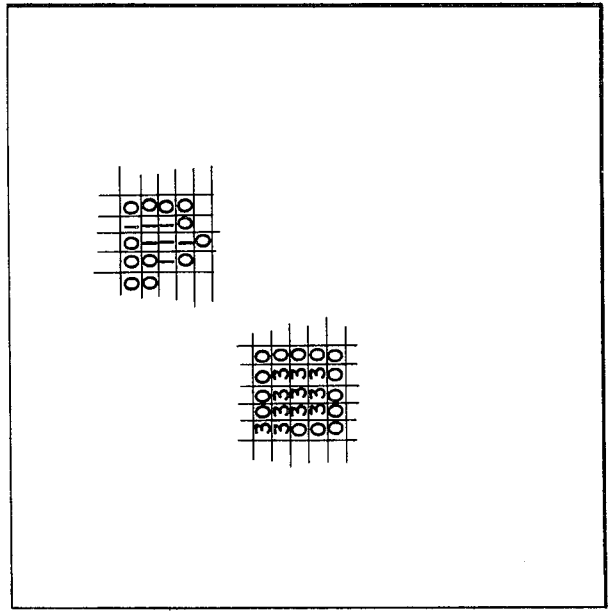
FIG. 19 is a conceptual view of a No. of peaks array after masking by the circuitry shown in FIG. 18.

In FIG. 19, results of the masking function are shown wherein those areas which before masking may have indicated two peaks representing the detection of non-singularities, or background area, now contain "0"'s. Those positions of the array which indicated "1" or "3" peaks remain. Therefore, in the example shown in FIG. 19, a single tri-radii cluster of "3"'s and a single core point cluster of "1"'s have been detected.

Following the masking step, the clusters must be "thinned" in order to eliminate any spurious "3"'s or "1"'s which may erroneously appear in the No. of peaks array 440 outside of the clusters, and also to reduce the size of the clusters to a single coordinate position in the array.

Figures 20, 21:
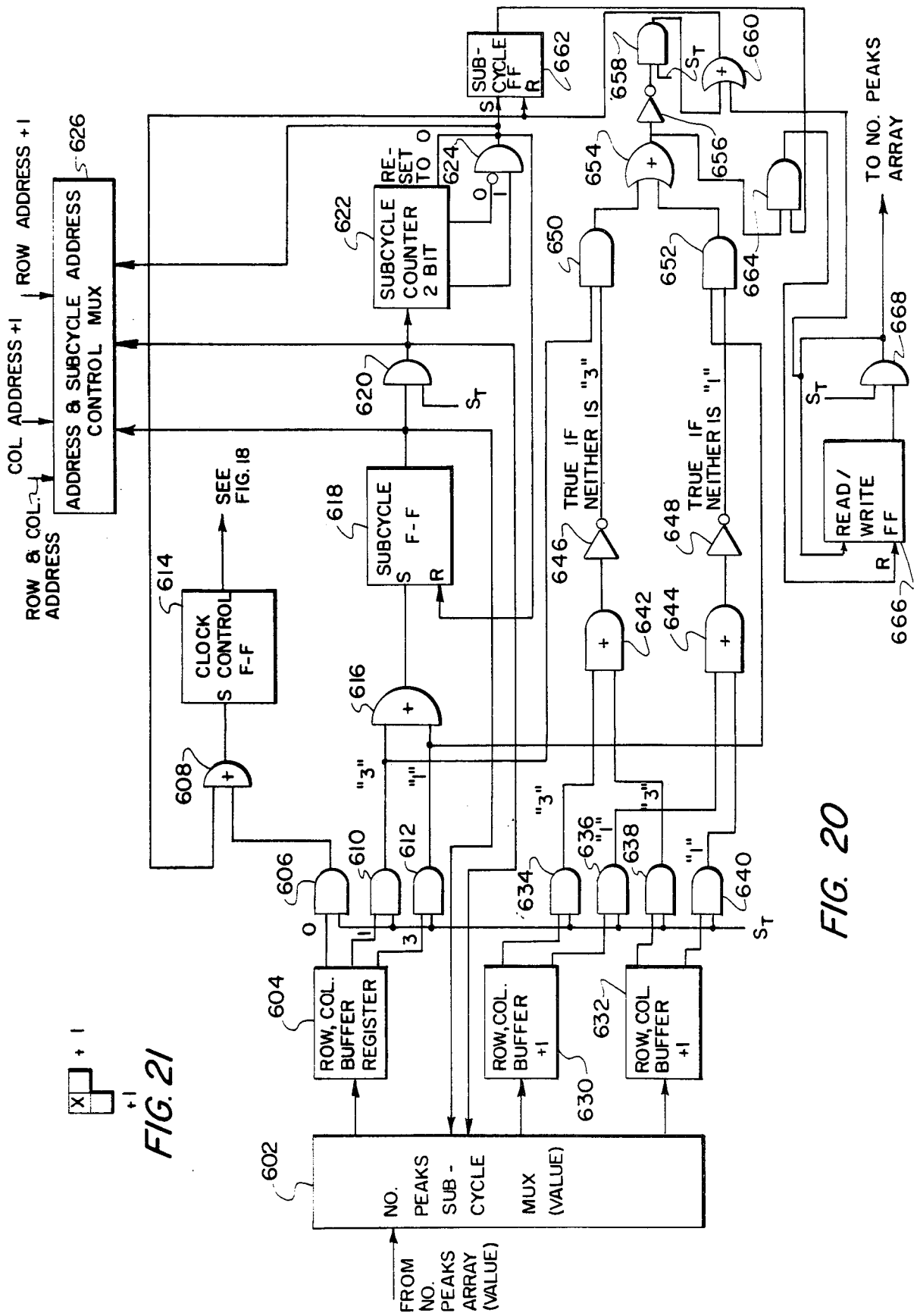
FIG. 20 is a detailed block diagram of a circuit for enchancing by thinning the clusters of peaks in the No. of peaks array as shown in FIG. 19.
FIG. 21 illustrates three scanning cells used in the cluster thinning operation of the circuit shown in FIG. 20, during scans of the data in the No. of peaks array.

Cluster thinning can be visualized by scanning along the 32×32 No. of peaks array 440 with three position sampling windows depicted in FIG. 21. The circuit for performing the cluster thinning is shown in FIG. 20 and is referred to as a three cell processor. The three cells for the three cell processor comprise a central cell (marked with an "X" in FIG. 21), an adjacent cell having a row plus one address and an adjacent cell having a column plus one address. As the three cells are scanned (left to right and top to bottom), the values in the three cells are compared. As long as either of the two cells, which are adjacent to the central cell, has the same value as the central cell, the central cell retains its value at that position, if not, the position corresponding to the location of the central cell is set to "0" (i.e., if one or both the adjacent cells are different than the central cell, the central cell value is set to "0".) This results in an array in which the clusters of "1"'s and "3"'s are enhanced and eliminates any erroneous values of "1" or "3" which are not in a cluster.

A 12 bit counter 518 having two 5 bit sections with a 2 bit overflow stage provides for 3 cycles of the 12 bit counter 518. When the third cycle is completed, an AND gate 520 receiving the 2 bit counter output (binary 3) generates and END pulse which resets a thinning-in process flip-flop 510. The thinning-in process flip-flop 510 was originally set by the overflow bit from the 10 bit counter 502 at the termination of the masking function.

In order to achieve the desired results in the 3 cell processor, the output from the No. of peaks array 440 is supplied to a "number of peaks subcycle" multiplexer 602, shown in FIG. 20. The output from the No. of peaks array 440 is the actual value of the number of peaks at the current position of the central cell of the 3 cell processor. That value is supplied from the multiplexer 602 to the "row, column buffer register" 604. If the value from the multiplexer 602 is "0", the gate 606 produces a signal to an OR gate 608 which shifts the clock control flip-flop 614, shown in FIG. 18. The clock control flip-flop 614, when set, enables an AND gate 616 to pass a shift clock pulse through AND gate 512 which receives the output from the thinning-in-process flip-flop 510. The AND gate 512 then enables the AND gate 514 which receives the further input condition (inverted) from a subcycle flip-flop 618 (to be discussed later). The output from the AND gate 514 is gated through an OR gate 516 and advances the 12 bit counter 518 which serves to address the No. of peaks array 440 and shift the central cell to the next position of the No. of peaks array 440. Thus, a detection of a "0" peak value causes immediate advancement of the 3 cell processor to the next position of the No. of peaks array.

Referring again to FIG. 20, if the output from the row, column buffer register 604 is either a "1" or a "3" value, corresponding AND gates 610 or 612 gate signals to OR gate 616 which result in a "set" input to a subcycle flip-flop 618 to initiate a subcycle mode. The subcycle flip-flop 618 output enables an AND gate 620 which gates a shift clock pulse $S_T$ which is derived at the output of AND gate 512, as shown in FIG. 18.

The shift clock $S_T$ is gated through AND gate 620 and sets the 2 bit subcycle counter 622 to a count of 1. (Although a two bit counter is shown, it is gated so that it resets at a count of 2. A 1 bit counter could also be used.) The 2 count is gated through AND gate 624 to reset the subcycle counter 622 and also reset the subcycle flip-flop 618. Simultaneously, the output of 624 is applied to the "address" and subcycle address control multiplexer 626. The multiplexer 626, then in timed sequence, develops two addresses for the two other comparison cells of the three cell processor. The first address is derived from the row address value of the 5 bits of the 12 bit counter 518, shown in FIG. 18, and the column address value from the +1 column adder 532. The second address is derived from the 5 bit column address of the 10 bit counter 518 and the row address from the +1 row adder 530.

The time multiplexing of the readout of the 3 adjacent cells of the No. of peaks array is then performed by the No. of peaks subcycle multiplexer 602. That multiplexer, in timed sequence, receives those values from the addressed positions of the two adjacent cells and the No. of peaks array 440 and places them in corresponding buffers 630 and 632. At the point, the values of the central cell and the two adjacent cells of the 3 cell processor are in corresponding ones of the three output buffers 604, 630 and 632. The logic network at the output of the buffers compares for the "1" or "3" values of the central cell (stored in buffer 604) as to whether either of the values stored in buffers 630 or 632 is a corresponding "1" or "3" respectively. If a "3" is detected by either or both of the row column buffers 630 or 632, signals are gated through respective AND gates 634 or 638, and are gated through an OR gate 632. If neither of the values in the row, column buffer 630 or 632 are "3" a true signal is generated at the output of the inverter 646 and applied to the AND gate 650. The second input to the AND gate 650 serves to compare the value from the row, column buffer 604. If neither of the adjacent cells contain a value of "3" and the value in the central cell is "3", the AND gate 650 gates a signal to OR gate 654.

Identical comparison of the "1" value in the adjacent cells is made by AND gates 636, 640 and 652 in conjunction with OR gates 644 and inverter 648.

If a true adjacent signal is output from the inverter 646, indicating that neither of the adjacent cells contains a "3" value, the AND gate 650 is enabled. Likewise, the AND gate 652 is enabled if neither of the adjacent cells contains a "1" value. Either of these outputs from the AND gates 650 and 652 enable the OR gate 654 which enables AND gate 654 to cause a read/write flip-flop 666 to write a "0" into the corresponding central cell position in the No. of peaks array 440. The read/write flip-flop 666 shown as a normally "read" flip-flop, is toggled off by the AND gate 664, into a reset condition to produce a true output for the "write" function. The AND gate 668 then gates through a shift clock $S_T$ to cause writing of a "0" into the No. of peaks array 440 at the central cell position corresponding to that position addressed by the 12 bit counter 518.

The output from the OR gate 654 is inverted by the inverter 656 to enable an AND gate 658 to clock through a shift clock pulse $S_T$ to an OR gate 660. The OR gate 660 also is connected to receive the output from the AND gate 668. Either input will cause the OR gate 660 to provide a reset signal to the subcycle complete flip-flop 662 and supply a signal to the OR gate 608. The effect of the output of the OR gate 660 is to cause the clock control flip-flop 614 to advance the 12 bit counter 518 to address the next successive cell. The above process is repeated three times over the 32×32 matrix of the No. of peaks array 440. It has been found that three repeated processes is effective for enhancing the number and sizes of peak clusters normally encountered in fingerprint patterns by thinning the clusters and eliminating spurious "1's" and "3's" which may appear due to noise.

Upon the masked array being thinned by the 3 cell processor, the compact clusters of "3's" and/or "1's" present in the No. of peaks array 440 are scanned to select out, of each cluster, the most representative or central cell position for the respective "3's" and/or "1's" clusters.

Figure 22A:
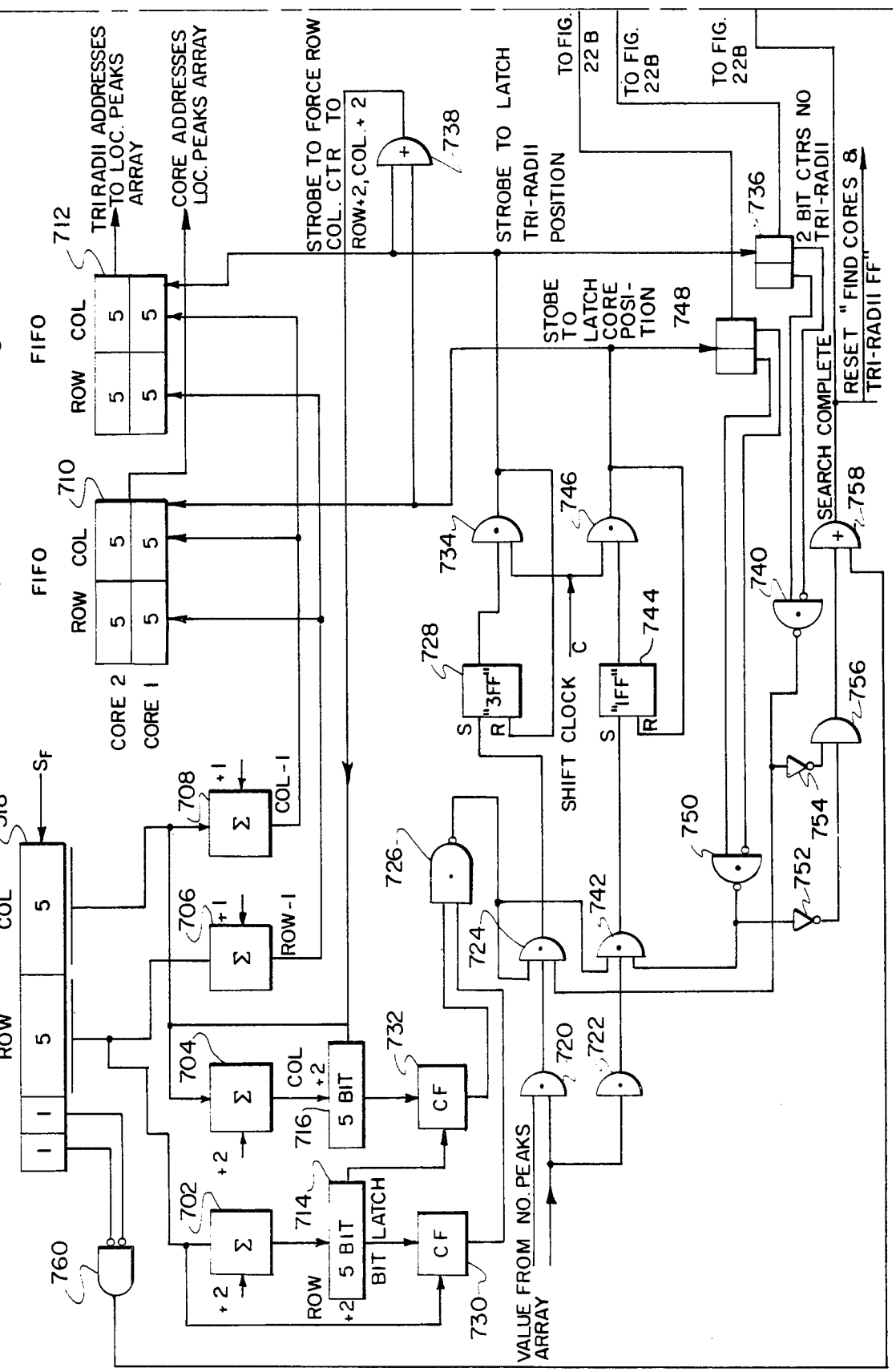
FIGS. 22A and 22B, hereinafter referred to as FIG. 22, present a detailed block diagram of a circuit for locating and assigning X, Y addresses to detected core and tri-radii points enhanced by the thinning operation performed by the circuit shown in FIG. 20.
Figure 22B:
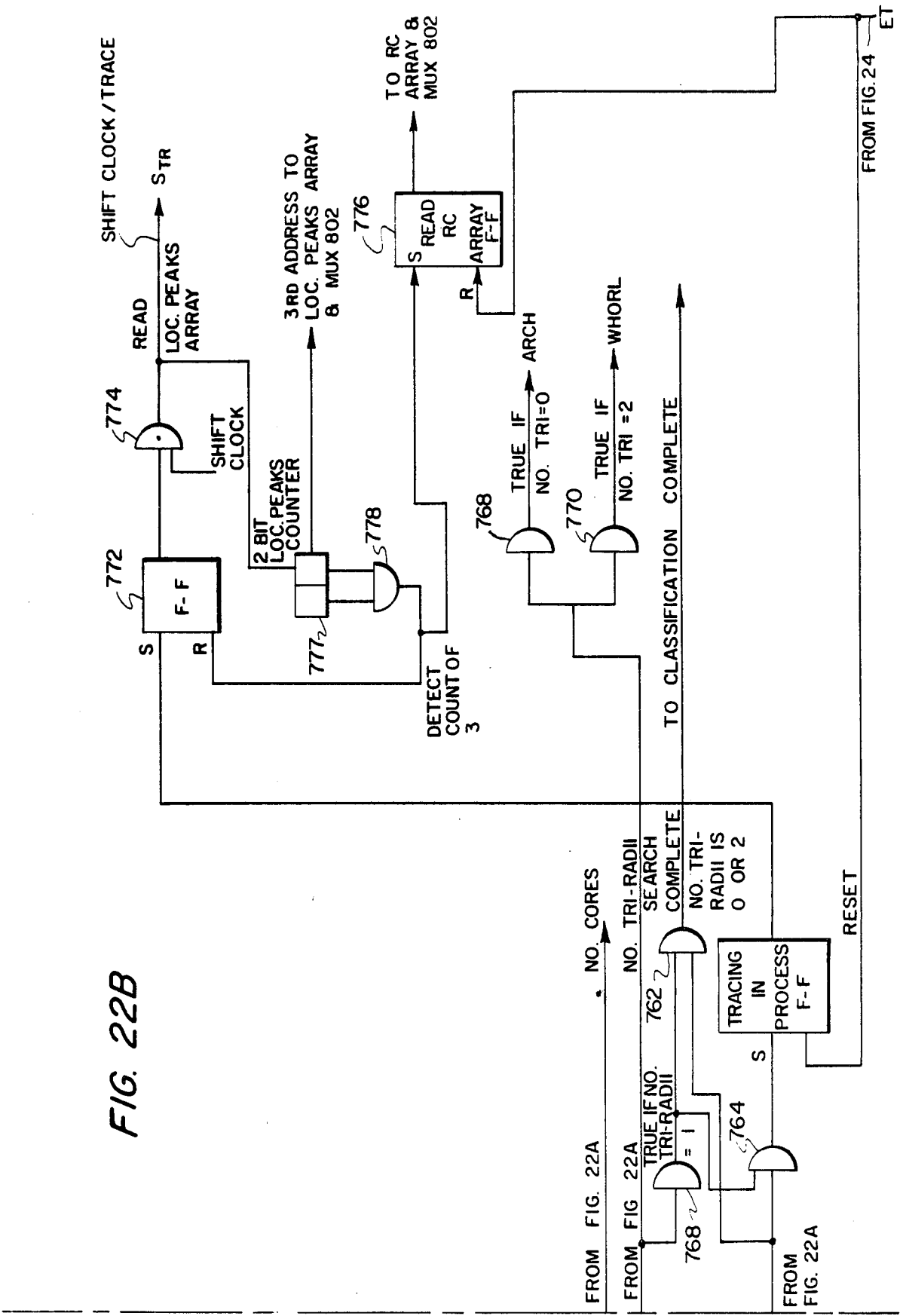

Referring to FIGS. 18 and 22, when the thinning-in-process flip-flop 510 is reset, a "find cores/tri-radii-in-process" flip-flop 540 is set and enables AND gate 542 to gate shift clock pulses and generate "find" shift clock pulses $S_F$. The output of AND gate 542 enables OR gate 516 to gate through clocking pulses to the 12 bit counter 518.

As is shown in FIG. 22, the output from the 12 bit counter 518 supplies 5 bit addresses to a +1 column adder 708, a +2 column adder 704, a +1 row adder 706 and a +2 row adder 702. The +1 row and +1 column addresses from the +1 row and +1 column adders 706 and 708 are supplied as addresses to the respective row and column sections of both "core" and "tri-radii" FIFOs 710 and 712. The 5 bit address from the +2 row and +2 column adders 702 and 704 are fed to 5 bit latches 714 and 716 respectively.

The circuitry shown in FIG. 22 searches over the thinned clusters stored in the No. of peaks array 440 and the remaining "3's" and/or "1's" clusters will each typically be within a separate 3×3 cell array. The first detection of a "3" or "1" during a scan of the No. of peaks array 440 is recognized by the circuitry as the upper left cell of a cluster of corresponding "3's" or "1's". The circuitry then assigns the next lower row (row +1) and the next adjacent column (column +1) address location as the center of the cluster. Such a determination of the center of a cluster causes a latching signal to be produced to store the row +1 and column +1 addresses in the corresponding FIFO 710 or 712, depending upon whether the "1" or "3" value is detected in the scanned cell.

To achieve the aforesaid function, the No. of peaks array 440 is scanned one time by sequentially addressing single cell locations cell by cell according to the address produced by the 12 bit counter 518. The stored values sequentially are read out from the No. of peaks array 440 into decoding gates 720 and 722. If a "3" is detected, the gate 720 produces an enabling signal to AND gate 724. The current row and column addresses are respectively compared in comparators 730 and 732 with values stored in the 5 bit latches 714 and 716. If the present row or columns address value exceeds the corresponding latched address, the NAND gate 726 will produce an enabling signal to the AND gate 724. The output from the AND gate 724 sets the "3" find flip-flop 728, which enables AND gate 734 to gate through a single shift clock pulse to strobe the FIFO 712 and latch the row and column addresses +1, from the 5 bit latches 714 and 716, in the FIFO 712. The single gated clock pulse from AND gate 734 resets the "3" find flip-flop 728. The output from the AND gate 734 also is fed to a 2-bit counter 736 which counts the number of tri-radii found during this process. A count of 2 in the 2-bit counter 736 causes a disabling signal to be gated through NAND gate 740 to disable the AND gate 724. In addition to the other effects of the output of the AND gate 734, the output therefrom also enables OR gate 738 to latch the 5 bit row and column latches 714 and 716. The effect of the row and column addresses +2 being latched in the 5 bit latches 714 and 716, is to prevent the same cluster from being detected and processed during the reaminder of scanning of the number of peaks array 440. Therefore, for each detected cell of a particular cluster, a 3×3 lock-out area is provided by the above circuitry to prevent multiple finding of the same cluster.

If, during the scan of the number of peaks array 440, a "1" cell is found, the AND gate 722 produces an enabling signal to AND gate 742. If the current address for the found "1" exceeds either of the corresponding values stored in the latches 714 and 716, the "1" find flip-flop 744 is set and thereby enables the AND gate 746 to gate through a single clock pulse and latch the row +1 and column +1 addresses from the adders 706 and 708 to the corresponding address location of the FIFO 710. It should be recognized at this point, that the "1" find circuit operates identically to the "3" find circuit.

In this embodiment, up to two cores and two tri-radii may be found and stored in the corresponding FIFO's 710 and 712 while the count number from the corresponding 2 bit counters 748 and 736 produce count numbers corresponding to the found cores and tri-radii.

It is important to note, that the aforesaid circuitry is effective for detecting more than one cluster that may occur in the same row or column. Since it has been established in this embodiment that a 3×3 cluster will only include one located tri-radii point, the aforesaid circuitry has effectively blocked out a 3×3 cell portion of the scan after the upper left cell of a particular cluster has been detected and the location of the cluster has been assigned to the center cell of the 3×3 cell array.

Referring again to FIG. 22, when the 10 bit portion of the 12 bit counter 518 has cycled three times for the thinning operation, as outlined previously, the most significant bits output from the last two stages of the 12 bit counter 518 disable, through inverting inputs, AND gate 760. When the 10 bit portion of the 12 bit counter 518 cycles for the fourth time to achieve the above finding operation of the cores and tri-radii points, the AND gate 760 is enabled and produce a "search complete" signal through OR gate 758. The search complete signal resets the "find cores/tri-radii" flip-flop 540 shown in FIG. 18. The search complete signal also is fed to one of the inputs of AND gate 762 as well as AND gate 764. AND gate 768 is connected to the 2 bit counter 736 so that if the number of tri-radii detected and counted in the 2 bit counter 736 equals 1, the output of the AND gate 768 enables AND gate 764 and sets the "tracing-in process" flip-flop 766.

At this point, it should be recalled that when the number of tri-radii detected in a particular fingerprint pattern equals 1, a loop classification is determined and further processing is required, which entails the tracing of the associated ridge flow lines. (see FIG. 13).

If the number of tri-radii is not 1, and the search complete signal is output from the OR gate 758, the AND gate 762 produces a classification complete signal, since not tracing is required, and the classification is determined to be either an arch or a whorl. The number of tri-radii detected and output from the 2 bit counter 736 is input to the decoders 768 and 770. If the number output from the 2 bit counter 736 equals 0, an arch classification signal is output from the decoder 768. However, if the output from the counter 736 is 2, the output from the decoder 770 is a whorl classification signal.

In summary, the "search complete" output will be generated either when the full scan of the array is completed or when the system locates two cores or locates two tri-radii addresses prior to completion of the scan of the entire array. The latter function is merely to accelerate operations, since there is no need to continue scanning the array if two cores and two tri-radii point addresses have already been detected.

For the purposes of continuing the discussion of the operation of the circuit, it is assumed that one tri-radii point has been detected and the tracing-in-process flip-flop 766 is set. Therefore, the output from the tracing-in-process flip-flop 766 sets a latch 772 to enable an AND gate 774 to gate through shift clock pulses for the tracing function which follows. The shift clock pulses output from the AND gate 774 are labeled $S_{TR}$ and are used for reading the location peaks array 442, shown in FIG. 17.

The nomenclature "trace" is adoped since this is the visual concept for the function discussed below.

In order to perform the tracing function, it is necessary to read both the location of peaks array 42, shown in FIG. 17 and the original ridge contour data stored in the 32×32 storage positions of the RAM 112, shown in FIG. 4. Accordingly, an AND gate 778 output sets a "read ridge contour" array flip-flop 776 which outputs a command signal to the ridge contour array 112 and a multiplexer 802 when a 2-bit loc. peaks counter 777 counts three $S_{TR}$ signals.

Figure 23:
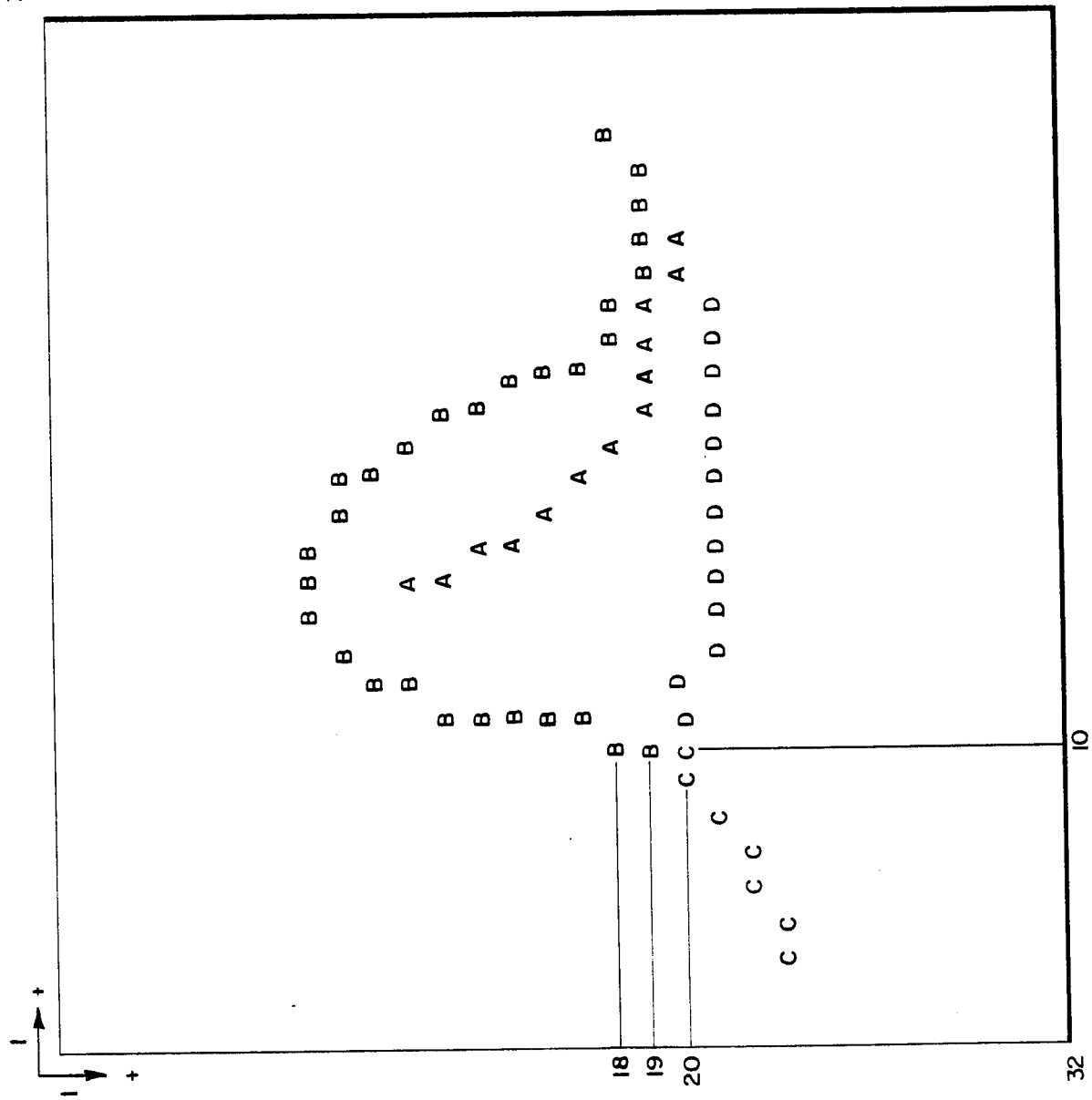
FIG. 23 illustrates an example of a curve tracing of ridge flow contours associated with detected core and tri-radii points.

Reference is now made to FIG. 23, wherein a typical racing is depicted, which is similar to the tracings shown in FIGS. 12A, 12B and 12C. The tri-radii address from the FIFO 710 causes the location of peaks array 42 to read out three reference angles for that particular tri-radii address. In the example shown in FIG. 23, the tri-radii address would be column 10, row 20. Such an address fed to the location of peaks array 442 would result in three reference angles being read out. The circuit shown in FIG. 24 then performs the B, C and D tracings from that tri-radii point (10, 20) starting in the directions of the reference angles. Subsequent to making the first cell tracing in any one direction from the tri-radii point, the information from the ridge contour array is used to supply additional angle data to continue each trace. Similarly, in the example shown in FIG. 23, the location of the core point is at column address 15, row address 12 and the tracing of the ridge flow line associated with that core point is designated as A. The tracing of A is performed in the same manner as that discussed for any one tracing of the tri-radii ridge flow lines.

The tracing circuit shown in FIG. 24, through its input multiplexer 802, loads, in time sequence, the 5 bits representing each of the three reference angles for the addressed position of the location peaks array 442. The multiplexer 802 supplies the three 5 bit reference angle values to corresponding ones of three 5 bit registers 804, 806 and 808 for storage.

Logic circuits 810, 812 and 814 each correlate the 32 possible reference angle positions identified by the 5 bits from its corresponding 5 bit register, into one of eight possible cell locations which are adjacent to the currently addressed cell. The logic circuits 810, 812 and 814 determine the next row and column address incremental values according to the specification chart shown in FIG. 25.

For example, consider the 5 bit output from the register 804 fed into the logic circuit 810. If the 5 bit input to the logic circuit 810 has a value of "9", indicating the reference angle of 90°, the next row address will be incremented by −1 and the next column address will be incremented by 0. This corresponds to the tracing shown in FIG. 23 wherein the first "B" adjacent the tri-radii point appears at column address 10, row address 19.

The incremental values for the row and column addresses are output from the logic circuit 810 to a FIFO 822. The FIFO 822 has a maximum length of 48, thereby allowing a tracing to extend over 48 cells. FIFO's 832 and 842 receive the outputs from logic circuits 812 and 814, respectively, in order that three curve tracings may be simultaneously produced by the circuitry shown in FIG. 24. The next row and next column addresses are also output from the circuit 810 based upon the current row and column addresses combined with the incremental value determined by the logic circuit 810. The next row and column addresses then serve to address the ridge contour array 112. Each of the logic circuits 812 and 814 also produce next row and column addresses, based upon the incremental values determined in those respective logic circuits, and those addresses are addressed to the ridge contour array 112 under the control of the multiplexer 802. The information (5 most significant bits) read out from the addressed location in the ridge contour array 112, in response to the address supplied by the logic circuit 810, is supplied to the 5-bit counter 804 through the multiplexer 802. Depending upon the value stored in the register 804, the logic circuit 810 will determine a new incremental value for the next address.

Again, referring to FIG. 23, if the five most significant bits from the ridge contour array 112 have a value of "8", up to "11", the incremental row will be −1 and the incremental column will be 0, as is shown in the plot of "B" at column address 10, row address 18.

Whenever the next row or column address from the logic circuit 810 reaches a value of "32", this indicates that the tracing has reached the border of the ridge contour array 112 and a "stop" signal is generated by the OR gate 820. Correspondingly, monitoring circuits 813 and 815 are provided that are associated with logic circuits 812 and 814 to produce "stop" signals if either of those particular tracings reach the border of the ridge contour array 112.

According to the above described operation of the circuit shown in FIG. 24, it is possible to trace any curve from the central position in any direction up to a maximum length of 48 incremental positions from the original position, limited by the border of the 32×32 ridge contour array 112.

When tracing is completed, the addresses of all of the points defining each of the three paths from the tri-radial point, based on the incremental values and independent of the original position of the tri-radial point, are stored in the three FIFO's 822, 832 and 842. Note that each FIFO 822, 832 and 843 includes a row address and a column address storage position. When any of the aforesaid FIFO's 822, 832 or 842 are full, indicating 48 increments of a particular tracing, a "FIFO full" signal is generated and enables OR gate 824 to produce a "stop tracing" signal that disables AND gate 826, which is normally gating through clocking pulses $S_{TR}$ is a stop tracing circuit 823. It should be understood that each of the three FIFO's 822, 832 and 842 is independently monitored by corresponding stop circuitry 833 and 843 to produce "stop tracing" signals whenever the associated FIFO is full or whenever the tracing exceeds the border of the ridge contour array 112.

A NAND gate 828 responds to all three of the stop tracing signals generated by the circuitry associated with each FIFO 822, 832 and 842 and gates through an "end tracing" signal which resets the read ridge contour array flip-flop 776 (FIG. 22) and sets the loop classification flip-flop 830. The setting of the loop classification flip-flop 830 enables and AND gate 831 to supply shift clock pulses out to the loop classification circuit shown in FIG. 26.

Figure 26A:
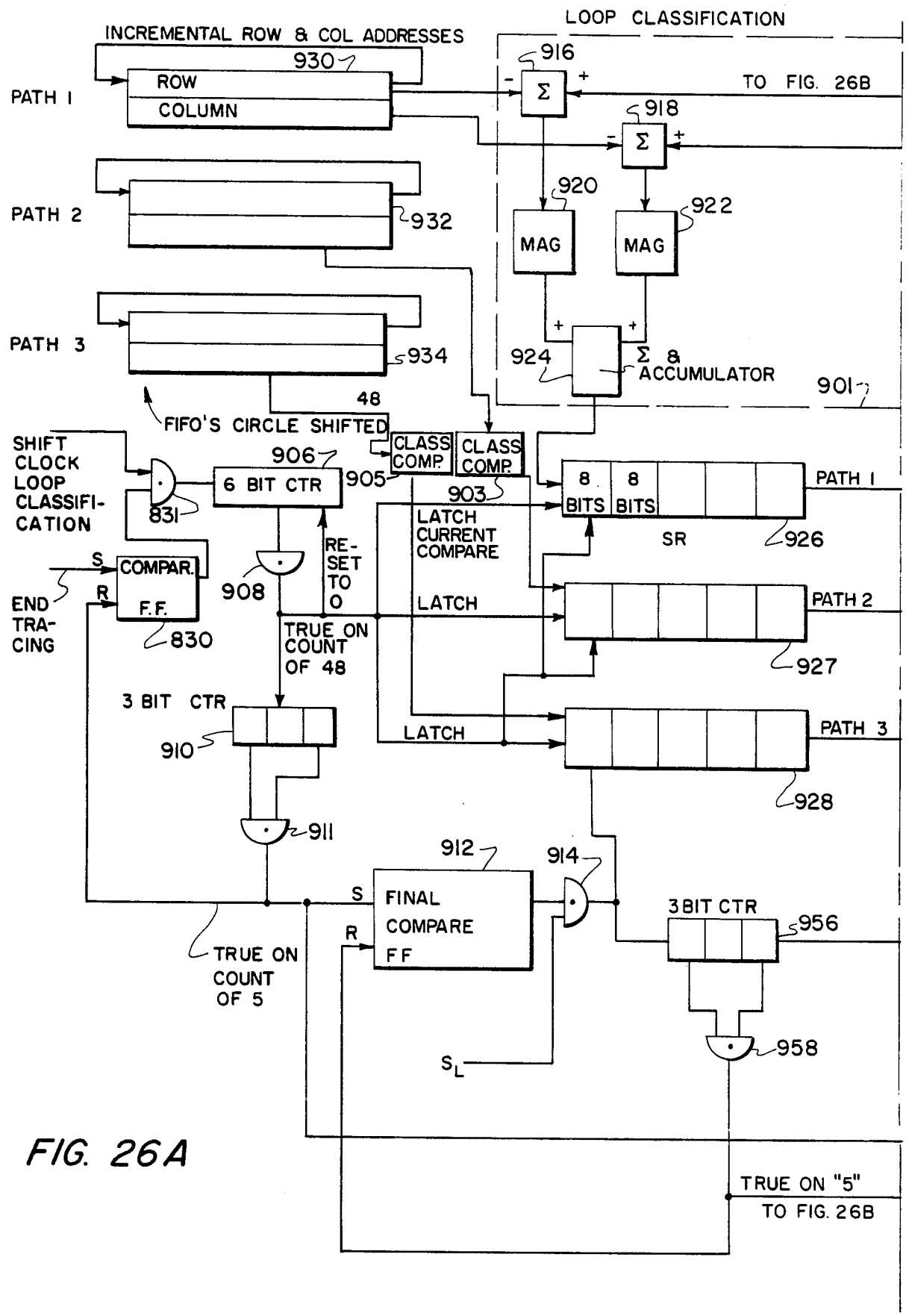
FIGS. 26A and 26B, hereinafter referred to as FIG. 26, present a detailed block diagram of a comparison circuit which assigns a classification to the incremental values produced as a result of the curve tracing performed by the circuitry shown in FIG. 24.
Figure 26B:
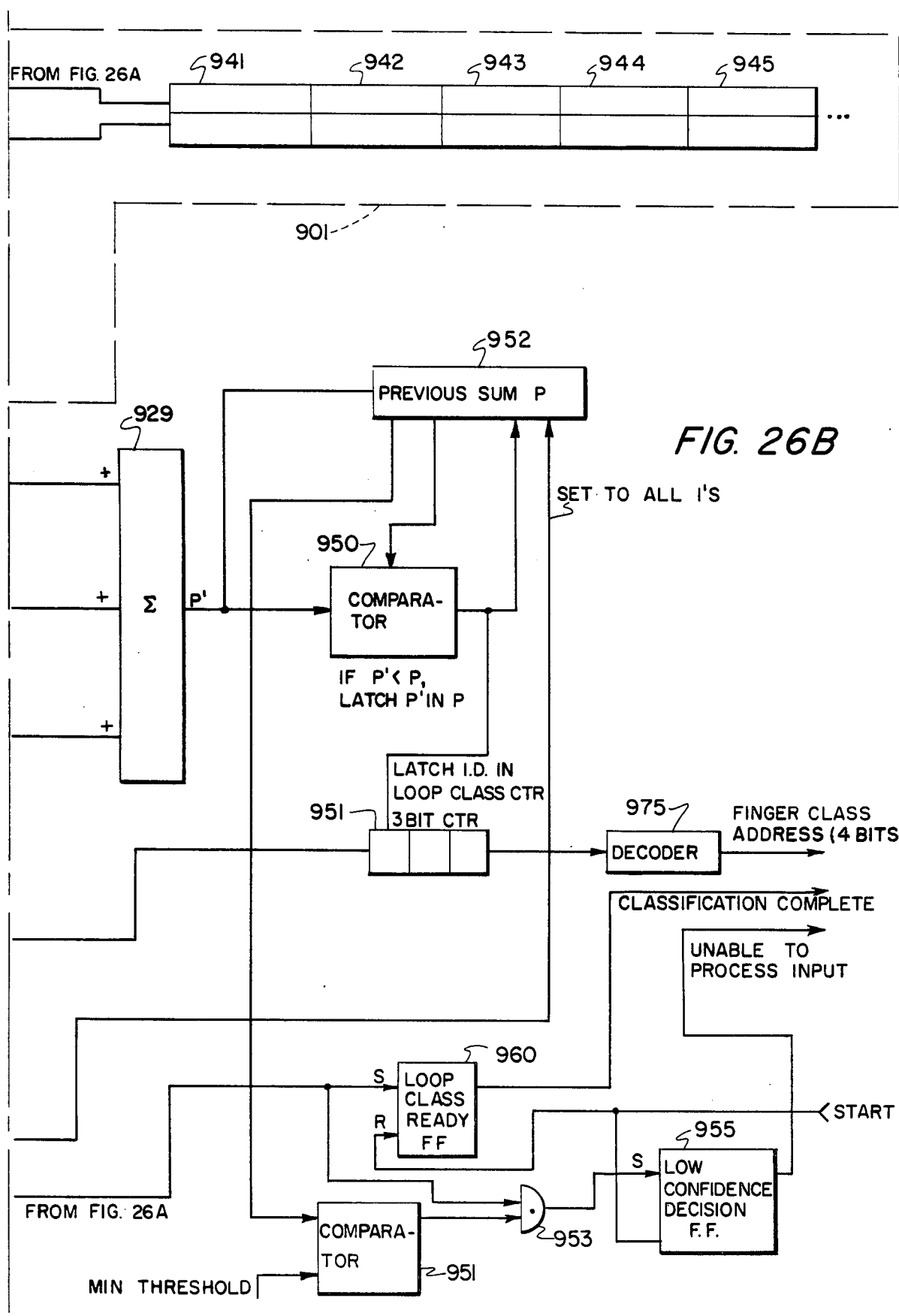

The classification circuit is shown in FIG. 26. For simplification purposes, FIG. 26 shows the final comparison of a single tracing of the three tri-radii lines according to their stored incremental values, with stored reference values to achieve classification. This is in contrast to a more lengthy showing wherein each of the three tracings are compared with their corresponding stored reference values.

The incremental row and column addresses are developed by the circuitry shown in FIG. 24 for each tracing and are stored in incremental shift registers 822, 832 and 842. In FIG. 26, those same registers are indicated at 930, 932 and 934 with feedback lines. Since the comparison process is identical for the information stored in all three of the registers 930, 932 and 934, the following discussion is directed to the incremental row and column address information stored in the register 930 and processed by the class comparator circuit 901. However, it should be understood that the circuitry performing the comparison (901, 903 and 905) is identical for each of the associated registers 930, 932 and 934.

The register 930 (822) has stored therein the incremental row and column addresses. The register 930 shifts out each incremental value, and that value is recirculated back into the register 930 via a feedback line.

Path reference registers 941, 942, 943, 944 and 945 of the class comparator circuit 901 each store the reference incremental values corresponding to one of the three curve tracings of the five predetermined reference loop classifications.

The incremental row and column address values stored in the register 930 are shifted out, one incremental value at a time, in parallel for the row and column and compared with the contents of path reference register 941. The incremental values from the register 930 are subtracted from the corresponding incremental values from the register 941 in summing circuits 916 and 918. An absolute value of magnitude is determined in circuits 920 and 922 as for each of the differences obtained in the summing networks 916 and 918 and is stored in an accumulator 924 for each of up to 48 compared incremental positions in the registers 930 and 941. After each of the 48 positions are compared and the total magnitude of the differences over the 48 incremental positions is stored in the accumulator 924, an 8 bit word is output from the accumulator 924 and is stored in a five position storage register 926. Each position of the storage register 926 is capable of storing an 8-bit word and corresponds to each of the path reference registers which are to be compared with the incremental information stored in register 930.

The above process is repeated for each of the, for example, 5 path references represented by the contents of the other path reference storage registers 942, 943, 944 and 945. Correspondingly, 8 bit words are developed at the accumulator 924 after each path reference storage register has been compared over its 48 incremental positions.

This function is simultaneously performed for each of the three paths extending from the tri-radii point. The five accumulated values stored in the storage registers 926, 927 and 928 are output from the corresponding registers, in parallel, three at a time, to a summing network 929. The three respective 8 bit words are summed to develop an output P′ which is supplied to a comparator 950. The comparator compares the current value P′ with a previous summed value P which was set in a "previous sum" register 952. If P′ is less than P, the comparator 950 latches P′ into the previous sum register 952. The latching signal is also supplied to a 3 bit count 954.

Since a perfect match between the incremental information stored in the register 930 and any one of the path reference registers 941 . . . 945 should produce a minimum accumulated value output from accumulator 924, the initial setting of the previous sum register 952 is set to all "1's". Therefore, the first comparator output from comparator 950 will be less than the initial set value P and will accordingly be latched into the previous sum register 952. Subsequently, all P′ values will be compared to the previous P value. If the first value P is latched in the previous sum register 952, and is a "perfect match" all subsequent comparisons with the path reference registers 942, 943, 944 and 945 will result in P′ values exceeding the present P value stored in the previous sum register 952.

The effect of a latching signal from the comparator 950 serves to latch a 3 bit counter 954 which receives the count value from a 3 bit counter 956. The 3 bit counter 956 monitors the clock pulses $S_L$ which are gated through an AND gate 914.

The loop classification flip-flop 830 and the associated AND gate 831, shown in both FIGS. 24 and 26, are effective to gate shift clock pulses $S_L$ to a 6 bit counter 906. When the 6 bit counter reaches a count a "48", an AND gate 908 produces an output signal which resets the 6 bit counter 906 to "0" and latches the value from the accumulator 924 into a first position in the storage register 926. The signal produced by the AND gate 908 is correspondingly supplied as a latch signal to registers 927 and 928. The output of the AND gate 908 is also input to a 3 bit counter 910 which counts the number of times the total contents of the register 930 is compared with the total contents of individual path reference registers. In this embodiment, when a count of 5 is reached in the 3 bit counter 910, an AND gate 910 supplies a reset signal to the loop classification flip-flop 830 and sets the final comparison flip-flop 912. The final comparison flip-flop 912 enables AND gate 914 to gate through clocking pulses $S_L$ to perform the final summation function and comparison, yielding the loop classification, as described above. Therefore, the 3 bit counter 956, by counting the clock pulses gated through the AND gate 914, monitors the particular path reference register contents which were compared with the incremental information stored in the register 930 and presents a corresponding count value to the 3 bit counter 954 identifying that path reference register. Therefore, when the 3 bit counter 954 is latched, it identifies the best match (lowest accumulation value) detected at that time. The value latched in the 3 bit counter 954 identifies the loop class and is output to a decoder 975 which supplies the four bit finger class address to the register 128 shown in FIG. 4.

When the 3 bit counter 956 reaches a count of 5, a decoder 958 produces a signal which sets a "loop class ready" flip-flop 960. The output of the loop class ready flip-flop is the "classification complete" signal shown in FIG. 4. A "loop class address" signal output from the 3 bit counter 954 to the "finger class" section of register 128 (FIG. 4), and is, in this case, a 3 bit signal which identifies one of 5 loop classifications. As discussed with respect to FIG. 4, the main file may be broken down into 12 classification bins. However, the number of classifications could be far more and typically would be.

Of course, it is understood that the five reference registers, referred to above, can be expanded to ten in order to include the left and right loops and the five sizes associated with each left and right loop classification. Furthermore, in a system where the fingerprint image derived from the scanning window is subjected to variations in rotation, compared with the particular set of incremental addresses stored in the register 930 (also 932 and 934) will vary in accordance with the fingerprint pattern angular orientation. Therefore, this system, as exemplified in FIG. 26, is easily modified in order that accurate determination of a classification can be made invariant to any rotation of the fingerprint pattern. To achieve such a modification, additional path reference registers can be added to those shown in FIG. 26 wherein each path reference register stored incremental addresses conforming to the reference classification rotated by a predetermined amount.

Alternatively to supplying a number of 48 cell path reference registers to reproduce the properly encoded incremental data for angularly offset patterns, it is recognized that a scratch-pad type memory, utilizing ROM's storing data corresponding to a reference direction for a corresponding path and various amounts of angular offsets from that reference direction, may be used. In that instance, a calculation is made between a determined angular offset of the source data from the reference direction with respect to the traced path. Then, the appropriate ROM is selected and the data read out therefrom and stored in a scratch-pad memory such as a series of registers similar to that shown in FIG. 26 wherein the comparison function is performed in the manner described. Therefore, the particular loop type is identified by comparison with the properly rotated reference path data.

Furthermore, it is recognized that although the aforesaid comparison circuit shown in FIG. 26 is useful for determining breakdowns in the loop classification by size and direction, it should also be recognized that a whorl pattern classification could also be further broken down so that a more accurate classification could be achieved for any scanned fingerprint pattern.

Although a score value stored in the previous sum register 952 may be lower than the initial value set therein, it may not be sufficiently low to indicate that a classification match has been achieved. Therefore, comparator 951 compares the value P, stored in the previous sum register 952, with a minimum threshold level. The minimum threshold level is preset according to an acceptable classification score value. When the value P exceeds the minimum threshold value, the comparator 951 enables AND gate 953. The signal output from the AND gate 958 is then gated through the AND gate 953 and sets the low confidence decision flip flop 955. The low confidence decision flip flop 955 then outputs an "unable to process" signal back to the system console. The "unable to process" decision is a unique characteristic of this automatic system since it provides a positive output indication of a determination by the system that the input data is not of sufficient quality to complete a first level of process—namely, classification, even before the RIV comparison techniques are employed and the main file is searched. The "unable to process" decision may be due to an injured fingerprint pattern, a poor quality representation, movement of the finger during the scan or other adverse circumstances. After such a determination, the operator may either instruct the individual who is being identified by the system, to replace his finger on the scan window or instruct the system and the individual to select another finger.

At that point, the system will again automatically scan the fingerprint, extract ridge contour and minutiae data, and attempt to classify the fingerprint. If classification is achieved, the system will automatically perform RIV comparison of the extracted minutiae of the scanned fingerprint with the minutiae data corresponding to identified fingerprint patterns addressed and read out from the main file. The system will then produce a list of identities to have closely matching fingerprint patterns.

In the foregoing it was stated that one of the purposes of classifying individual scanned fingerprint patterns is to preliminarily determine which of the large volumes of fingerprint patterns stored in the main file should be compared, as a result of the search of the main file. However, in the case where the eight fingerprint patterns for each individual are stored in the main file according to their corresponding classification and up to eight fingers are scanned by the foregoing embodiment, a further determination and lowering of the number of stored fingerprint patterns that should be compared may be made. By classifying each of the up to eight scanned fingerprint patterns and only comparing the stored fingerprint patterns in which those same separate classifications correlate in corresponding fingers, the identification time can be accordingly reduced. This type of correlated classification breakdown of the main file if quite effective where hundreds of thousands or more identified fingerprint patterns are stored. It is apparent, that various functional operations, such as classification and RIV matching, take longer to perform than others, such as extracting minutia and ridge contour data. Therefore, programs may be written and storage facilities supplied that will operate to stack the sequentially detected data and process it in turn. Alternatively the most time consuming subsystems could be duplicated and multiplexed in order that a large number of sequentially read patterns could be more rapidly processed and identified or verified.

It will be apparent that many modifications and variations may be affected without departing from the scope of the novel concept of this invention. Therefore, it is intended by the appended claims to cover all such modifications and variations which fall within the true spirit and scope of the invention.

What is claimed is:

1. A method of processing fingerprint patterns which are each characterized by ridge lines forming a contour pattern classifiable into one of a predetermined number of classification types, including the steps of:
   providing a fingerprint pattern;
   providing identifying information corresponding to said provided fingerprint;
   extracting ridge contour data from said provided fingerprint corresponding to said contour pattern;
   classifying said provided fingerprint pattern into one of said predetermined classification types; and
   storing said identifying information according to said corresponding classification type;
   said contour data extracting step including the steps of identifying contour lines in said fingerprint, determining average angle contour values of said identified contour lines for predetermined areas of said fingerprint, and storing said average angle contour values to define said line contour data; and
   said classifying step including the steps of identifying the occurrence of tri-radii points from said line contour data, and representing three contour lines uniquely associated with each identified tri-radii point.

2. An automatic system for processing patterns characterized by respectively unique minutiae patterns and further characterized by contour lines forming patterns which are respectively classifiable into corresponding ones of a predetermined number of classification types, wherein said system comprises:
   means for providing pattern minutiae data and line contour data corresponding to a unique minutiae pattern and a contour line pattern characterizing a pattern for processing;
   means responsive to said line contour data for automatically classifying said pattern into one of said classification types; and
   means for automatically storing said presented pattern minutiae data according to the classification type of said pattern;
   said providing means including means for identifying contour lines in said pattern, means for determining average contour angle values of said identified contour lines for predetermined areas of said pattern, and means for storing said average contour values thereby defining said line contour data;
   said classifying means including means for scanning said lines of contour data, means for identifying the occurrence of tri-radii points from said scanned lines contour data and means for representing three contour lines uniquely associated with each identified tri-radii point.

3. An automatic system for verifying the identity of a pattern, with respect to a previously identified pattern comprising:
 means for representing a pattern to be verified;
 means for extracting pattern minutiae from said represented pattern;
 means for storing previously identified pattern data in addressable positions corresponding to the identity of said previously identified pattern;
 means for addressing said storing means to read out said stored pattern data;
 means for comparing said extracted minutiae with said read out data and producing an identity verification output when the patterns match, within predetermined limits;
 means for extracting contour data from said represented pattern including means for identifying contour lines in said represented pattern, means for determining average contour angle values of said identified contour lines for predetermined areas of said represented pattern and means for storing said average contour angle values thereby defining said line contour data; and
 means for classifying said represented pattern in accordance with said contour lines into corresponding ones of a predermined number of classification types, said classifying means including means of scanning line contour data, means for identifying the occurrence of tri-radii points from said scanned line contour data, means for representing three contour lines uniquely associated with each identified tri-radii point, means for comparing said represented contour lines with reference contour lines representing a plurality of classification types and means responsive to said comparing means for classifying said represented pattern.

4. An automatic system for identifying an individual according to dermatoglyphic patterns of that individual, comprising:
 means for representing a dermatoglyphic pattern of an individual to be identified;
 means for extracting pattern minutiae data from said represented pattern;
 means for storing dermatoglyphic pattern minutiae data corresponding to at least one previously identified individual;
 means for selectively addressing and retrieving said minutiae data stored in said storing means;
 means for comparing said extracted pattern minutiae data with said retrieved minutiae data from said storing means for said at least one previously identified individual;
 means for determining whether said compared data matches within predetermined limits and producing an identification output when said compared data matches;
 means for extracting contour data from said represented pattern including means for identifying contour lines in said represented pattern, means for determining average contour angle values of said identified contour lines for predetermined areas of said represented pattern and means for storing said average contour angle values thereby defining said line contour data; and
 means for classifying said represented pattern in accordance with said contour lines into corresponding ones of a predetermined number of classification types, said classifying means including means of scanning line contour data, means for identifying the occurrence of tri-radii points from said scanned line contour data, means for representing three contour lines uniquely associated with each identified tri-radii point, means for comparing said represented contour lines with reference contour lines representing a plurality of classification types and means responsive to said comparing means for classifying said represented pattern.

5. An automatic system as in claim 4, wherein said system comprises means for addressing said storing means and storing said extracted pattern minutia data therein.

6. An automatic system as in claim 4, wherein said system further provides:
 means for designating a particular finger number to said individual to be identified; and
 said addressing means addresses said storing means according to said designated finger number.

7. An automatic system as in claim 4, wherein said system further provides:
 means for designating particular ones of a plurality of finger numbers to said individual to be identified; and
 said addressing means addresses said storing means according to said plurality of designated finger numbers.

8. An automatic system for processing patterns characterized by respectively unique minutiae patterns and further characterized by contour lines forming patterns which are respectively classifiable into corresponding ones of a predetermined number of classification types, wherein said system comprises:
 means for scanning a pattern characterized by a unique minutiae pattern and a contour line pattern;
 means for automatically extracting pattern minutiae data corresponding to said minutiae pattern from said scanned pattern;
 means for automatically extracting contour data from said scanned pattern corresponding to said contour lines;
 means responsive to said line contour data for automatically classifying said scanned pattern into one of said classification types; and
 means for automatically storing said extracted pattern minutiae data according to the classification type of said scanned pattern;
 said contour data extracting means including means for determining average contour angle values of said contour lines for predetermined areas of said pattern;
 said classifying means including means for scanning said line contour data, means for identifying the occurrence of tri-radii points from said scanned line contour data, means for representing three contour lines uniquely associated with each identified tri-radii point, means for comparing said represented contour lines with reference contour lines representing said classification types and means responsive to said comparing means for classifying said scanned pattern.

9. An automatic system for processing fingerprint patterns which are each characterized by epidermal ridge lines forming a contour pattern classifiable into one of a predetermined number of classification types, wherein said system comprises:
 means for scanning a fingerprint;

means for inputting identifying information corresponding to said scanned fingerprint;

means for automatically extracting ridge contour data from said scanned fingerprint corresponding to said contour pattern;

means responsive to said ridge contour data for automatically classifying said scanned pattern into one of said predetermined classification types; and means for automatically storing said identifying information according to said corresponding classification type;

said ridge contour data extracting means including means for identifying contour lines in said scanned fingerprint, means for determining average contour angle values of said identified contour lines for predetermined areas of said scanned fingerprint and means for storing said average contour angle values thereby defining said line contour data;

said classifying means includes means for scanning said line contour data, means for identifying the occurrence of tri-radii points from said scanned line contour data, means for representing three contour lines uniquely associated with each identified tri-radii point, means for comparing said represented contour lines with reference contour lines representing said predetermined number of classification types.

10. An automatic system for identifying a pattern characterized by a unique minutiae pattern, comprising:

means for electrically representing a pattern to be identified;

means for automatically extracting pattern minutiae data corresponding to said minutiae pattern from said electrically represented pattern;

means for storing pattern minutiae data corresponding to at least one previously identified pattern;

means for automatically comparing said extracted pattern minutiae data with said pattern minutiae data in said storing means corresponding to said at least one previously identified pattern;

means for automatically determining the degree of match between said compared data and for automatically producing an output identifying said compared data with at least one previously identified pattern when said degree of match is determined to exceed a predetermined value;

said patterns also being characterized by contour lines forming patterns which are classifiable into corresponding ones of a predetermined number of classification types;

means for automatically extracting the line contour data corresponding to said contour line pattern from said electrically represented pattern;

said storing means storing pattern minutiae data associated with a plurality of identified patterns according to their corresponding classification types;

means responsive to said line contour data for classifying said represented pattern into one of said classification types;

means responsive to said classifying means for addressing said storing means according to said one of said classification types;

wherein said line contour data extracting means includes means for scanning said electrically represented pattern, means for identifying contour lines in said scanned pattern, means for determining average contour angle values of said identified contour lines for predetermined areas of said represented pattern and means for storing said average contour angle values, thereby defining said line contour data; and wherein said classifying means includes means for scanning said line contour data, means for identifying the occurrence of tri-radii points from said scanned line contour data, means for representing three contour lines uniquely associated with each identified tri-radii point, means for comparing said represented contour lines with reference contour lines representing a plurality of classification types, and means responsive to said comparing means for classifying said represented pattern.

11. An automatic system for identifying an unknown pattern by comparison with stored patterns, each such pattern being characterized uniquely by a minutiae pattern and a configuration of contour lines, wherein said system comprises:

means for scanning an unknown pattern including means for imaging said unknown pattern and means for coverting said image into a binary bit stream of electrical signals in a line scan format representing said unknown pattern;

means for automatically extracting minutiae data, describing said minutiae pattern from said scanned pattern;

means for storing the minutiae data of each of a plurality of previously identified patterns in addressable locations;

means for selectively addressing and retrieving said stored minutiae data;

means for window scanning said binary bit stream to produce a window scan address;

means for automatically comparing said extracted minutiae data with retrieved minutiae data corresponding to selected ones of said plurality of patterns in succession and indicating the identity of said corresponding pattern when said compared data matches within predetermined limits;

said minutiae data extracting means, including preprogrammed means responsive to said window scan address for detecting the occurrence of minutiae in said scanned pattern, means responsive to said preprogrammed means for determining the location of said detected minutiae with respect to a defined corrdinate system and means for storing the location coordinate values for each of the detected minutiae;

said minutia data extracting means defining a reference coordinate system and presenting said extracted minutiae data in an X, Y, $\theta$ format, wherein X and Y indicate coordinate locations of each detected minutia with respect to said defined coordinate system and $\theta$ indicates the angular orientation of each detected minutia with respect to said defined coordinate system;

said storing means storing said retrievable minutiae data in an X, Y, $\theta$ format;

said comparing means including means for automatically converting extracted minutiae data and said retrieved minutiae data into an RIV format, whereby each minutia is represented in terms of its surrounding minutiae in a surrounding neighborhood of a predetermined size; and said comparing means also including means for matching each minutia of said unknown pattern represented in an RIV format with each minutia of a selected previously identified pattern represented in an RIV format and producing a plurality of neighborhood comparison signals indicating the relative closeness of match and relative coordinate displacement between minutia neighborhoods of the compared patterns, and means responsive to the neighborhood comparison signals for developing output signals indicative of the relative closeness of match and the relative coordinate displacement of the compared patterns.

12. An automatic system as in claim 11, wherein said system further comprises:

means for extracting contour data from said scanned pattern corresponding to said configuration of contour lines;

means receiving said extracted contour data for classifying said unknown pattern into one of a predetermined number of classification types defined by reference pattern contour configurations, and producing a classification type output signal;

said storing means defines classification bins corresponding to said predetermined number of classification types, said previously identified minutiae data being stored in corresponding classification bins according to the classification type of each previously identified pattern; and said addressing and retrieving means receives said classification type output signal from said classifying means for addressing said storing means at a corresponding classification bin and retrieves stored minutiae data from said addressed classification bin.

13. An automatic system for identifying an unknown pattern by comparison with stored patterns, each such pattern being characterized uniquely by a minutiae pattern and a configuration of contour lines, wherein said system comprises:

means for scanning an unknown pattern;

means for automatically extracting minutiae data, describing said minutiae patterns from said scanned pattern;

means for storing the minutiae data from each of a plurality of previously identified patterns in addressable locations;

means for selectively addressing and retrieving said minutiae data;

means for automatically comparing said extracted minutiae data with retrieved minutiae data corresponding to selected ones of said plurality of patterns in succession and indicating the identity of said corresponding patterns when said compared data matches within predetermined limits;

said extracting means defining a reference coordinate system and presenting said extracted minutiae data in an X, Y, $\theta$ format, wherein X and Y indicate coordinate locations of each detected minutia with respect to said defined coordinate system and $\theta$ indicates the angular orientation of each detected minutia with respect to said defined coordinate system;

said storing means storing said retrievable minutiae data in an X, Y, $\theta$ format;

said comparing means including means for automatically converting said extracted minutiae data and said retrieved minutiae data into an RIV format, whereby each minutiae is represented in terms of its surrounding minutiae in a surrounding neighborhood of a predetermined size;

said comparing means also including means for matching each minutia of said unknown pattern represented in an RIV format with each minutia of a selected previously identified pattern represented in an RIV format and producing a plurality of neighborhood comparison signals indicating the relative closeness of match and relative coordinate displacement between minutia neighborhoods of the compared patterns, and means responsive to the neighborhood comparison signals for developing output signals indicative of the relative closeness of match and the relative coordinate displacement of the compared patterns;

means for extracting contour data from said scanned pattern corresponding to said configuration of contour lines;

means receiving said extracted contour data for classifying said unknown pattern into one of a predetermined number of classification types defined by reference pattern contour configurations, and producing a classification type output signal;

said storing means defining classification bins corresponding to said predetermined number of classification types, said previously identified minutiae data being stored in corresponding classification bins according to the classification type of each previously identified pattern;

said addressing and retrieving means receiving said classification type output signal from said classifying means for addressing said storing means at a corresponding classification bin and retrieving stored minutiae data from said addressed classification bin;

wherein said scanning means includes means for imaging said unknown pattern and means for converting said image into a binary bit stream of electrical signals in a line scan format representing said unknown pattern;

means for window scanning said binary bit stream for producing a window scan address; and said minutiae data extractor means including preprogrammed means responsive to said window scan address for detecting the occurrence of minutiae in said represented pattern, means responsive to said preprogrammed means for determining the location of said detected minutiae with respect to said defined coordinate system and means for storing the location coordinate values for each of the detected minutiae.

14. An automatic system as in claim 13, wherein said contour data extracting means includes preprogrammed means responsive to said window scan address for reading out corresponding local angle values greater than zero when said window scanning means produces a window scan address corresponding to a contour line of said represented pattern being in said window and for reading out a zero value when said window scanning means produces a scan address which does not correspond to a contour line of said represented pattern being in said window.

15. An automatic system as in claim 14, wherein said contour data extracting means includes means for automatically averaging said local angle values read out from said preprogrammed means over predetermined areas of said represented pattern, means receiving said averaged local angle values for generating a flow angle value for each predetermined area of said represented pattern, means for storing said flow angle values as contour data in addressable locations, and means for addressing said storing means in accordance with each predetermined area of said represented pattern.

16. An automatic system as in claim 15, wherein said window scanning means includes a first serial-in/parallel-out three bit register connected to receive said binary bit stream, a first serial-in/serial-out full line delay register connected to receive said binary bit stream, a second serial-in/parallel-out three bit register connected to receive the output of said first full line delay register, a second serial-in/serial-out full line delay register connected to receive the output of said first full line delay register, and a third serial-in/parallel-out three bit register connected to receive the output of said second full line delay register, wherein said first, second and third three bit registers form a three by three bit scanning window which advances one bit by one bit over said binary bit stream in said line scan format and provides said window scan address nine bits in length.

17. An automatic system as in claim 14, wherein said classifying means includes means for window scanning said contour data by sequentially sampling each stored flow angle value and a predetermined number of its surrounding flow angle values;
- means responsive to said sampled contour data for determining the occurrence and location of any singularity point in said represented pattern;
- means responsive to said singularity point determining means for producing curve tracings corresponding to those of said contour lines extending from each detected singularity point;
- means for storing reference curve tracings corresponding to a plurality of said reference pattern contour configurations;
- means for comparing said produced curve tracings with each of said stored reference curve tracings and producing a corresponding comparison value signal for each comparison; and
- means responsive to said comparison value signals for determining said classification type and producing said classification type output signal.

18. An automatic system as in claim 17, wherein said contour data window scanning means includes a seven by seven byte buffer having a center cell for sequentially sampling each said stored flow angle value and forty-eight cells surrounding said center cell, corresponding to said predetermined number, for sampling said predetermined number of surrounding angle values;
- said singularity point determining means includes means for correlating the average angle values sampled by said surrounding cells for each angle value sampled by said center cell with respect to a predetermined number of reference angles defined as extending from said center cell and producing a correlation value for each of said predetermined number of reference values at each angle value sampled by said center cell,
- means receiving said correlation values for determining peaks in said correlation values, the number of said correlation value peaks and identifying each peak correlation value by its corresponding reference angle value,
- means for storing said number of correlation value peaks for each angle value sampled by said center cell in locations corresponding to said predetermined areas of said represented pattern, and
- means for storing said reference angle values identified as corresponding to each of said correlation value peaks in locations corresponding to said predetermined areas of said represented pattern.

19. An automatic system as in claim 18, wherein said singularity point determining means further includes means for sequentially scanning said numbers stored in said number of peaks storing means and means responsive to said number of peaks scanning means for eliminating all numbers in said number of peaks storing means which are not equal to 1 or 3 and allowing said numbers equal to 1 or 3 to remain.

20. An automatic system as in claim 19, wherein said system includes means for automatically distinguishing said scanned pattern from its background, determining those of said predetermined areas in which said background occurs in said scanned pattern and producing corresponding background cancelling signals; and
- means for gating said background cancelling signals to said number of peaks storing means and eliminating all numbers therein which are stored in locations corresponding to said areas of determined background.

21. An automatic system as in claim 20, wherein said singularity point determining means further includes means for simultaneously scan sampling each cell location and two predetermined adjacent cell locations of said number of peaks storing means,
- means responsive to said scan sampling means at each sampled cell location for comparing sampled values at each sampled cell location and its corresponding two adjacent cell locations and producing cancellation signals each time said sampled value from each said sampled cell location is different from either of said sampled values from its corresponding two adjacent cell locations; and
- means for applying said cancellation signals to said number of peaks storing means to eliminate numbers stored in each cell location therein which differs in value from either of its corresponding two predetermined adjacent cell locations to reduce the size of clusters of numbers of equal value and eliminate spurious numbers stored in said number of peaks storing means.

22. An automatic system as in claim 21, wherein said singularity point determining means further includes means responsive to said cancellation signal applying means for single cell sample scanning said number of peaks storing means;
- means responsive to said single cell sampling means for producing a singularity point location signal when said number sampled thereby has a value of 1 or 3, wherein said location signal has a value corresponding to the address location of the corresponding cell location in said number of peaks storing means incremented by a +1 value in both row and column portions thereof;
- means for storing said singularity point location signal; and
- means for incrementing said address to said number of peaks storing means for said single cell sample scanning means by +3 in both the row and column portions thereof.

23. An automatic system for identifying a pattern characterized by a unique minutiae pattern, comprising:
- means for electrically representing a pattern to be identified including means for imaging said characterized pattern and means for converting said image into a binary bit stream of electrical signals and a line scan format representing said characterized pattern;

means for automatically extracting pattern minutiae data corresponding to said minutiae pattern from said electrically represented pattern;

means for storing pattern minutiae data corresponding to at least one previously identified pattern;

means for automatically comparing said extracted pattern minutiae data with said pattern minutiae data in said storing means corresponding to said at least one previously identified pattern;

means for window scanning said binary bit stream for producing a window scan address;

said minutiae data extracting means including preprogrammed means responsive to said window scan address for detecting the occurrence of minutiae in said represented pattern, means responsive to said preprogrammed means for determining the location of said detected minutiae with respect to a defined coordinate system, means for storing the location coordinate values for each of the detected minutiae;

means for automatically determing the degree of match between said compared data for automatically producing an output identifying said compared data with at least one previously identified pattern when said degree of match is determined to exceed a predetermined value;

wherein said patterns are further characterized by contour lines forming patterns which are classifiable into corresponding ones of a predetermined number of classification types; said storing means includes a plurality of classification bins corresponding to said classification types and each said previously identified pattern has pattern minutiae data stored in a corresponding classification bin; and wherein said extracting means includes:
means for automatically scanning said electrically represented pattern,
means for automatically identifying contour lines in said scanned pattern,
means for automatically determining the average contour angle values from said identified contour lines for predetermined areas of said represented pattern, and
means for automatically storing said average contour angle values in a matrix format corresponding to said predetermined areas;

said system further comprising:
means for automatically classifying said represented pattern into one of said classification types according to said stored average contour angle values; and
means for supplying a classification bin address to said storing means in accordance with said classification type of said represented pattern for designating the pattern minutiae data to be compared by said comparing means.

24. A method of identifying an unknown pattern, wherein each such pattern is characterized uniquely by a minutiae pattern and a configuration of contour lines, comprising the steps of:

extracting minutiae data describing said minutiae pattern from said unknown pattern;

storing minutiae data of each of a plurality of previously identified patterns in association with corresponding addresses enabling retrieval of the stored data;

selectively addressing and retrieving said stored minutiae data;

comparing said extracted minutiae data with retrieved minutiae data corresponding to selected ones of said plurality of patterns in succession and indicating a match when said compared data matches within predetermined limits; and indicating the identity of said corresponding pattern for each match indicated;

wherein said step of extracting minutiae data includes the step of defining a reference coordinate system and said minutiae data is extracted in an X, Y, $\theta$ format, wherein X and Y indicate coordinate locations of each extracted minutia with respect to said defined coordinate system and $\theta$ indicates the angular orientation of each extracted minutia with respect to said defined coordinate system;

said retrievable minutiae data being stored in an X, Y, $\theta$ format;

said step of comparing including the step of converting said extracted minutiae data and said retrieved minutiae data into an RIV format, whereby each minutia is represented in terms of its surrounding minutiae in a surrounding neighborhood of a predetermined size, the step of matching each minutia of said unknown pattern represented in an RIV format with each minutia of a selected previously identified pattern represented in an RIV format to produce a plurality of neighborhood comparison signals indicating the relative closeness of match and relative coordinate displacement between minutiae neighborhoods of the corresponding patterns and the step of developing output signals indicative of the relative closeness of match and the relative coordinate displacement of the compared patterns in response to the neighborhood comparison signals;

and further including the following steps:
extracting contour data from said unknown pattern corresponding to said configuration of contour lines;
storing said extracted contour data;
identifying singularity points from said stored contour data;
classifying said unknown pattern into one of a predetermined number of classification types according to said identified singularity points; and
said retrievable minutiae data being stored in classification bins defined as corresponding to said pre-determined number of classification types according to the classification type of each previously identified pattern;
said step of addressing and retrieving said stored minutiae data being performed by addressing said stored minutiae data according to said classification type of said unknown pattern at a corresponding classification bin and retrieving stored minutiae data from said addressed classification bin.

* * * * *